US012724234B2

(12) United States Patent
Lee et al.

(10) Patent No.: US 12,724,234 B2
(45) Date of Patent: Sep. 1, 2026

(54) OPTICAL IMAGING SYSTEM

(71) Applicant: SAMSUNG ELECTRO-MECHANICS CO., LTD, Suwon-si (KR)

(72) Inventors: Ji Su Lee, Suwon-si (KR); Dong Hyuk Jang, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 706 days.

(21) Appl. No.: 17/851,488

(22) Filed: Jun. 28, 2022

(65) Prior Publication Data

US 2023/0060243 A1 Mar. 2, 2023

(30) Foreign Application Priority Data

Aug. 9, 2021 (KR) ........................ 10-2021-0104802
Dec. 10, 2021 (KR) ........................ 10-2021-0176899

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS 11,002,943 B2 5/2021 Jung et al.
2015/0042863 A1 2/2015 Tsai et al.
2018/0188487 A1 7/2018 Hsieh et al.
2018/0364457 A1 12/2018 Yao et al.
2019/0204555 A1 7/2019 Jhang et al.
2019/0302424 A1 10/2019 Kuo et al.
2021/0003829 A1* 1/2021 Dai .................... G02B 13/0045
2021/0063695 A1* 3/2021 Hsieh ....................... G02B 9/64
2021/0063696 A1 3/2021 Kamada et al.
2021/0088759 A1 3/2021 Tsai et al.
2021/0109320 A1* 4/2021 Park ................... G02B 13/0045
2021/0149167 A1 5/2021 Jhang et al.
(Continued)

FOREIGN PATENT DOCUMENTS

CN 110716287 A 1/2020
CN 111413784 A 7/2020
(Continued)

OTHER PUBLICATIONS

Chinese Office Action Issued on Jan. 11, 2024, in counterpart Chinese Patent Application No. 202210975891.7 (5 Pages in English, 9 Pages in Chinese).
(Continued)

*Primary Examiner* — Jia X Pan
(74) *Attorney, Agent, or Firm* — NSIP Law

(57) ABSTRACT

An optical imaging system includes: a first lens, a second lens, a third lens having positive refractive power, a fourth lens, a fifth lens, a sixth lens, and a seventh lens sequentially arranged from an object side, and the imaging lens system satisfies OAL/imgH/2<0.6, where OAL is a distance from an object-side surface of the first lens to an image plane, and imgH is equal to half a diagonal length of the image plane.

15 Claims, 22 Drawing Sheets

(56) References Cited

U.S. PATENT DOCUMENTS

| | | | | |
|---|---|---|---|---|
| 2021/0157101 | A1 | 5/2021 | Yunbai | |
| 2021/0223513 | A1 | 7/2021 | Nitta et al. | |
| 2021/0356698 | A1* | 11/2021 | Zhang | G02B 27/0025 |
| 2021/0382273 | A1* | 12/2021 | Park | G02B 9/64 |
| 2022/0163776 | A1 | 5/2022 | Chen et al. | |
| 2022/0171165 | A1* | 6/2022 | Teranishi | G02B 13/0045 |
| 2022/0283410 | A1* | 9/2022 | Li | G02B 13/0045 |
| 2022/0365317 | A1* | 11/2022 | Chen | G02B 13/0045 |

FOREIGN PATENT DOCUMENTS

| | | | | | |
|---|---|---|---|---|---|
| CN | 211236417 | U | | 8/2020 | |
| CN | 111722358 | A | | 9/2020 | |
| CN | 212181144 | U | | 12/2020 | |
| CN | 112346214 | A | | 2/2021 | |
| CN | 112526708 | A | | 3/2021 | |
| CN | 112748529 | A | * | 5/2021 | G02B 13/0045 |
| CN | 112965206 | A | * | 6/2021 | G02B 13/0045 |
| CN | 112965217 | A | | 6/2021 | |
| CN | 113093367 | A | | 7/2021 | |
| CN | 213715586 | U | * | 7/2021 | G02B 13/18 |
| TW | I676831 | B | | 11/2019 | |
| TW | I699575 | B | | 7/2020 | |
| TW | 202040206 | A | | 11/2020 | |

OTHER PUBLICATIONS

Chinese Office Action issued on May 28, 2024, in counterpart Chinese Patent Application No. 202210975891.7 (6 pages in English, 8 pages in Korean).

Taiwanese Office Action issued on Feb. 24, 2023, in counterpart Taiwanese Patent Application No. 111123324 (8 pages in English, 7 pages in Chinese).

Korean Office Action issued on May 8, 2024, in counterpart Korean Patent Application No. 10-2021-0176899 (5 pages in English, 5 pages in Korean).

Taiwanese Office Action issued on Nov. 27, 2024, in counterpart Taiwanese Patent Application No. 112151217 (8 pages in English, 7 pages in Chinese).

Taiwanese Office Action Issued on Jan. 7, 2026, in counterpart Taiwanese Patent Application No. 114137818 (9 Pages in English, 9 Pages in Chinese).

* cited by examiner

OPTICAL IMAGING SYSTEM

CROSS-REFERENCE TO RELATED APPLICATION(S)

This application claims the benefit under 35 USC 119(a) of Korean Patent Application Nos. 10-2021-0104802 filed on Aug. 9, 2021 and 10-2021-0176899 filed on Dec. 10, 2021 in the Korean Intellectual Property Office, the entire disclosures of which are incorporated herein by reference for all purposes.

BACKGROUND

1. Field

The following description relates to an optical imaging system, and more particularly, to an optical imaging system having an ultra-slim thickness.

2. Description of Background

Sensors of various optical systems having 13 million to 200 million pixels have been developed, and lenses to be applied to such sensors have been developed. As the number of pixels increases, a size of the sensor increases, and a total length of the lenses increases. Accordingly, a size of a camera module increases, such that a thickness of the camera module may become greater than that of a mobile phone. In this case, a rear surface of the mobile phone is not provided as a flat surface due to the camera module, which may cause inconvenience in using the mobile phone or impair an appearance of the mobile phone. Therefore, an optical imaging system having a reduced thickness while being applied to a high-resolution camera has been required.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes: a first lens, a second lens, a third lens having positive refractive power, a fourth lens, a fifth lens, a sixth lens, and a seventh lens sequentially arranged from an object side, wherein $OAL/imgH/2<0.6$, where OAL is a distance from an object-side surface of the first lens to an image plane, and imgH is equal to half a diagonal length of the image plane.

The optical imaging system may satisfy at least one of $30<v1-v2<70$, $5<v1-v3<55$, and $30<v1-v4<70$ is satisfied, where v1 is an Abbe number of the first lens, v2 is an Abbe number of the second lens, v3 is an Abbe number of the third lens, and v4 is an Abbe number of the fourth lens.

The optical imaging system may satisfy $0<f1/f<1.4$, where f is an overall focal length of the optical imaging system, and f1 is a focal length of the first lens.

The optical imaging system may satisfy $-9<f2/f<-2$, where f is an overall focal length of the optical imaging system, and f2 is a focal length of the second lens.

The optical imaging system may satisfy $5<|f4/f|<70$, where f is an overall focal length of the optical imaging system, and f4 is a focal length of the fourth lens.

The optical imaging system may satisfy $5<|f5/f|<50$, where f is an overall focal length of the optical imaging system, and f5 is a focal length of the fifth lens.

The optical imaging system may satisfy $-3<f7/f<0$, where f is an overall focal length of the optical imaging system, and f7 is a focal length of the seventh lens.

The optical imaging system may satisfy $OAL/f<1.3$ and $BFL/f<0.3$, where f is an overall focal length of the optical imaging system, and BFL is a distance from an image-side surface of the seventh lens to the image plane on an optical axis.

The optical imaging system may satisfy $f1/f2<0$, where f1 is a focal length of the first lens, and f2 is a focal length of the second lens.

The optical imaging system may satisfy $0<f1/f3$, where f1 is a focal length of the first lens, and f3 is a focal length of the third lens.

The optical imaging system may satisfy $D1/f<0.1$, where D1 is a distance between an image-side surface of the first lens and an object-side surface of the second lens on an optical axis, and f is an overall focal length of the optical imaging system.

The optical imaging system may satisfy $70<FOV*imgH/f$, where f is an overall focal length of the optical imaging system, and FOV is a field of view of the optical imaging system.

The optical imaging system may satisfy at least one of $-0.1<SAG42/OAL<0$, $-0.2<SAG52/OAL<0$, $-0.2<SAG62/OAL<0$, and $-0.3<SAG72/OAL<0$ is satisfied, where SAG42 is an SAG value at a distal end of an effective diameter of an image-side surface of the fourth lens, SAG52 is an SAG value at a distal end of an effective diameter of an image-side surface of the fifth lens, SAG62 is an SAG value at a distal end of an effective diameter of an image-side surface of the sixth lens, and SAG72 is an SAG value at a distal end of an effective diameter of an image-side surface of the seventh lens.

The optical imaging system may satisfy the first lens has positive refractive power, the second lens has negative refractive power, the sixth lens has positive refractive power, and the seventh lens has negative refractive power.

The optical imaging system may satisfy at least one of the first lens, the second lens, the third lens, the fourth lens, the fifth lens, the sixth lens and the seventh lens is a glass lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1A:
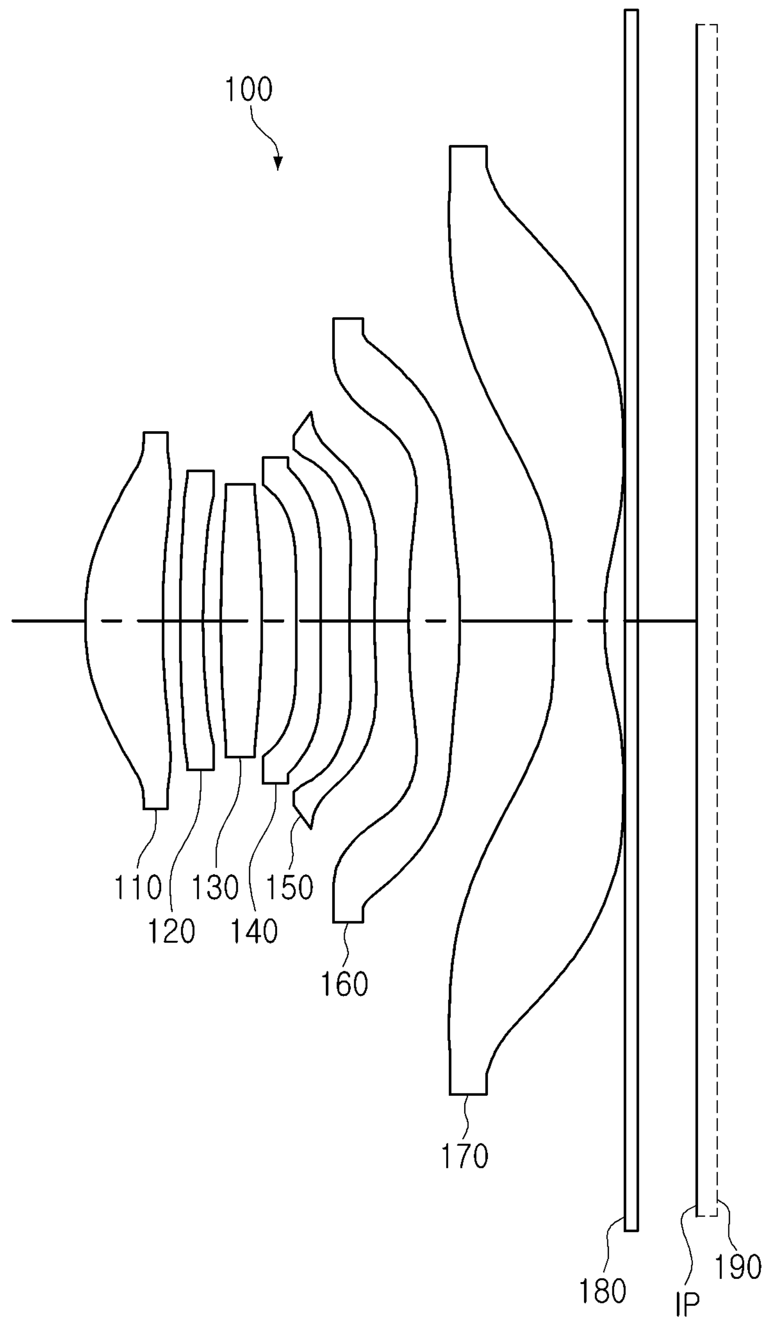
FIG. 1A is a cross-sectional view illustrating an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the drawings, thicknesses, sizes, and shapes of lenses have been slightly exaggerated for convenience of explanation. Particularly, shapes of spherical surfaces or aspherical surfaces illustrated in the drawings are illustrated by way of example. That is, the shapes of the spherical surfaces or the aspherical surfaces are not limited to those illustrated in the drawings.

An optical imaging system according to various examples may be mounted in a mobile electronic device. For example, the optical imaging system may be one component of a camera module mounted in the mobile electronic device. The mobile electronic device may be a portable electronic device such as a mobile communications terminal, a smartphone, or a tablet personal computer (PC).

In the various examples, a first lens (or a foremost lens) refers to a lens closest to an object side, while a last lens (or a rearmost lens) refers to a lens closest to an image sensor.

Hereinafter, in describing configurations of respective lenses, an image side may refer to, for example, a direction in which an image plane on which an image is formed is positioned or a direction in which an image sensor is positioned, and an object side may refer to a direction in which an object is positioned. In addition, an object-side surface of the lens may refer to, for example, a lens surface on a side on which the object is positioned with respect to an optical axis, and an image-side surface of the lens may refer to a lens surface on a side on which the image plane is positioned with respect to the optical axis. The image plane may be, for example, an imaging device surface or an image sensor surface. The image sensor may include, for example, a sensor such as a complementary metal oxide semiconductor (CMOS) sensor or a charge coupled device (CCD). The image sensor is not limited thereto, and may be, for example, a device that converts an image of the object into an electrical image signal.

In the various examples, all of radii of curvature and thicknesses of lenses, a TTL, an ImgH (½ of a diagonal length of the image plane), and focal lengths are represented by millimeters (mm). Further, thicknesses of the lenses, gaps between the lenses, and the TTL are distances in optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex.

An optical imaging system according to various examples may include seven lenses. The optical imaging system may include an infrared (IR) filter disposed between a seventh lens and the image sensor. Although not illustrated, the optical imaging system may include a stop. The optical imaging system may include a total of seven lenses having refractive power.

In an example, two lenses adjacent to each other among the lenses of the optical imaging system may be spaced apart from each other in an optical axis direction.

The optical imaging system may include at least one aspherical lens. In an example, at least one of an object-side surface or an image-side surface of at least one of the lenses constituting the optical imaging system may be aspherical. An aspherical lens refers to a lens of which at least one of an object-side surface and an image-side surface is aspherical.

An aspherical surface of each of the lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} \quad \text{[Equation 1]}$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A to H are aspheric constants, and Z (also known as sag) is a distance in a direction parallel to the optical axis of the lens surface from the point on the lens surface at the distance Y from the optical axis of the lens surface to a tangential plane perpendicular to the optical axis and intersecting a vertex of the lens surface.

In an example, at least one of the object-side surface or the image-side surface of at least one of the lenses constituting the optical imaging system may include an inflection point. As an example, at least one of the object-side surface and the image-side surface of the lens may be concave in a paraxial region and may be convex in an off-axis region. As another example, at least one of the object-side surface and the image-side surface of the lens may be convex in the paraxial region and may be concave in the off-axis region.

In various examples, the lens may be formed of plastic or glass. In at least some examples, the lens may be formed of injection molded plastic. However, other transparent optical materials may be used as a material of the lens. In addition, in various examples, remaining lens elements may be formed of materials having other optical properties such as other Abbe numbers and/or other refractive indices.

In one example, one or more lenses may have other shapes such as an elliptical shape, a rectangular shape, a square shape, or a rectangular shape with rounded corners. In an exemplary embodiment, the lens may have a D-cut shape. For example, the lens may have a shorter length in a first-axis (Y-axis) direction perpendicular to the optical axis (Z axis) than in a second-axis (X-axis) direction perpendicular to both the optical axis and the first-axis (Y-axis) directions.

The optical imaging system may include a first lens, a second lens, a third lens, a fourth lens, a fifth lens, a sixth lens, a seventh lens, and an image sensor sequentially arranged from the object side toward the image side.

The optical imaging system may include at least one glass lens. For example, at least one of the first lens, the second lens, the third lens, the fourth lens, the fifth lens, the sixth lens and the seventh lens may be formed of glass. The optical imaging system may include the glass lens to have improved resolution.

The first lens may have positive refractive power. An object-side surface of the first lens may be convex in the paraxial region. An image-side surface of the first lens may be concave in the paraxial region. At least one of the object-side surface or the image-side surface of the first lens may be aspherical.

The second lens may have negative refractive power. An object-side surface of the second lens may be convex in the paraxial region. An image-side surface of the second lens may be concave in the paraxial region. The object-side surface of the second lens may be aspherical. The image-side surface of the second lens may be aspherical.

The third lens may have positive refractive power. An object-side surface of the third lens may be convex in the paraxial region. An image-side surface of the third lens may be concave or convex in the paraxial region. At least one of the object-side surface or the image-side surface of the third lens may be aspherical.

The fourth lens may have refractive power. An object-side surface of the fourth lens may be concave or convex in the paraxial region. An image-side surface of the fourth lens may be concave or convex in the paraxial region. At least one of the object-side surface or the image-side surface of the fourth lens may be aspherical.

The fifth lens may have refractive power. An object-side surface of the fifth lens may be convex in the paraxial region. An image-side surface of the fifth lens may be concave in the paraxial region. At least one of the object-side surface or the image-side surface of the fifth lens may be aspherical.

The sixth lens may have positive refractive power. An object-side surface of the sixth lens may be convex in the paraxial region. An image-side surface of the sixth lens may be concave or convex in the paraxial region. At least one of the object-side surface or the image-side surface of the sixth lens may be aspherical.

The seventh lens may have negative refractive power. An object-side surface of the seventh lens may be concave or convex in the paraxial region. An image-side surface of the seventh lens may be concave in the paraxial region. At least one of the object-side surface or the image-side surface of the seventh lens may be aspherical.

In an example, at least one of the seven lenses constituting the optical imaging system may be formed of glass. In an example, at least one of the first lens, the second lens, the third lens, the fourth lens, the fifth lens, the sixth lens and the seventh lens may be a glass lens. For example, the first lens may be a glass lens. Chromatic aberration of the optical imaging system may be decreased using a material having a high Abbe's number. Since glass has an Abbe number relatively greater than that of plastic, the glass lens may be advantageous in securing high resolution. For example, the first lens may be formed of the glass, such that Conditional Expression (2) ("30<v1-v2<70" or "40<v1-v2<70") may be relatively easily satisfied.

The optical imaging system may be configured to satisfy at least one of the following Conditional Expressions:

$0<f1/f<1.4$ Conditional Expression (1):

$30<v1-v2<70$ Conditional Expression (2):

$5<v1-v3<55$ Conditional Expression (3):

$30<v1-v4<70$ Conditional Expression (4):

$-9<f2/f<-2$ Conditional Expression (5):

$2<f3/f<10$ Conditional Expression (6):

$5<|f4/f|<70$ Conditional Expression (7):

$5<|f5/f|<50$ Conditional Expression (8):

$0.5<f6/f<5$ Conditional Expression (9):

$-3<f7/f<0$ Conditional Expression (10):

$OAL/f<1.3$ Conditional Expression (11):

$f1/f2<0$ Conditional Expression (12):

$0<f1/f3$ Conditional Expression (13):

$BFL/f<0.3$ Conditional Expression (14):

$D1/f<0.1$ Conditional Expression (15):

$OAL/\mathrm{img}H/2<0.6$ Conditional Expression (16):

$70<FOV*\mathrm{img}H/f$ Conditional Expression (17):

$-0.1<SAG42/OAL<0$ Conditional Expression (18):

$-0.2<SAG52/OAL<0$ Conditional Expression (19):

$-0.2<SAG62/OAL<0$, and Conditional Expression (20):

$-0.3<SAG72/OAL<0$. Conditional Expression (21):

In the Conditional Expressions, f is an overall focal length of the optical imaging system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, and f7 is a focal length of the seventh lens.

In the Conditional Expressions, v1 is an Abbe number of the first lens, v2 is an Abbe number of the second lens, v3 is an Abbe number of the third lens, and v4 is an Abbe number of the fourth lens.

In the Conditional Expressions, OAL is a distance from the object-side surface of the first lens to the image plane, and BFL is a distance from the image-side surface of the seventh lens to the image plane.

In the Conditional Expressions, D1 is an air gap between the first lens and the second lens. imgH is equal to half a diagonal length of the image plane. FOV is a field of view of the optical imaging system.

In the Conditional Expressions, SAG42 is an SAG value at a distal end of an effective diameter of the image-side surface of the fourth lens, SAG52 is an SAG value at a distal end of an effective diameter of the image-side surface of the fifth lens, SAG62 is an SAG value at a distal end of an effective diameter of the image-side surface of the sixth lens, and SAG72 is an SAG value at a distal end of an effective diameter of the image-side surface of the seventh lens. SAG is a distance between a certain point on the aspherical surface of the lens at the distance Y and a tangential plane meeting the apex of the aspherical surface of the lens.

When a value of SAG is negative (−), it means that a distal end of an effective diameter of the aspherical surface of the lens is positioned closer to the object side than the apex of the aspherical surface of the lens is.

Conditional Expression (1) is a condition regarding a ratio of the focal length of the first lens to the overall focal length of the optical imaging system, and when f1/f is outside of a range of Conditional Expression (1), an appropriate level of refractive power may not be maintained.

Conditional Expressions (2), (3), and (4) are conditions that define Abbe's numbers of materials, and only when v1−v2, v1−v3, and v1−v4 are in ranges of Conditional Expressions (2), (3), and (4), chromatic aberration may be minimized.

In relation to Conditional Expression (2), in the optical imaging system, 30<v1−v2<70.

Conditional Expression (5) is a condition regarding a ratio of the focal length of the second lens to the overall focal length of the optical imaging system, and when f2/f is outside of a range of Conditional Expression (5), appropriate refractive power may not be maintained, such that it may become difficult to correct aberration.

Conditional Expression (6) is a condition regarding a ratio of the focal length of the third lens to the overall focal length of the optical imaging system, and when f3/f is outside of a range of Conditional Expression (6), positive refractive power may become excessively great or small, such that it may become difficult to correct aberration.

Conditional Expression (7) is a condition regarding a ratio of the focal length of the fourth lens to the overall focal length of the optical imaging system, and when |f4/f| is outside of a range of Conditional Expression (7), appropriate refractive power may not be maintained, such that it may become difficult to correct aberration.

Conditional Expression (8) is a condition regarding a ratio of the focal length of the fifth lens to the overall focal length of the optical imaging system, and when |f5/f| is outside of a range of Conditional Expression (8), negative refractive power may become excessively great, such that it may become difficult to correct aberration.

Conditional Expression (9) is a condition regarding a ratio of the focal length of the sixth lens to the overall focal length of the optical imaging system, and when f6/f is outside of a range of Conditional Expression (9), desired refractive power may not be maintained.

Conditional Expression (10) is a condition regarding a ratio of the focal length of the seventh lens to the overall focal length of the optical imaging system, and when f7/f is outside of a range of Conditional Expression (10), desired refractive power may not be maintained.

Conditional Expression (11) is a condition regarding a ratio of a total length to the overall focal length of the optical imaging system, and when OAL/f exceeds an upper limit of Conditional Expression (11), it may become difficult to achieve miniaturization of the optical imaging system.

Conditional Expressions (12) and (13) are conditions regarding a ratio of the focal length of the first lens to the focal length of the second lens and a ratio of the focal length of the first lens to the focal length of the third lens, respectively, when f1/f2 exceeds an upper limit of Conditional Expression (12) and f1/f3 is less than a lower limit of Conditional Expression (13), any one of these lenses may be excessively great, such that aberration characteristics may be deteriorated and it may become difficult to secure performance.

Conditional Expression (14) is a condition regarding a ratio of BFL to the overall focal length, and when BFL/f exceeds an upper limit of Conditional Expression (14), it may become difficult to achieve miniaturization of the optical imaging system.

Conditional Expression (15) is a condition regarding a ratio of a distance between the first lens and the second lens to the overall focal length, and when D1/f exceeds an upper limit of Conditional Expression (15), longitudinal chromatic aberration characteristics may be deteriorated.

The optical imaging system satisfying the above Conditional Expressions may be easily miniaturized and may be mounted in a small terminal. In addition, the optical imaging system satisfying the above Conditional Expressions may realize high resolution.

An optical imaging system 100 according to a first example will hereinafter be described with reference to FIGS. 1A and 1B.

Figure 1B:
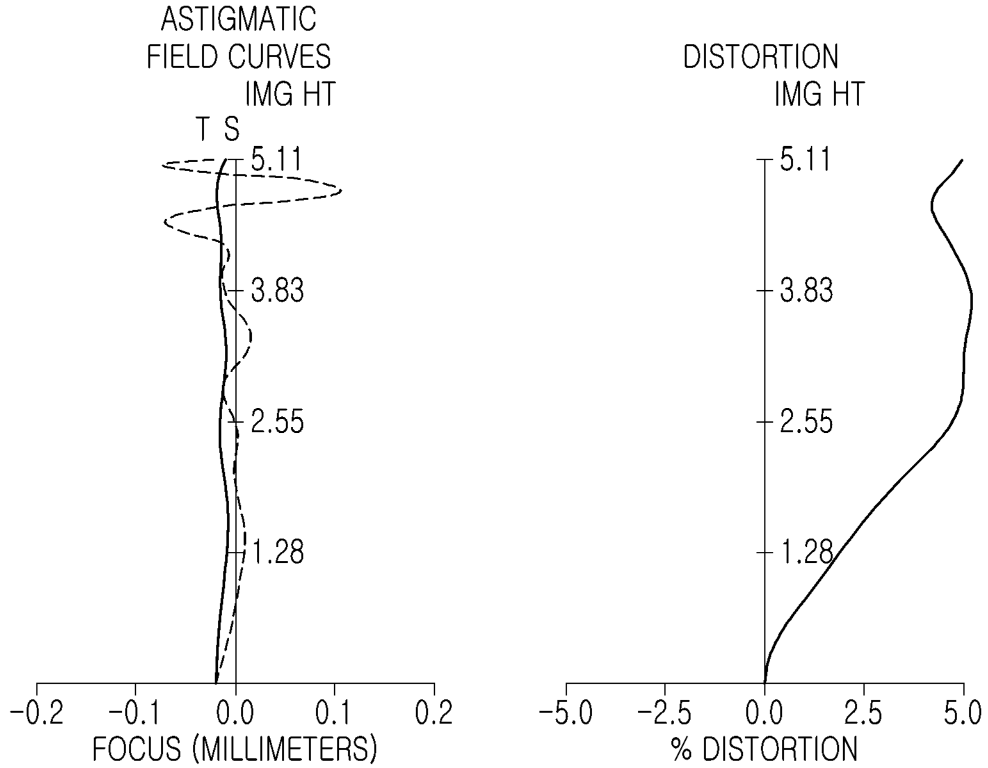
FIG. 1B is graphs representing aberration characteristics of the optical imaging system according to the first example.

FIG. 1A is a cross-sectional view illustrating the optical imaging system 100 according to the first example. FIG. 1B is graphs representing aberration characteristics of the optical imaging system 100.

The optical imaging system 100 may include a first lens 110, a second lens 120, a third lens 130, a fourth lens 140, a fifth lens 150, a sixth lens 160, a seventh lens 170, and an image sensor 190 sequentially arranged from an object side toward an image side. The optical imaging system 100 may include an IR filter 180 disposed between the seventh lens 170 and the image sensor 190.

The first lens 110 may have positive refractive power. An object-side surface of the first lens 110 may be convex in the paraxial region. An image-side surface of the first lens 110 may be concave in the paraxial region. The object-side surface of the first lens 110 may be aspherical. The image-side surface of the first lens 110 may be aspherical.

The second lens 120 may have negative refractive power. An object-side surface of the second lens 120 may be convex in the paraxial region. An image-side surface of the second lens 120 may be concave in the paraxial region. The object-side surface of the second lens 120 may be aspherical. The image-side surface of the second lens 120 may be aspherical.

The third lens 130 may have positive refractive power. An object-side surface of the third lens 130 may be convex in the paraxial region. An image-side surface of the third lens 130 may be convex in the paraxial region. The object-side surface of the third lens 130 may be aspherical. The image-side surface of the third lens 130 may be aspherical.

The fourth lens 140 may have negative refractive power. An object-side surface of the fourth lens 140 may be concave in the paraxial region. An image-side surface of the fourth lens 140 may be concave in the paraxial region. The object-side surface of the fourth lens 140 may be aspherical. The image-side surface of the fourth lens 140 may be aspherical.

The fifth lens 150 may have negative refractive power. An object-side surface of the fifth lens 150 may be convex in the paraxial region. An image-side surface of the fifth lens 150 may be concave in the paraxial region. The object-side surface of the fifth lens 150 may be aspherical. The image-side surface of the fifth lens 150 may be aspherical.

The sixth lens 160 may have positive refractive power. An object-side surface of the sixth lens 160 may be convex in the paraxial region. An image-side surface of the sixth lens 160 may be convex in the paraxial region. The object-side surface of the sixth lens 160 may be aspherical. The image-side surface of the sixth lens 160 may be aspherical.

The seventh lens 170 may have negative refractive power. An object-side surface of the seventh lens 170 may be convex in the paraxial region. An image-side surface of the seventh lens 170 may be concave in the paraxial region. The object-side surface of the seventh lens 170 may be aspherical. The image-side surface of the seventh lens 170 may be aspherical.

The object-side surface of the first lens 110 may include an inflection point. The image-side surface of the first lens 110 may include an inflection point. The image-side surface of the first lens 110 may be concave in the paraxial region and may be convex in the off-axis region.

The image-side surface of the fourth lens 140 may include an inflection point. The image-side surface of the fourth lens 140 may be concave in the paraxial region and may be convex in the off-axis region.

The object-side surface of the fifth lens 150 may include an inflection point. The object-side surface of the fifth lens 150 may be convex in the paraxial region and may be concave in the off-axis region. The image-side surface of the fifth lens 150 may include an inflection point. The image-side surface of the fifth lens 150 may be concave in the paraxial region and may be convex in the off-axis region.

The object-side surface of the sixth lens 160 may include an inflection point. The object-side surface of the sixth lens 160 may be convex in the paraxial region and may be concave in the off-axis region.

The object-side surface of the seventh lens 170 may include an inflection point. The object-side surface of the seventh lens 170 may be convex in the paraxial region and may be concave in the off-axis region. The image-side surface of the seventh lens 170 may include an inflection point. The image-side surface of the seventh lens 170 may be concave in the paraxial region and may be convex in the off-axis region.

At least one of the first lens 110 to the seventh lens 170 may be formed of glass. For example, the first lens 110 may be a glass lens. Chromatic aberration of the optical imaging system may be decreased using a material having a high Abbe's number. Since glass has an Abbe number relatively greater than that of plastic, the glass lens may be advantageous in securing high resolution. For example, the first lens 110 may be formed of the glass, such that Conditional Expression (2) ("30<v1−v2<70" or "40<v1−v2<70") may be relatively easily satisfied.

In the optical imaging system 100, f1/f may be 1.111, v1−v2 may be 52.44, v1−v3 may be 15.94, v1−v4 may be 52.44, f2/f may be −4.514, f3/f may be 3.444, |f4/f| may be −3.882, |f5/f| may be −6.599, f6/f may be 0.996, f7/f may be −0.767, OAL/f may be 1.198, f1/f2 may be −0.246, f1/f3 may be 0.323, BFL/f may be 0.183, D1/f may be 0.033, OAL/imgH/2 may be 0.538, FOV*imgH/f may be 103.141, SAG42/OAL may be −0.054, SAG52/OAL may be −0.1, SAG62/OAL may be −0.158, and SAG72/OAL may be −0.191.

Table 1 represents optical and physical parameters of the optical imaging system 100. Table 2 illustrates aspherical data of the optical imaging system 100.

TABLE 1

| Surface | Radius | Thickness | Index | Abbe number |
|---|---|---|---|---|
| Object | Infinity | 1000 | | |
| 1 | Infinity | 0.000 | | |
| 2 | 2.00 | 0.704 | 1.553 | 71.7 |
| 3 | 5.98 | 0.153 | | |
| 4 | 11.53 | 0.210 | 1.671 | 19.2 |
| 5 | 6.29 | 0.158 | | |
| 6 | 11.33 | 0.370 | 1.535 | 55.7 |
| 7 | −33.50 | 0.316 | | |
| 8 | −28.98 | 0.210 | 1.671 | 19.2 |
| 9 | 20.82 | 0.252 | | |
| 10 | 4.69 | 0.218 | 1.614 | 25.9 |
| 11 | 3.69 | 0.319 | | |
| 12 | 6.23 | 0.456 | 1.567 | 37.4 |
| 13 | −4.36 | 0.849 | | |
| 14 | 19.68 | 0.446 | 1.535 | 55.7 |
| 15 | 1.71 | 0.200 | | |
| 16 | | 0.110 | 1.517 | 64.2 |
| 17 | | 0.509 | | |
| Image | | 0.020 | | |

TABLE 2

| Surface # | 2 | 3 | 4 | 5 | 6 | 7 | 8 |
|---|---|---|---|---|---|---|---|
| Radius(Y) | 2.0021E+00 | 5.9833E+00 | 1.1526E+01 | 6.2878E+00 | 1.1332E+01 | −3.3500E+01 | −2.8976E+01 |
| conic constant(K) | −1.8845E+00 | −2.8661E+01 | 1.1348E+01 | 1.1099E+01 | −7.4223E+01 | −8.0125E+01 | −5.9696E+01 |
| 4th order coefficient (A) | 2.170E−02 | −1.268E−02 | −4.269E−02 | −2.747E−02 | −2.744E−02 | −5.381E−03 | −1.043E−01 |
| 6th order coefficient (B) | 1.197E−02 | 1.270E−02 | 3.340E−02 | −1.122E−01 | 2.272E−01 | −3.179E−01 | 1.970E−01 |
| 8th order coefficient (C) | −2.237E−02 | −1.107E−01 | 6.001E−02 | 1.510E+00 | −1.939E+00 | 3.390E+00 | −1.251E+00 |
| 10th order coefficient (D) | −8.305E−02 | 4.938E−01 | −5.546E−01 | −9.515E+00 | 9.359E+00 | −2.292E+01 | 4.409E+00 |
| 12th order coefficient (E) | 5.061E−01 | −1.390E+00 | 3.140E+00 | 3.981E+01 | −2.453E+01 | 1.036E+02 | −7.513E+00 |
| 14th order coefficient (F) | −1.262E+00 | 2.642E+00 | −1.138E+01 | −1.158E+02 | 1.921E+01 | −3.256E+02 | −6.627E+00 |
| 16th order coefficient (G) | 1.904E+00 | −3.537E+00 | 2.703E+01 | 2.396E+02 | 9.209E+01 | 7.290E+02 | 7.023E+01 |
| 18th order coefficient (H) | −1.918E+00 | 3.400E+00 | −4.366E+01 | −3.562E+02 | −3.784E+02 | −1.176E+03 | −1.885E+02 |
| 20th order coefficient (J) | 1.334E+00 | −2.356E+00 | 4.886E+01 | 3.806E+02 | 7.268E+02 | 1.368E+03 | 2.949E+02 |
| 22th order coefficient (L) | −6.437E−01 | 1.166E+00 | −3.795E+01 | −2.883E+02 | −8.624E+02 | −1.136E+03 | −3.002E+02 |
| 24th order coefficient (M) | 2.120E−01 | −4.011E−01 | 2.009E+01 | 1.503E+02 | 6.628E+02 | 6.557E+02 | 2.022E+02 |
| 26th order coefficient (N) | −4.544E−02 | 9.110E−02 | −6.916E+00 | −5.082E+01 | −3.226E+02 | −2.499E+02 | −8.719E+01 |
| 28th order coefficient (O) | 5.714E−03 | −1.226E−02 | 1.396E+00 | 9.931E+00 | 9.073E+01 | 5.651E+01 | 2.186E+01 |
| 30th order coefficient (p) | −3.198E−04 | 7.398E−04 | −1.254E−01 | −8.358E−01 | −1.125E+01 | −5.737E+00 | −2.428E+00 |

| Surface # | 9 | 10 | 11 | 12 | 13 | 14 | 15 |
|---|---|---|---|---|---|---|---|
| Radius(Y) | 2.0821E+01 | 4.6886E+00 | 3.6853E+00 | 6.2278E+00 | −4.3631E+00 | 1.9676E+01 | 1.7102E+00 |
| conic constant(K) | −6.7838E+01 | −3.4870E+01 | −6.7915E−01 | 5.3878E+00 | −6.6194E+00 | −8.1479E+00 | −6.0680E+00 |
| 4th order coefficient (A) | −1.105E−01 | −2.106E−01 | −2.511E−01 | 1.234E−02 | 4.975E−02 | −2.088E−01 | −1.136E−01 |

TABLE 2-continued

| | | | | | | | |
|---|---|---|---|---|---|---|---|
| 6th order coefficient (B) | 1.384E−01 | 2.009E−01 | 2.717E−02 | −8.916E−02 | 3.050E−03 | 1.054E−01 | 6.463E−02 |
| 8th order coefficient (C) | −2.150E−01 | −5.025E−01 | 4.951E−01 | 1.634E−01 | −5.143E−02 | −3.180E−02 | −2.624E−02 |
| 10th order coefficient (D) | −4.546E−01 | 2.789E+00 | −1.403E+00 | −2.344E−01 | 1.169E−01 | 6.688E−03 | 7.586E−03 |
| 12th order coefficient (E) | 3.724E+00 | −1.028E+01 | 2.135E+00 | 2.484E−01 | −1.516E−01 | −1.160E−03 | −1.537E−03 |
| 14th order coefficient (F) | −1.171E+01 | 2.372E+01 | −1.942E+00 | −2.049E−01 | 1.189E−01 | 2.219E−04 | 2.140E−04 |
| 16th order coefficient (G) | 2.311E+01 | −3.655E+01 | 8.991E−01 | 1.288E−01 | −6.087E−02 | −4.652E−05 | −2.022E−05 |
| 18th order coefficient (H) | −3.124E+01 | 3.902E+01 | 8.770E−02 | −5.951E−02 | 2.131E−02 | 8.045E−06 | 1.296E−06 |
| 20th order coefficient (J) | 2.966E+01 | −2.929E+01 | −4.191E−01 | 1.966E−02 | −5.214E−03 | −9.932E−07 | −6.026E−08 |
| 22th order coefficient (L) | −1.977E+01 | 1.540E+01 | 2.895E−01 | −4.541E−03 | 8.917E−04 | 8.421E−08 | 2.666E−09 |
| 24th order coefficient (M) | 9.066E+00 | −5.551E+00 | −1.075E−01 | 7.121E−04 | −1.046E−04 | −4.794E−09 | −1.400E−10 |
| 26th order coefficient (N) | −2.722E+00 | 1.305E+00 | 2.349E−02 | −7.206E−05 | 8.015E−06 | 1.754E−10 | 6.280E−12 |
| 28th order coefficient (O) | 4.816E−01 | −1.800E−01 | −2.844E−03 | 4.240E−06 | −3.614E−07 | −3.734E−12 | −1.663E−13 |
| 30th order coefficient (p) | −3.803E−02 | 1.104E−02 | 1.478E−04 | −1.102E−07 | 7.267E−09 | 3.518E−14 | 1.857E−15 |

An optical imaging system 200 according to a second example will hereinafter be described with reference to FIGS. 2A and 2B.

Figure 2A:
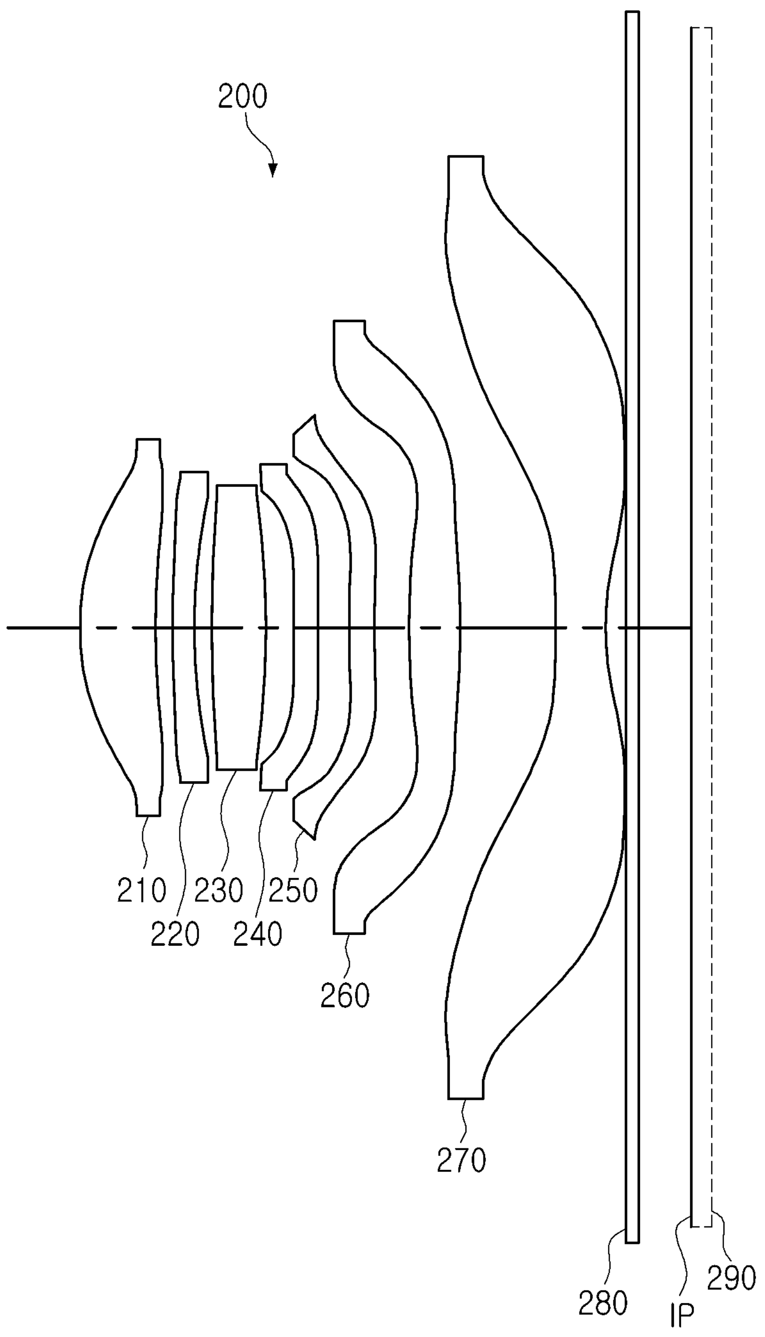
FIG. 2A is a cross-sectional view illustrating an optical imaging system according to a second example.
Figure 2B:
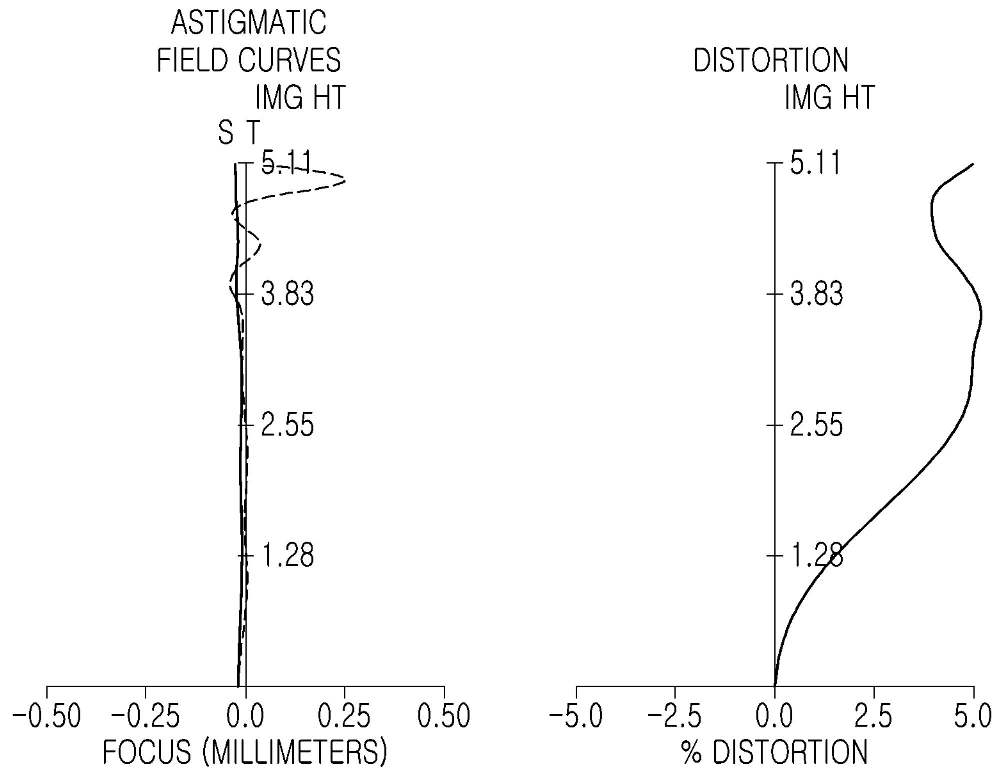
FIG. 2B is graphs representing aberration characteristics of the optical imaging system according to the second example.

FIG. 2A is a cross-sectional view illustrating the optical imaging system 200 according to the second example. FIG. 2B is graphs representing aberration characteristics of the optical imaging system 200.

The optical imaging system 200 may include a first lens 210, a second lens 220, a third lens 230, a fourth lens 240, a fifth lens 250, a sixth lens 260, a seventh lens 270, and an image sensor 290 sequentially arranged from an object side toward a image side. The optical imaging system 200 may include an IR filter 280 disposed between the seventh lens 270 and the image sensor 290.

The first lens 210 may have positive refractive power. An object-side surface of the first lens 210 may be convex in the paraxial region. An image-side surface of the first lens 210 may be concave in the paraxial region. The object-side surface of the first lens 210 may be aspherical. The image-side surface of the first lens 210 may be aspherical.

The second lens 220 may have negative refractive power. An object-side surface of the second lens 220 may be convex in the paraxial region. An image-side surface of the second lens 220 may be concave in the paraxial region. The object-side surface of the second lens 220 may be aspherical. The image-side surface of the second lens 220 may be aspherical.

The third lens 230 may have positive refractive power. An object-side surface of the third lens 230 may be convex in the paraxial region. An image-side surface of the third lens 230 may be convex in the paraxial region. The object-side surface of the third lens 230 may be aspherical. The image-side surface of the third lens 230 may be aspherical.

The fourth lens 240 may have negative refractive power. An object-side surface of the fourth lens 240 may be concave in the paraxial region. An image-side surface of the fourth lens 240 may be concave in the paraxial region. The object-side surface of the fourth lens 240 may be aspherical. The image-side surface of the fourth lens 240 may be aspherical.

The fifth lens 250 may have negative refractive power. An object-side surface of the fifth lens 250 may be convex in the paraxial region. An image-side surface of the fifth lens 250 may be concave in the paraxial region. The object-side surface of the fifth lens 250 may be aspherical. The image-side surface of the fifth lens 250 may be aspherical.

The sixth lens 260 may have positive refractive power. An object-side surface of the sixth lens 260 may be convex in the paraxial region. An image-side surface of the sixth lens 260 may be convex in the paraxial region. The object-side surface of the sixth lens 260 may be aspherical. The image-side surface of the sixth lens 260 may be aspherical.

The seventh lens 270 may have negative refractive power. An object-side surface of the seventh lens 270 may be convex in the paraxial region. An image-side surface of the seventh lens 270 may be concave in the paraxial region. The object-side surface of the seventh lens 270 may be aspherical. The image-side surface of the seventh lens 270 may be aspherical.

The object-side surface of the first lens 210 may include an inflection point. The image-side surface of the first lens 210 may include an inflection point. The image-side surface of the first lens 210 may be concave in the paraxial region and may be convex in the off-axis region.

The image-side surface of the fourth lens 240 may include an inflection point. The image-side surface of the fourth lens 240 may be concave in the paraxial region and may be convex in the off-axis region.

The object-side surface of the fifth lens 250 may include an inflection point. The object-side surface of the fifth lens 250 may be convex in the paraxial region and may be concave in the off-axis region. The image-side surface of the fifth lens 250 may include an inflection point. The image-side surface of the fifth lens 250 may be concave in the paraxial region and may be convex in the off-axis region.

The object-side surface of the sixth lens 260 may include an inflection point. The object-side surface of the sixth lens 260 may be convex in the paraxial region and may be concave in the off-axis region.

The object-side surface of the seventh lens 270 may include an inflection point. The object-side surface of the seventh lens 270 may be convex in the paraxial region and may be concave in the off-axis region. The image-side surface of the seventh lens 270 may include an inflection point. The image-side surface of the seventh lens 270 may be concave in the paraxial region and may be convex in the off-axis region.

At least one of the first lens 210 to the seventh lens 270 may be formed of glass. For example, the first lens 210 may be a glass lens.

In the optical imaging system 200, f1/f may be 1.085, v1−v2 may be 47.78, v1−v3 may be 11.28, v1−v4 may be 47.78, f2/f may be −3.888, f3/f may be 3.144, |f4/f| may be −4.319, |f5/f| may be −7.394, f6/f may be 1.09, f7/f may be −0.761, OAL/f may be 1.204, f1/f2 may be −0.279, f1/f3 may be 0.345, BFL/f may be 0.169, D1/f may be 0.034, OAL/imgH/2 may be 0.538, FOV*imgH/f may be 103.816, SAG42/OAL may be −0.054, SAG52/OAL may be −0.096, SAG62/OAL may be −0.157, and SAG72/OAL may be −0.199.

Table 3 represents optical and physical parameters of the optical imaging system 200. Table 4 illustrates aspherical data of the optical imaging system 200.

TABLE 3

| Surface | Radius | Thickness | Index | Abbe number |
|---|---|---|---|---|
| Object | Infinity | 1000 | | |
| 1 | Infinity | 0.000 | | |
| 2 | 2.05 | 0.679 | 1.592 | 67.0 |
| 3 | 5.90 | 0.155 | | |
| 4 | 13.00 | 0.210 | 1.671 | 19.2 |
| 5 | 6.22 | 0.143 | | |
| 6 | 10.74 | 0.475 | 1.535 | 55.7 |
| 7 | −27.01 | 0.284 | | |
| 8 | −27.06 | 0.210 | 1.671 | 19.2 |
| 9 | 26.63 | 0.264 | | |
| 10 | 4.70 | 0.217 | 1.614 | 25.9 |
| 11 | 3.77 | 0.333 | | |
| 12 | 6.24 | 0.467 | 1.567 | 37.4 |
| 13 | −5.08 | 0.838 | | |
| 14 | 19.83 | 0.453 | 1.535 | 55.7 |
| 15 | 1.70 | 0.200 | | |
| 16 | | 0.110 | 1.517 | 64.2 |
| 17 | | 0.442 | | |
| Image | | 0.020 | | |

TABLE 4

| Surface # | 2 | 3 | 4 | 5 | 6 | 7 | 8 |
|---|---|---|---|---|---|---|---|
| Radius(Y) | 2.0509E+00 | 5.9030E+00 | 1.2998E+01 | 6.2162E+00 | 1.0740E+01 | −2.7007E+01 | −2.7061E+01 |
| conic constant(K) | −2.0000E+00 | −2.6912E+01 | 1.3988E+01 | 1.0506E+01 | −5.1904E+01 | −9.8777E+01 | −7.2249E+01 |
| 4th order coefficient (A) | 1.716E−02 | −1.010E−02 | −4.303E−02 | −2.416E−02 | −2.792E−02 | −2.065E−02 | −1.173E−01 |
| 6th order coefficient (B) | 5.948E−02 | −2.206E−02 | 3.925E−02 | −2.155E−01 | 2.758E−01 | 6.494E−03 | 3.630E−01 |
| 8th order coefficient (C) | −3.102E−01 | 1.296E−01 | 9.323E−04 | 3.079E+00 | −2.589E+00 | −4.547E−02 | −2.650E+00 |
| 10th order coefficient (D) | 9.627E−01 | −4.773E−01 | 1.177E−01 | −2.238E+01 | 1.486E+01 | 2.264E−01 | 1.357E+01 |
| 12th order coefficient (E) | −1.994E+00 | 1.161E+00 | −8.126E−01 | 1.061E+02 | −5.471E+01 | −1.370E+00 | −5.042E+01 |
| 14th order coefficient (F) | 2.863E+00 | −1.962E+00 | 2.390E+00 | −3.455E+02 | 1.312E+02 | 6.236E+00 | 1.352E+02 |
| 16th order coefficient (G) | −2.925E+00 | 2.357E+00 | −4.219E+00 | 7.949E+02 | −1.982E+02 | −1.887E+01 | −2.632E+02 |
| 18th order coefficient (H) | 2.153E+00 | −2.040E+00 | 4.837E+00 | −1.312E+03 | 1.564E+02 | 3.838E+01 | 3.727E+02 |
| 20th order coefficient (J) | −1.144E+00 | 1.274E+00 | −3.633E+00 | 1.557E+03 | 2.225E+01 | −5.338E+01 | −3.828E+02 |
| 22th order coefficient (L) | 4.343E−01 | −5.696E−01 | 1.716E+00 | −1.319E+03 | −2.039E+02 | 5.101E+01 | 2.811E+02 |
| 24th order coefficient (M) | −1.148E−01 | 1.778E−01 | −4.391E−01 | 7.769E+02 | 2.367E+02 | −3.297E+01 | −1.434E+02 |
| 26th order coefficient (N) | 2.006E−02 | −3.682E−02 | 2.195E−02 | −3.022E+02 | −1.413E+02 | 1.379E+01 | 4.813E+01 |
| 28th order coefficient (O) | −2.085E−03 | 4.548E−03 | 1.637E−02 | 6.979E+01 | 4.509E+01 | −3.374E+00 | −9.523E+00 |
| 30th order coefficient (p) | 9.770E−05 | −2.538E−04 | −2.951E−03 | −7.241E+00 | −6.113E+00 | 3.667E−01 | 8.382E−01 |

| Surface # | 9 | 10 | 11 | 12 | 13 | 14 | 15 |
|---|---|---|---|---|---|---|---|
| Radius(Y) | 2.6628E+01 | 4.7025E+00 | 3.7729E+00 | 6.2354E+00 | −5.0829E+00 | 1.9832E+01 | 1.6968E+00 |
| conic constant(K) | 6.9707E+01 | −3.5163E+01 | −3.0088E−01 | 5.3581E+00 | −5.9097E+00 | −2.1374E+01 | −5.9562E+00 |
| 4th order coefficient (A) | −1.258E−01 | −2.054E−01 | −2.502E−01 | 5.568E−03 | 4.817E−02 | −2.230E−01 | −1.392E−01 |
| 6th order coefficient (B) | 2.428E−01 | 9.640E−02 | 3.361E−02 | −5.752E−02 | 1.511E−02 | 1.520E−01 | 1.138E−01 |
| 8th order coefficient (C) | −6.732E−01 | 3.026E−01 | 5.511E−01 | 1.042E−01 | −5.613E−02 | −7.592E−02 | −7.115E−02 |
| 10th order coefficient (D) | 9.041E−01 | −8.082E−01 | −1.789E+00 | −1.757E−01 | 8.579E−02 | 2.828E−02 | 3.323E−02 |
| 12th order coefficient (E) | 1.167E+00 | −5.754E−02 | 3.251E+00 | 2.167E−01 | −9.498E−02 | −7.714E−03 | −1.142E−02 |
| 14th order coefficient (F) | −9.090E+00 | 4.128E+00 | −3.849E+00 | −1.986E−01 | 6.931E−02 | 1.571E−03 | 2.868E−03 |
| 16th order coefficient (G) | 2.302E+01 | −1.030E+01 | 3.043E+00 | 1.319E−01 | −3.381E−02 | −2.449E−04 | −5.255E−04 |

TABLE 4-continued

| | | | | | | | |
|---|---|---|---|---|---|---|---|
| 18th order coefficient (H) | −3.526E+01 | 1.392E+01 | −1.576E+00 | −6.231E−02 | 1.135E−02 | 2.950E−05 | 7.023E−05 |
| 20th order coefficient (J) | 3.616E+01 | −1.204E+01 | 4.893E−01 | 2.070E−02 | −2.666E−03 | −2.721E−06 | −6.807E−06 |
| 22th order coefficient (L) | −2.543E+01 | 6.953E+00 | −5.884E−02 | −4.768E−03 | 4.376E−04 | 1.875E−07 | 4.719E−07 |
| 24th order coefficient (M) | 1.214E+01 | −2.671E+00 | −1.567E−02 | 7.434E−04 | −4.919E−05 | −9.271E−09 | −2.274E−08 |
| 26th order coefficient (N) | −3.761E+00 | 6.557E−01 | 7.642E−03 | −7.474E−05 | 3.604E−06 | 3.087E−10 | 7.225E−10 |
| 28th order coefficient (O) | 6.831E−01 | −9.309E−02 | −1.235E−03 | 4.370E−06 | −1.549E−07 | −6.169E−12 | −1.359E−11 |
| 30th order coefficient (p) | −5.516E−02 | 5.807E−03 | 7.483E−05 | −1.129E−07 | 2.954E−09 | 5.574E−14 | 1.146E−13 |

An optical imaging system 300 according to a third example will hereinafter be described with reference to FIGS. 3A and 3B.

Figure 3A:
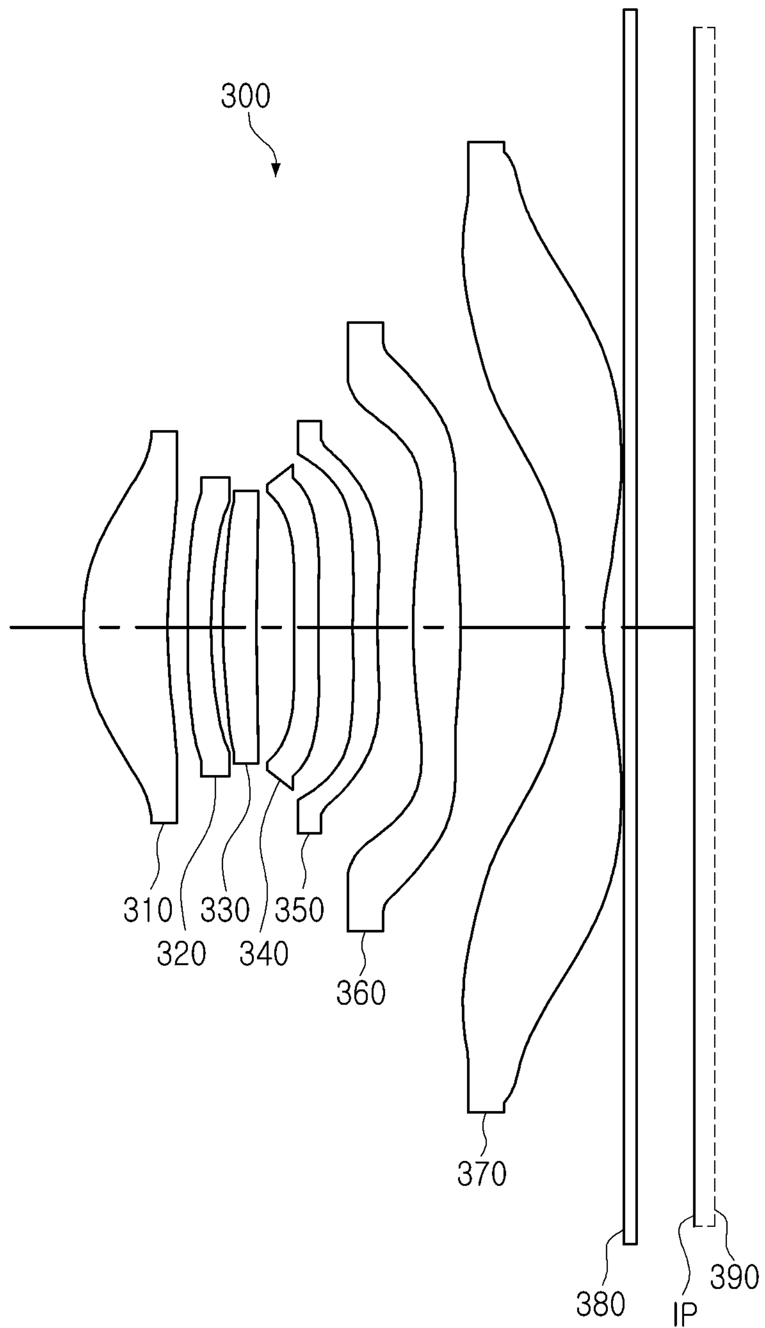
FIG. 3A is a cross-sectional view illustrating an optical imaging system according to a third example.
Figure 3B:
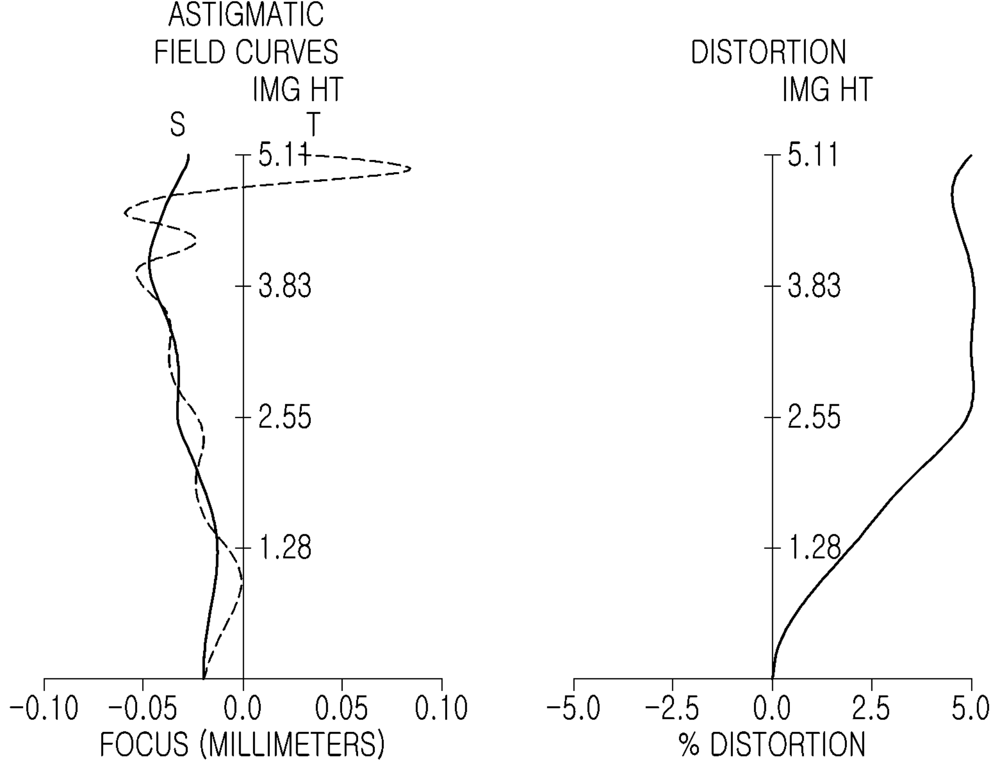
FIG. 3B is graphs representing aberration characteristics of the optical imaging system according to the third example.

FIG. 3A is a cross-sectional view illustrating the optical imaging system 300 according to the third example. FIG. 3B is graphs representing aberration characteristics of the optical imaging system 300.

The optical imaging system 300 may include a first lens 310, a second lens 320, a third lens 330, a fourth lens 340, a fifth lens 350, a sixth lens 360, a seventh lens 370, and an image sensor 390 sequentially arranged from an object side toward a image side. The optical imaging system 300 may include an IR filter 380 disposed between the seventh lens 370 and the image sensor 390.

The first lens 310 may have positive refractive power. An object-side surface of the first lens 310 may be convex in the paraxial region. An image-side surface of the first lens 310 may be concave in the paraxial region. The object-side surface of the first lens 310 may be aspherical. The image-side surface of the first lens 310 may be aspherical.

The second lens 320 may have negative refractive power. An object-side surface of the second lens 320 may be convex in the paraxial region. An image-side surface of the second lens 320 may be concave in the paraxial region. The object-side surface of the second lens 320 may be aspherical. The image-side surface of the second lens 320 may be aspherical.

The third lens 330 may have positive refractive power. An object-side surface of the third lens 330 may be convex in the paraxial region. An image-side surface of the third lens 330 may be concave in the paraxial region. The object-side surface of the third lens 330 may be aspherical. The image-side surface of the third lens 330 may be aspherical.

The fourth lens 340 may have negative refractive power. An object-side surface of the fourth lens 340 may be convex in the paraxial region. An image-side surface of the fourth lens 340 may be concave in the paraxial region. The object-side surface of the fourth lens 340 may be aspherical. The image-side surface of the fourth lens 340 may be aspherical.

The fifth lens 350 may have negative refractive power. An object-side surface of the fifth lens 350 may be convex in the paraxial region. An image-side surface of the fifth lens 350 may be concave in the paraxial region. The object-side surface of the fifth lens 350 may be aspherical. The image-side surface of the fifth lens 350 may be aspherical.

The sixth lens 360 may have positive refractive power. An object-side surface of the sixth lens 360 may be convex in the paraxial region. An image-side surface of the sixth lens 360 may be convex in the paraxial region. The object-side surface of the sixth lens 360 may be aspherical. The image-side surface of the sixth lens 360 may be aspherical.

The seventh lens 370 may have negative refractive power. An object-side surface of the seventh lens 370 may be convex in the paraxial region. An image-side surface of the seventh lens 370 may be concave in the paraxial region. The object-side surface of the seventh lens 370 may be aspherical. The image-side surface of the seventh lens 370 may be aspherical.

The object-side surface of the first lens 310 may include an inflection point. The image-side surface of the first lens 310 may include an inflection point. The image-side surface of the first lens 310 may be concave in the paraxial region and may be convex in the off-axis region.

The object-side surface of the fourth lens 340 may include an inflection point. The object-side surface of the fourth lens 340 may be convex in the paraxial region and may be concave in the off-axis region. The image-side surface of the fourth lens 340 may include an inflection point. The image-side surface of the fourth lens 340 may be concave in the paraxial region and may be convex in the off-axis region.

The object-side surface of the fifth lens 350 may include an inflection point. The object-side surface of the fifth lens 350 may be convex in the paraxial region and may be concave in the off-axis region. The image-side surface of the fifth lens 350 may include an inflection point. The image-side surface of the fifth lens 350 may be concave in the paraxial region and may be convex in the off-axis region.

The object-side surface of the sixth lens 360 may include an inflection point. The object-side surface of the sixth lens 360 may be convex in the paraxial region and may be concave in the off-axis region.

The object-side surface of the seventh lens 370 may include an inflection point. The object-side surface of the seventh lens 370 may be convex in the paraxial region and may be concave in the off-axis region. The image-side surface of the seventh lens 370 may include an inflection point. The image-side surface of the seventh lens 370 may be concave in the paraxial region and may be convex in the off-axis region.

At least one of the first lens 310 to the seventh lens 370 may be formed of glass. For example, the first lens 310 may be a glass lens.

In the optical imaging system 300, f1/f may be 1.167, v1−v2 may be 63.41, v1−v3 may be 25.82, v1−v4 may be 63.41, f2/f may be −4.816, f3/f may be 3.486, |f4/f| may be −6.801, |f5/f| may be −6.973, f6/f may be 1.121, f7/f may be −0.77, OAL/f may be 1.163, f1/f2 may be −0.242, f1/f3 may be 0.335, BFL/f may be 0.175, D1/f may be 0.038, OAL/imgH/2 may be 0.538, FOV*imgH/f may be 98.145, SAG42/OAL may be −0.053, SAG52/OAL may be −0.102, SAG62/OAL may be −0.126, and SAG72/OAL may be −0.161.

Table 5 represents optical and physical parameters of the optical imaging system 300. Table 6 illustrates aspherical data of the optical imaging system 300.

TABLE 5

| Surface | Radius | Thickness | Index | Abbe number |
|---|---|---|---|---|
| Object | Infinity | 1000 | | |
| 1 | Infinity | 0.000 | | |
| 2 | 1.86 | 0.757 | 1.497 | 81.6 |
| 3 | 4.94 | 0.179 | | |
| 4 | 6.34 | 0.220 | 1.680 | 18.2 |
| 5 | 4.45 | 0.106 | | |
| 6 | 6.65 | 0.311 | 1.535 | 55.7 |
| 7 | 26.25 | 0.331 | | |
| 8 | 200.82 | 0.220 | 1.680 | 18.2 |
| 9 | 19.96 | 0.299 | | |
| 10 | 5.67 | 0.221 | 1.635 | 24.0 |
| 11 | 4.40 | 0.330 | | |
| 12 | 6.16 | 0.415 | 1.567 | 37.4 |
| 13 | −5.80 | 0.932 | | |
| 14 | 18.78 | 0.350 | 1.535 | 55.7 |
| 15 | 1.76 | 0.200 | | |
| 16 | | 0.110 | 1.517 | 64.2 |
| 17 | | 0.497 | | |
| Image | | 0.020 | | |

TABLE 6

| Surface # | 2 | 3 | 4 | 5 | 6 | 7 | 8 |
|---|---|---|---|---|---|---|---|
| Radius(Y) | 1.8573E+00 | 4.9358E+00 | 6.3391E+00 | 4.4517E+00 | 6.6506E+00 | 2.6255E+01 | 2.0082E+02 |
| conic constant(K) | −1.6747E+00 | −2.0561E+01 | 1.6836E+01 | 1.2145E+01 | −2.1832E+00 | −5.4152E+01 | −6.4791E+01 |
| 4th order coefficient (A) | 2.045E−02 | −4.241E−03 | −3.121E−02 | −2.577E−03 | −4.065E−03 | −4.079E−02 | −1.453E−01 |
| 6th order coefficient (B) | 5.850E−02 | 1.691E−02 | −1.403E−01 | −6.949E−01 | −4.517E−01 | 3.813E−01 | 1.071E+00 |
| 8th order coefficient (C) | −3.221E−01 | −1.596E−02 | 2.407E+00 | 8.512E+00 | 5.790E+00 | −3.936E+00 | −1.028E+01 |
| 10th order coefficient (D) | 1.088E+00 | −3.607E−01 | −1.691E+01 | −6.358E+01 | −4.457E+01 | 2.542E+01 | 6.417E+01 |
| 12th order coefficient (E) | −2.456E+00 | 1.676E+00 | 7.179E+01 | 3.192E+02 | 2.270E+02 | −1.087E+02 | −2.711E+02 |
| 14th order coefficient (F) | 3.826E+00 | −3.844E+00 | −2.014E+02 | −1.112E+03 | −7.987E+02 | 3.187E+02 | 7.999E+02 |
| 16th order coefficient (G) | −4.208E+00 | 5.497E+00 | 3.907E+02 | 2.738E+03 | 1.994E+03 | −6.553E+02 | −1.687E+03 |
| 18th order coefficient (H) | 3.309E+00 | −5.278E+00 | −5.367E+02 | −4.824E+03 | −3.577E+03 | 9.548E+02 | 2.574E+03 |
| 20th order coefficient (J) | −1.865E+00 | 3.503E+00 | 5.263E+02 | 6.091E+03 | 4.621E+03 | −9.854E+02 | −2.846E+03 |
| 22th order coefficient (L) | 7.462E−01 | −1.613E+00 | −3.661E+02 | −5.461E+03 | −4.256E+03 | 7.102E+02 | 2.257E+03 |
| 24th order coefficient (M) | −2.068E−01 | 5.056E−01 | 1.765E+02 | 3.391E+03 | 2.723E+03 | −3.459E+02 | −1.251E+03 |
| 26th order coefficient (N) | 3.771E−02 | −1.029E−01 | −5.606E+01 | −1.386E+03 | −1.149E+03 | 1.068E+02 | 4.601E+02 |
| 28th order coefficient (O) | −4.068E−03 | 1.224E−02 | 1.056E+01 | 3.351E+02 | 2.871E+02 | −1.836E+01 | −1.008E+02 |
| 30th order coefficient (p) | 1.966E−04 | −6.433E−04 | −8.926E−01 | −3.631E+01 | −3.218E+01 | 1.262E+00 | 9.960E+00 |

| Surface # | 9 | 10 | 11 | 12 | 13 | 14 | 15 |
|---|---|---|---|---|---|---|---|
| Radius(Y) | 1.9957E+01 | 5.6727E+00 | 4.4047E+00 | 6.1550E+00 | −5.7984E+00 | 1.8781E+01 | 1.7607E+00 |
| conic constant(K) | 2.6891E+01 | −3.3405E+01 | −1.2638E+00 | 5.3891E+00 | −8.2871E+00 | −1.2494E+00 | −5.7264E+00 |
| 4th order coefficient (A) | −1.245E−01 | −1.890E−01 | −2.147E−01 | 2.537E−02 | 6.962E−02 | −2.042E−01 | −1.309E−01 |
| 6th order coefficient (B) | 4.732E−01 | 1.191E−01 | −2.049E−02 | −1.322E−01 | −3.024E−02 | 9.211E−02 | 7.859E−02 |
| 8th order coefficient (C) | −3.143E+00 | −3.537E−01 | 3.900E−01 | 2.402E−01 | −1.071E−02 | −1.487E−02 | −3.261E−02 |
| 10th order coefficient (D) | 1.501E+01 | 2.353E+00 | −6.258E−01 | −3.359E−01 | 5.998E−02 | −4.734E−03 | 9.189E−03 |
| 12th order coefficient (E) | −4.922E+01 | −8.102E+00 | 1.509E−01 | 3.531E−01 | −8.787E−02 | 3.582E−03 | −1.624E−03 |
| 14th order coefficient (F) | 1.124E+02 | 1.673E+01 | 1.050E+00 | −2.855E−01 | 7.136E−02 | −1.093E−03 | 1.336E−04 |
| 16th order coefficient (G) | −1.827E+02 | −2.290E+01 | −2.071E+00 | 1.753E−01 | −3.713E−02 | 2.080E−04 | 9.647E−06 |
| 18th order coefficient (H) | 2.139E+02 | 2.174E+01 | 2.107E+00 | −7.995E−02 | 1.314E−02 | −2.714E−05 | −4.219E−06 |
| 20th order coefficient (J) | −1.810E+02 | −1.455E+01 | −1.371E+00 | 2.647E−02 | −3.237E−03 | 2.504E−06 | 5.790E−07 |
| 22th order coefficient (L) | 1.097E+02 | 6.835E+00 | 5.990E−01 | −6.212E−03 | 5.560E−04 | −1.638E−07 | −4.649E−08 |

TABLE 6-continued

| | | | | | | | |
|---|---|---|---|---|---|---|---|
| 24th order coefficient (M) | −4.639E+01 | −2.201E+00 | −1.751E−01 | 1.001E−03 | −6.529E−05 | 7.455E−09 | 2.374E−09 |
| 26th order coefficient (N) | 1.300E+01 | 4.612E−01 | 3.288E−02 | −1.051E−04 | 4.995E−06 | −2.250E−10 | −7.614E−11 |
| 28th order coefficient (O) | −2.171E+00 | −5.640E−02 | −3.583E−03 | 6.467E−06 | −2.239E−07 | 4.051E−12 | 1.405E−12 |
| 30th order coefficient (p) | 1.635E−01 | 3.037E−03 | 1.723E−04 | −1.769E−07 | 4.455E−09 | −3.298E−14 | −1.141E−14 |

An optical imaging system 400 according to a fourth example will hereinafter be described with reference to FIGS. 4A and 4B.

Figure 4A:
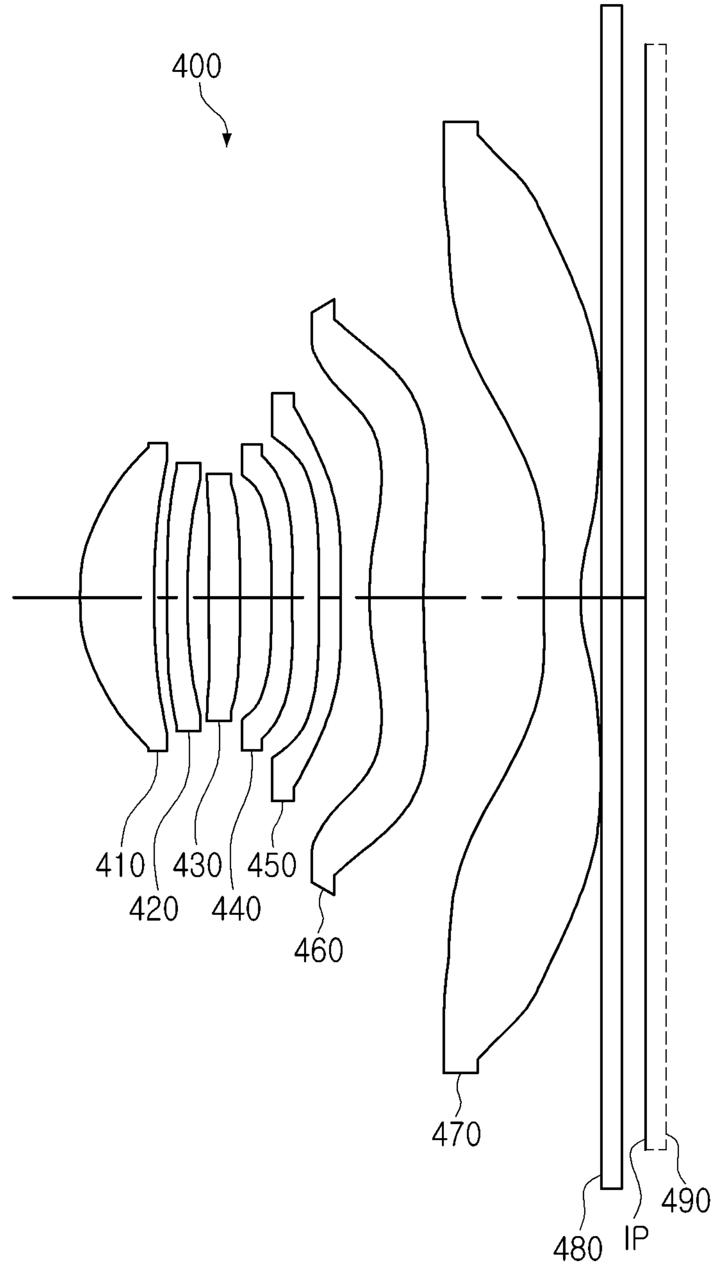
FIG. 4A is a cross-sectional view illustrating an optical imaging system according to a fourth example.
Figure 4B:
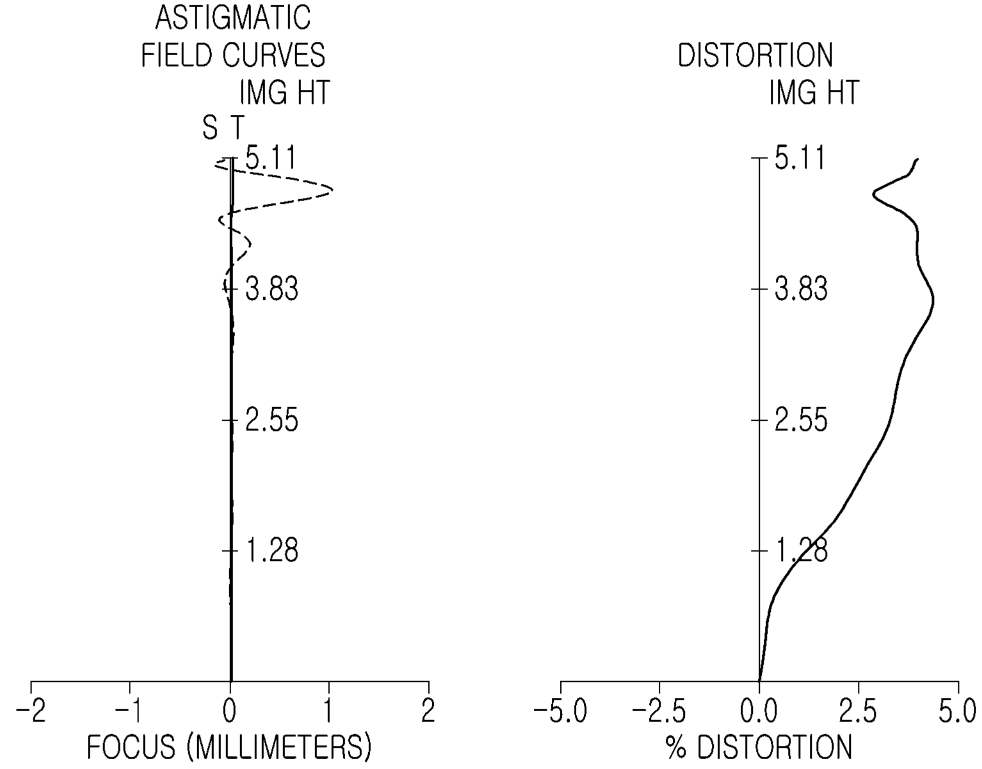
FIG. 4B is graphs representing aberration characteristics of the optical imaging system according to the fourth example.

FIG. 4A is a cross-sectional view illustrating the optical imaging system 400 according to the fourth example. FIG. 4B is graphs representing aberration characteristics of the optical imaging system 400.

The optical imaging system 400 may include a first lens 410, a second lens 420, a third lens 430, a fourth lens 440, a fifth lens 450, a sixth lens 460, a seventh lens 470, and an image sensor 490 sequentially arranged from an object side toward a image side. The optical imaging system 400 may include an IR filter 480 disposed between the seventh lens 470 and the image sensor 490.

The first lens 410 may have positive refractive power. An object-side surface of the first lens 410 may be convex in the paraxial region. An image-side surface of the first lens 410 may be concave in the paraxial region. The object-side surface of the first lens 410 may be aspherical. The image-side surface of the first lens 410 may be aspherical.

The second lens 420 may have negative refractive power. An object-side surface of the second lens 420 may be convex in the paraxial region. An image-side surface of the second lens 420 may be concave in the paraxial region. The object-side surface of the second lens 420 may be aspherical. The image-side surface of the second lens 420 may be aspherical.

The third lens 430 may have positive refractive power. An object-side surface of the third lens 430 may be convex in the paraxial region. An image-side surface of the third lens 430 may be convex in the paraxial region. The object-side surface of the third lens 430 may be aspherical. The image-side surface of the third lens 430 may be aspherical.

The fourth lens 440 may have negative refractive power. An object-side surface of the fourth lens 440 may be concave in the paraxial region. An image-side surface of the fourth lens 440 may be concave in the paraxial region. The object-side surface of the fourth lens 440 may be aspherical. The image-side surface of the fourth lens 440 may be aspherical.

The fifth lens 450 may have negative refractive power. An object-side surface of the fifth lens 450 may be convex in the paraxial region. An image-side surface of the fifth lens 450 may be concave in the paraxial region. The object-side surface of the fifth lens 450 may be aspherical. The image-side surface of the fifth lens 450 may be aspherical.

The sixth lens 460 may have positive refractive power. An object-side surface of the sixth lens 460 may be convex in the paraxial region. An image-side surface of the sixth lens 460 may be concave in the paraxial region. The object-side surface of the sixth lens 460 may be aspherical. The image-side surface of the sixth lens 460 may be aspherical.

The seventh lens 470 may have negative refractive power. An object-side surface of the seventh lens 470 may be convex in the paraxial region. An image-side surface of the seventh lens 470 may be concave in the paraxial region. The object-side surface of the seventh lens 470 may be aspherical. The image-side surface of the seventh lens 470 may be aspherical.

The object-side surface of the third lens 430 may include an inflection point. The object-side surface of the third lens 430 may be convex in the paraxial region and may be concave in the off-axis region.

The image-side surface of the fourth lens 440 may include an inflection point. The image-side surface of the fourth lens 440 may be concave in the paraxial region and may be convex in the off-axis region.

The object-side surface of the fifth lens 450 may include an inflection point. The object-side surface of the fifth lens 450 may be convex in the paraxial region and may be concave in the off-axis region. The image-side surface of the fifth lens 450 may include an inflection point. The image-side surface of the fifth lens 450 may be concave in the paraxial region and may be convex in the off-axis region.

The object-side surface of the sixth lens 460 may include an inflection point. The object-side surface of the sixth lens 460 may be convex in the paraxial region and may be concave in the off-axis region. The image-side surface of the sixth lens 460 may include an inflection point. The image-side surface of the sixth lens 460 may be concave in the paraxial region and may be convex in the off-axis region.

The object-side surface of the seventh lens 470 may include an inflection point. The object-side surface of the seventh lens 470 may be convex in the paraxial region and may be concave in the off-axis region. The image-side surface of the seventh lens 470 may include an inflection point. The image-side surface of the seventh lens 470 may be concave in the paraxial region and may be convex in the off-axis region.

At least one of the first lens 410 to the seventh lens 470 may be formed of glass. For example, the first lens 410 may be a glass lens.

In the optical imaging system 400, f1/f may be 1.113, v1−v2 may be 62.32, v1−v3 may be 25.57, v1−v4 may be 62.32, f2/f may be −7.017, f3/f may be 4.201, |f4/f| may be −4.848, |f5/f| may be −3.313, f6/f may be 1.171, f7/f may be −0.82, OAL/f may be 1.178, f1/f2 may be −0.159, f1/f3 may be 0.265, BFL/f may be 0.135, D1/f may be 0.027, OAL/imgH/2 may be 0.538, FOV*imgH/f may be 101.156, SAG42/OAL may be −0.055, SAG52/OAL may be −0.083, SAG62/OAL may be −0.159, and SAG72/OAL may be −0.18.

Table 7 represents optical and physical parameters of the optical imaging system 400. Table 8 illustrates aspherical data of the optical imaging system 400.

TABLE 7

| Surface | Radius | Thickness | Index | Abbe number |
|---|---|---|---|---|
| Object | Infinity | 1000 | | |
| 1 | Infinity | 0.000 | | |

TABLE 7-continued

| Surface | Radius | Thickness | Index | Abbe number |
|---|---|---|---|---|
| 2 | 1.82 | 0.723 | 1.497 | 81.6 |
| 3 | 5.32 | 0.126 | | |
| 4 | 7.74 | 0.200 | 1.671 | 19.2 |
| 5 | 5.68 | 0.209 | | |
| 6 | 25.97 | 0.310 | 1.544 | 56.0 |
| 7 | −18.18 | 0.302 | | |
| 8 | −18.38 | 0.200 | 1.671 | 19.2 |
| 9 | 94.05 | 0.256 | | |
| 10 | 32.30 | 0.208 | 1.614 | 25.9 |

TABLE 7-continued

| Surface | Radius | Thickness | Index | Abbe number |
|---|---|---|---|---|
| 11 | 7.38 | 0.281 | | |
| 12 | 2.79 | 0.537 | 1.567 | 37.4 |
| 13 | 24.34 | 1.169 | | |
| 14 | 7.22 | 0.350 | 1.535 | 55.7 |
| 15 | 1.58 | 0.200 | | |
| 16 | | 0.210 | 1.517 | 64.2 |
| 17 | | 0.237 | | |
| Image | | −0.018 | | |

TABLE 8

| Surface # | 2 | 3 | 4 | 5 | 6 | 7 | 8 |
|---|---|---|---|---|---|---|---|
| Radius(Y) | 1.8219E+00 | 5.3219E+00 | 7.7400E+00 | 5.6822E+00 | 2.5971E+01 | −1.8181E+01 | −1.8385E+01 |
| conic constant(K) | −5.9270E−01 | −7.9267E+00 | 1.9546E+00 | 3.0408E+00 | 9.4206E+01 | −1.6435E+01 | 9.3143E+01 |
| 4th order coefficient (A) | 1.291E−02 | −7.303E−03 | −9.194E−03 | −4.517E−02 | −3.945E−02 | −1.772E−02 | −6.353E−02 |
| 6th order coefficient (B) | −7.102E−03 | 8.196E−04 | −2.499E−01 | 7.940E−01 | 3.922E−01 | −2.055E−01 | −2.833E−01 |
| 8th order coefficient (C) | 3.379E−02 | −3.320E−04 | 2.695E+00 | −8.966E+00 | −4.628E+00 | 2.365E+00 | 3.303E+00 |
| 10th order coefficient (D) | −6.394E−02 | 2.156E−03 | −1.654E+01 | 6.117E+01 | 3.515E+01 | −1.725E+01 | −2.378E+01 |
| 12th order coefficient (E) | 7.327E−02 | −4.224E−03 | 6.555E+01 | −2.714E+02 | −1.817E+02 | 8.215E+01 | 1.095E+02 |
| 14th order coefficient (F) | −5.234E−02 | 3.212E−03 | −1.762E+02 | 8.271E+02 | 6.555E+02 | −2.674E+02 | −3.446E+02 |
| 16th order coefficient (G) | 2.290E−02 | −1.249E−03 | 3.317E+02 | −1.787E+03 | −1.679E+03 | 6.132E+02 | 7.674E+02 |
| 18th order coefficient (H) | −5.708E−03 | 2.838E−04 | −4.452E+02 | 2.782E+03 | 3.084E+03 | −1.007E+03 | −1.228E+03 |
| 20th order coefficient (J) | 6.151E−04 | −2.979E−05 | 4.287E+02 | −3.138E+03 | −4.061E+03 | 1.192E+03 | 1.418E+03 |
| 22th order coefficient (L) | 0.000E+00 | 0.000E+00 | −2.938E+02 | 2.542E+03 | 3.795E+03 | −1.008E+03 | −1.169E+03 |
| 24th order coefficient (M) | 0.000E+00 | 0.000E+00 | 1.399E+02 | −1.442E+03 | −2.454E+03 | 5.951E+02 | 6.707E+02 |
| 26th order coefficient (N) | 0.000E+00 | 0.000E+00 | −4.399E+01 | 5.449E+02 | 1.043E+03 | −2.328E+02 | −2.546E+02 |
| 28th order coefficient (O) | 0.000E+00 | 0.000E+00 | 8.217E+00 | −1.232E+02 | −2.617E+02 | 5.423E+01 | 5.742E+01 |
| 30th order coefficient (p) | 0.000E+00 | 0.000E+00 | −6.903E−01 | 1.262E+01 | 2.937E+01 | −5.697E+00 | −5.828E+00 |

| Surface # | 9 | 10 | 11 | 12 | 13 | 14 | 15 |
|---|---|---|---|---|---|---|---|
| Radius(Y) | 9.4047E+01 | 3.2303E+01 | 7.3788E+00 | 2.7882E+00 | 2.4337E+01 | 7.2170E+00 | 1.5752E+00 |
| conic constant(K) | −9.9000E+01 | −7.6466E+01 | −6.5430E+01 | −1.7250E+01 | 1.2502E+01 | −7.1003E+00 | −7.6778E+00 |
| 4th order coefficient (A) | −9.214E−02 | −2.908E−01 | −3.621E−01 | −3.946E−02 | 7.403E−03 | −2.721E−01 | −1.106E−01 |
| 6th order coefficient (B) | 1.537E−01 | 8.767E−01 | 8.263E−01 | 1.138E−01 | 4.093E−02 | 2.155E−01 | 6.818E−02 |
| 8th order coefficient (C) | −1.672E−01 | −2.607E+00 | −1.833E+00 | −2.539E−01 | −8.917E−02 | −1.225E−01 | −2.167E−02 |
| 10th order coefficient (D) | −1.814E+00 | 6.778E+00 | 3.274E+00 | 3.213E−01 | 8.411E−02 | 4.799E−02 | 1.860E−03 |
| 12th order coefficient (E) | 1.020E+01 | −1.456E+01 | −4.550E+00 | −2.779E−01 | −5.380E−02 | −1.280E−02 | 1.070E−03 |
| 14th order coefficient (F) | −2.838E+01 | 2.447E+01 | 4.887E+00 | 1.709E−01 | 2.598E−02 | 2.374E−03 | −4.652E−04 |
| 16th order coefficient (G) | 5.084E+01 | −3.104E+01 | −4.014E+00 | −7.528E−02 | −9.714E−03 | −3.121E−04 | 9.510E−05 |
| 18th order coefficient (H) | −6.297E+01 | 2.915E+01 | 2.486E+00 | 2.375E−02 | 2.795E−03 | 2.943E−05 | −1.220E−05 |
| 20th order coefficient (J) | 5.517E+01 | −2.000E+01 | −1.140E+00 | −5.341E−03 | −6.085E−04 | −1.990E−06 | 1.054E−06 |
| 22th order coefficient (L) | −3.418E+01 | 9.849E+00 | 3.789E−01 | 8.462E−04 | 9.764E−05 | 9.532E−08 | −6.242E−08 |
| 24th order coefficient (M) | 1.466E+01 | −3.379E+00 | −8.808E−02 | −9.215E−05 | −1.112E−05 | −3.133E−09 | 2.506E−09 |
| 26th order coefficient (N) | −4.140E+00 | 7.655E−01 | 1.354E−02 | 6.563E−06 | 8.443E−07 | 6.653E−11 | −6.524E−11 |

TABLE 8-continued

| | | | | | | | |
|---|---|---|---|---|---|---|---|
| 28th order coefficient (O) | 6.934E−01 | −1.027E−01 | −1.232E−03 | −2.753E−07 | −3.816E−08 | −8.075E−13 | 9.947E−13 |
| 30th order coefficient (p) | −5.214E−02 | 6.167E−03 | 5.021E−05 | 5.162E−09 | 7.727E−10 | 4.118E−15 | −6.747E−15 |

An optical imaging system 500 according to a fifth example will hereinafter be described with reference to FIGS. 5A and 5B.

Figure 5A:
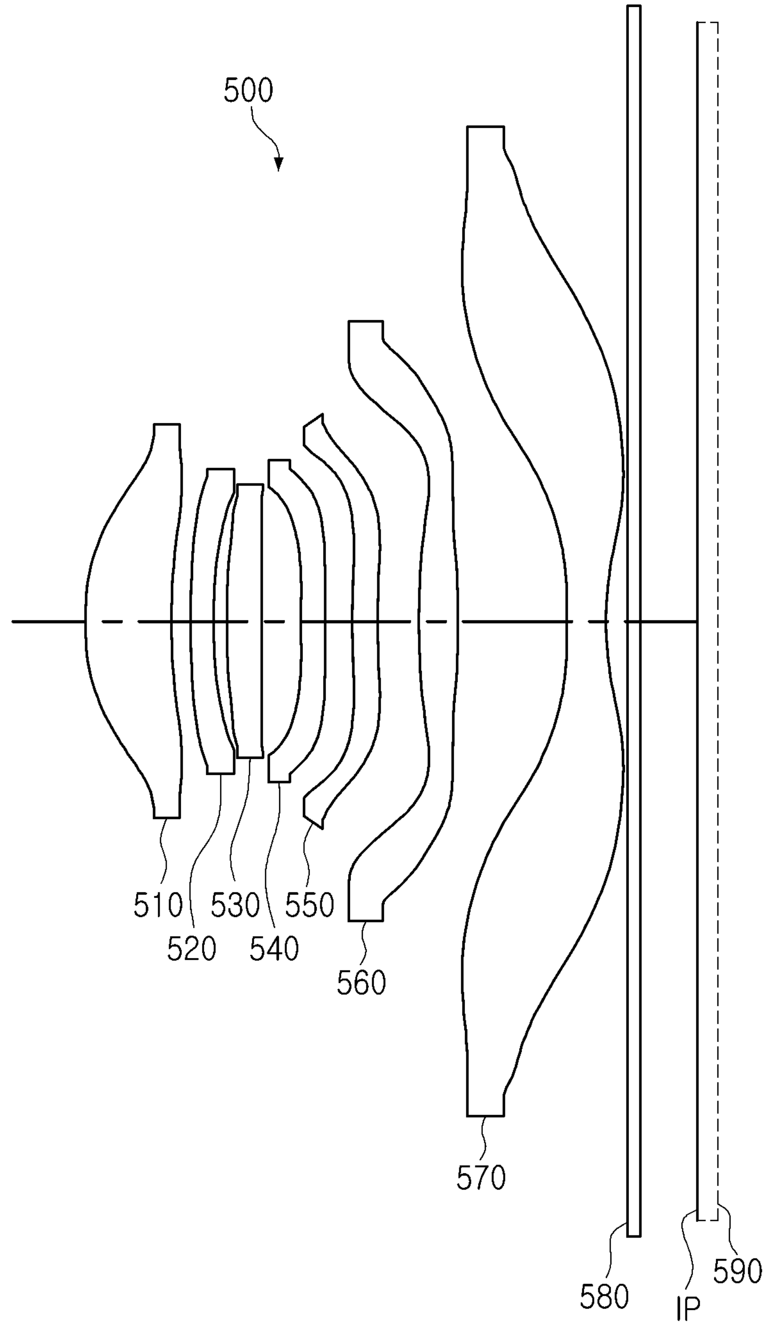
FIG. 5A is a cross-sectional view illustrating an optical imaging system according to a fifth example.
Figure 5B:
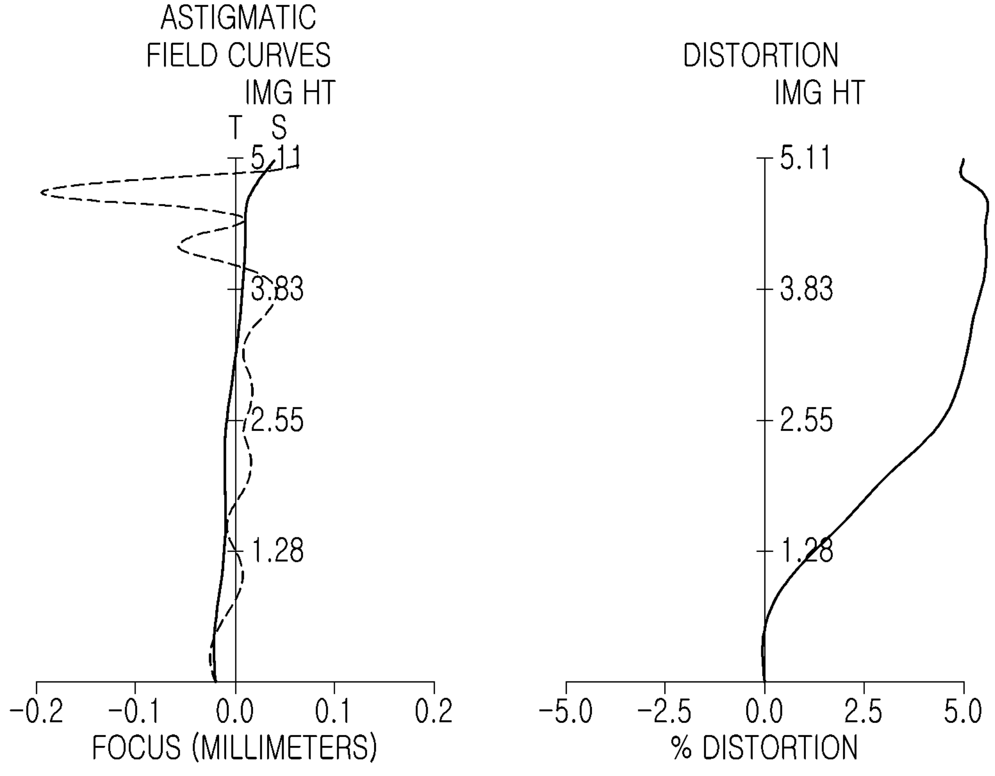
FIG. 5B is graphs representing aberration characteristics of the optical imaging system according to the fifth example.

FIG. 5A is a cross-sectional view illustrating the optical imaging system 500 according to the fifth example. FIG. 5B is graphs representing aberration characteristics of the optical imaging system 500.

The optical imaging system 500 may include a first lens 510, a second lens 520, a third lens 530, a fourth lens 540, a fifth lens 550, a sixth lens 560, a seventh lens 570, and an image sensor 590 sequentially arranged from an object side toward a image side. The optical imaging system 500 may include an IR filter 580 disposed between the seventh lens 570 and the image sensor 590.

The first lens 510 may have positive refractive power. An object-side surface of the first lens 510 may be convex in the paraxial region. An image-side surface of the first lens 510 may be concave in the paraxial region. The object-side surface of the first lens 510 may be aspherical. The image-side surface of the first lens 510 may be aspherical.

The second lens 520 may have negative refractive power. An object-side surface of the second lens 520 may be convex in the paraxial region. An image-side surface of the second lens 520 may be concave in the paraxial region. The object-side surface of the second lens 520 may be aspherical. The image-side surface of the second lens 520 may be aspherical.

The third lens 530 may have positive refractive power. An object-side surface of the third lens 530 may be convex in the paraxial region. An image-side surface of the third lens 530 may be concave in the paraxial region. The object-side surface of the third lens 530 may be aspherical. The image-side surface of the third lens 530 may be aspherical.

The fourth lens 540 may have negative refractive power. An object-side surface of the fourth lens 540 may be concave in the paraxial region. An image-side surface of the fourth lens 540 may be concave in the paraxial region. The object-side surface of the fourth lens 540 may be aspherical. The image-side surface of the fourth lens 540 may be aspherical.

The fifth lens 550 may have positive refractive power. An object-side surface of the fifth lens 550 may be convex in the paraxial region. An image-side surface of the fifth lens 550 may be concave in the paraxial region. The object-side surface of the fifth lens 550 may be aspherical. The image-side surface of the fifth lens 550 may be aspherical.

The sixth lens 560 may have positive refractive power. An object-side surface of the sixth lens 560 may be convex in the paraxial region. An image-side surface of the sixth lens 560 may be convex in the paraxial region. The object-side surface of the sixth lens 560 may be aspherical. The image-side surface of the sixth lens 560 may be aspherical.

The seventh lens 570 may have negative refractive power. An object-side surface of the seventh lens 570 may be convex in the paraxial region. An image-side surface of the seventh lens 570 may be concave in the paraxial region. The object-side surface of the seventh lens 570 may be aspherical. The image-side surface of the seventh lens 570 may be aspherical.

The object-side surface of the first lens 510 may include an inflection point. The image-side surface of the first lens 510 may include an inflection point. The image-side surface of the first lens 510 may be concave in the paraxial region and may be convex in the off-axis region.

The image-side surface of the fourth lens 540 may include an inflection point. The image-side surface of the fourth lens 540 may be concave in the paraxial region and may be convex in the off-axis region.

The object-side surface of the fifth lens 550 may include an inflection point. The object-side surface of the fifth lens 550 may be convex in the paraxial region and may be concave in the off-axis region. The image-side surface of the fifth lens 550 may include an inflection point. The image-side surface of the fifth lens 550 may be concave in the paraxial region and may be convex in the off-axis region.

The object-side surface of the sixth lens 560 may include an inflection point. The object-side surface of the sixth lens 560 may be convex in the paraxial region and may be concave in the off-axis region.

The object-side surface of the seventh lens 570 may include an inflection point. The object-side surface of the seventh lens 570 may be convex in the paraxial region and may be concave in the off-axis region. The image-side surface of the seventh lens 570 may include an inflection point. The image-side surface of the seventh lens 570 may be concave in the paraxial region and may be convex in the off-axis region.

At least one of the first lens 510 to the seventh lens 570 may be formed of glass. For example, the first lens 510 may be a glass lens.

In the optical imaging system 500, f1/f may be 1.153, v1−v2 may be 63.41, v1−v3 may be 25.82, v1−v4 may be 63.41, f2/f may be −4.618, f3/f may be 3.413, |f4/f| may be −3.306, |f5/f| may be 33.43, f6/f may be 1.115, f7/f may be −0.711, OAL/f may be 1.153, f1/f2 may be −0.25, f1/f3 may be 0.338, BFL/f may be 0.173, D1/f may be 0.035, OAL/imgH/2 may be 0.538, FOV*imgH/f may be 96.787, SAG42/OAL may be −0.058, SAG52/OAL may be −0.088, SAG62/OAL may be −0.124, and SAG72/OAL may be −0.165.

Table 9 represents optical and physical parameters of the optical imaging system 500. Table 10 illustrates aspherical data of the optical imaging system 500.

TABLE 9

| Surface | Radius | Thickness | Index | Abbe number |
|---|---|---|---|---|
| Object | Infinity | 1000 | | |
| 1 | Infinity | 0.000 | | |
| 2 | 1.87 | 0.776 | 1.497 | 81.6 |
| 3 | 5.04 | 0.168 | | |
| 4 | 6.44 | 0.220 | 1.680 | 18.2 |
| 5 | 4.46 | 0.107 | | |
| 6 | 6.49 | 0.311 | 1.535 | 55.7 |
| 7 | 24.75 | 0.356 | | |
| 8 | −23.88 | 0.220 | 1.680 | 18.2 |
| 9 | 20.01 | 0.235 | | |
| 10 | 3.51 | 0.231 | 1.614 | 25.9 |
| 11 | 3.55 | 0.376 | | |

TABLE 9-continued

| Surface | Radius | Thickness | Index | Abbe number |
|---|---|---|---|---|
| 12 | 6.36 | 0.353 | 1.567 | 37.4 |
| 13 | −5.70 | 0.966 | | |
| 14 | 20.24 | 0.355 | 1.535 | 55.7 |
| 15 | 1.66 | 0.200 | | |
| 16 | | 0.110 | 1.517 | 64.2 |
| 17 | | 0.497 | | |
| Image | | 0.020 | | |

TABLE 10

| Surface # | 2 | 3 | 4 | 5 | 6 | 7 | 8 |
|---|---|---|---|---|---|---|---|
| Radius(Y) | 1.8662E+00 | 5.0363E+00 | 6.4442E+00 | 4.4609E+00 | 6.4889E+00 | 2.4753E+01 | −2.3878E+01 |
| conic constant(K) | −1.6129E+00 | −2.1156E+01 | 1.6338E+01 | 1.2101E+01 | −4.4665E+00 | −6.3843E+01 | −4.6178E+01 |
| 4th order coefficient (A) | 1.206E−02 | −1.628E−02 | −5.108E−02 | −2.847E−02 | −2.680E−03 | −6.456E−02 | −2.373E−01 |
| 6th order coefficient (B) | 1.106E−01 | 1.770E−01 | 2.118E−01 | 2.419E−02 | −5.921E−01 | 7.029E−01 | 2.052E+00 |
| 8th order coefficient (C) | −5.029E−01 | −1.063E+00 | −8.691E−01 | −5.559E−01 | 8.663E+00 | −6.544E+00 | −1.864E+01 |
| 10th order coefficient (D) | 1.395E+00 | 3.810E+00 | 1.897E+00 | 2.530E+00 | −7.210E+01 | 3.997E+01 | 1.147E+02 |
| 12th order coefficient (E) | −2.520E+00 | −9.175E+00 | −5.201E−02 | 6.011E+00 | 3.809E+02 | −1.675E+02 | −4.875E+02 |
| 14th order coefficient (F) | 3.051E+00 | 1.548E+01 | −1.156E+01 | −9.022E+01 | −1.352E+03 | 4.955E+02 | 1.463E+03 |
| 16th order coefficient (G) | −2.500E+00 | −1.876E+01 | 3.507E+01 | 3.728E+02 | 3.343E+03 | −1.054E+03 | −3.155E+03 |
| 18th order coefficient (H) | 1.362E+00 | 1.651E+01 | −5.806E+01 | −8.754E+02 | −5.868E+03 | 1.627E+03 | 4.935E+03 |
| 20th order coefficient (J) | −4.583E−01 | −1.055E+01 | 6.236E+01 | 1.327E+03 | 7.356E+03 | −1.824E+03 | −5.597E+03 |
| 22th order coefficient (L) | 6.942E−02 | 4.842E+00 | −4.537E+01 | −1.348E+03 | −6.541E+03 | 1.470E+03 | 4.553E+03 |
| 24th order coefficient (M) | 1.028E−02 | −1.552E+00 | 2.230E+01 | 9.160E+02 | 4.028E+03 | −8.288E+02 | −2.587E+03 |
| 26th order coefficient (N) | −6.964E−03 | 3.296E−01 | −7.120E+00 | −4.003E+02 | −1.633E+03 | 3.106E+02 | 9.742E+02 |
| 28th order coefficient (O) | 1.275E−03 | −4.164E−02 | 1.336E+00 | 1.019E+02 | 3.920E+02 | −6.953E+01 | −2.184E+02 |
| 30th order coefficient (p) | −8.597E−05 | 2.367E−03 | −1.121E−01 | −1.150E+01 | −4.219E+01 | 7.037E+00 | 2.205E+01 |

| Surface # | 9 | 10 | 11 | 12 | 13 | 14 | 15 |
|---|---|---|---|---|---|---|---|
| Radius(Y) | 2.0013E+01 | 3.5120E+00 | 3.5497E+00 | 6.3596E+00 | −5.7034E+00 | 2.0244E+01 | 1.6619E+00 |
| conic constant(K) | −1.3039E+01 | −2.7706E+01 | −1.0133E+00 | 5.4734E+00 | −9.2841E+00 | 2.8997E+00 | −8.0269E+00 |
| 4th order coefficient (A) | −2.505E−01 | −2.155E−01 | −2.697E−01 | 1.373E−02 | 4.911E−02 | −2.804E−01 | −1.501E−01 |
| 6th order coefficient (B) | 1.289E+00 | 3.551E−01 | 3.025E−01 | −8.937E−02 | 1.385E−02 | 2.193E−01 | 1.247E−01 |
| 8th order coefficient (C) | −7.557E+00 | −1.356E+00 | −9.818E−01 | 2.262E−01 | −4.812E−02 | −1.344E−01 | −7.411E−02 |
| 10th order coefficient (D) | 3.194E+01 | 5.378E+00 | 3.333E+00 | −4.852E−01 | 2.966E−02 | 6.300E−02 | 3.091E−02 |
| 12th order coefficient (E) | −9.533E+01 | −1.507E+01 | −7.846E+00 | 7.078E−01 | 1.550E−02 | −2.117E−02 | −9.102E−03 |
| 14th order coefficient (F) | 2.036E+02 | 2.899E+01 | 1.262E+01 | −6.970E−01 | −3.938E−02 | 5.060E−03 | 1.920E−03 |
| 16th order coefficient (G) | −3.159E+02 | −3.905E+01 | −1.417E+01 | 4.729E−01 | 3.127E−02 | −8.697E−04 | −2.942E−04 |
| 18th order coefficient (H) | 3.593E+02 | 3.731E+01 | 1.128E+01 | −2.251E−01 | −1.449E−02 | 1.084E−04 | 3.300E−05 |
| 20th order coefficient (J) | −2.992E+02 | −2.537E+01 | −6.381E+00 | 7.569E−02 | 4.405E−03 | −9.815E−06 | −2.707E−06 |
| 22th order coefficient (L) | 1.802E+02 | 1.218E+01 | 2.547E+00 | −1.784E−02 | −9.069E−04 | 6.386E−07 | 1.605E−07 |
| 24th order coefficient (M) | −7.639E+01 | −4.027E+00 | −6.996E−01 | 2.880E−03 | 1.258E−04 | −2.910E−08 | −6.696E−09 |
| 26th order coefficient (N) | 2.162E+01 | 8.709E−01 | 1.257E−01 | −3.029E−04 | −1.128E−05 | 8.813E−10 | 1.863E−10 |
| 28th order coefficient (O) | −3.664E+00 | −1.108E−01 | −1.328E−02 | 1.868E−05 | 5.913E−07 | −1.594E−11 | −3.102E−12 |
| 30th order coefficient (p) | 2.813E−01 | 6.274E−03 | 6.251E−04 | −5.125E−07 | −1.377E−08 | 1.303E−13 | 2.337E−14 |

An optical imaging system 600 according to a sixth example will hereinafter be described with reference to FIGS. 6A and 6B.

Figure 6A:
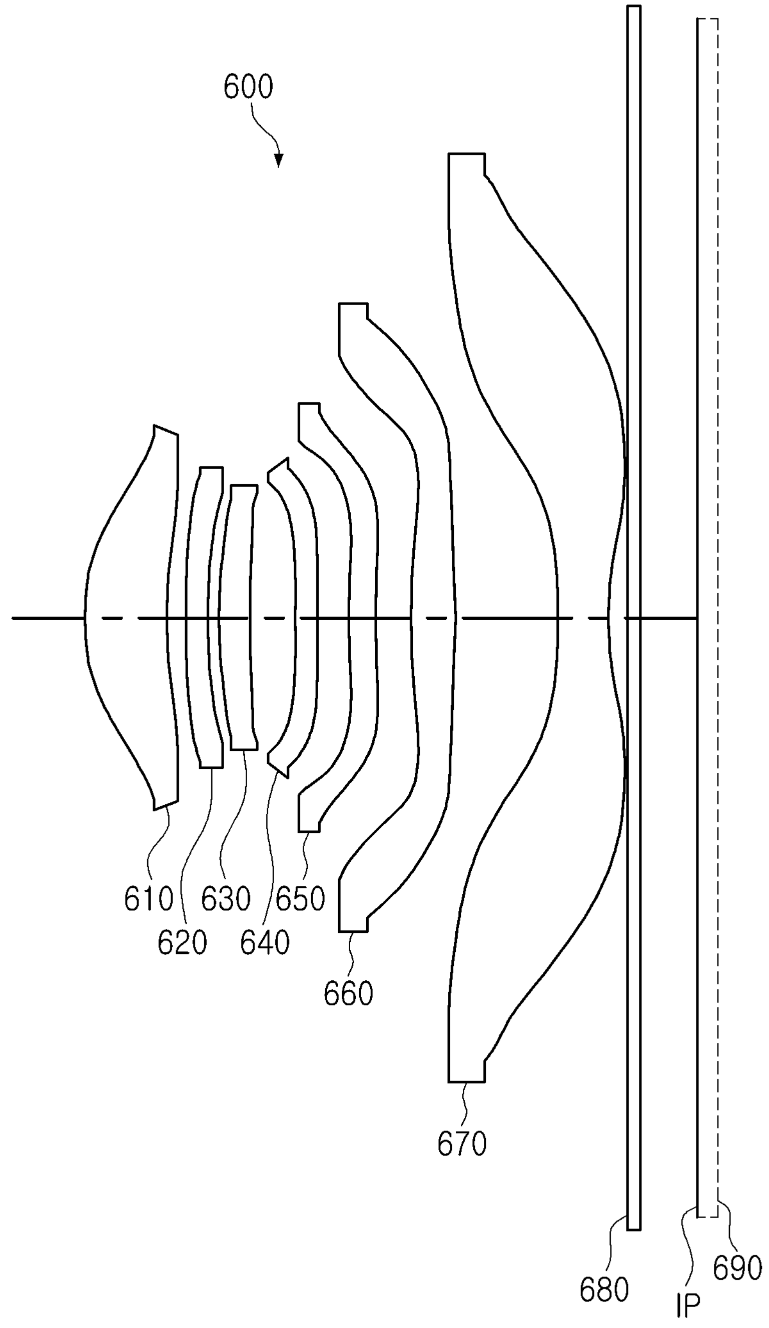
FIG. 6A is a cross-sectional view illustrating an optical imaging system according to a sixth example.
Figure 6B:
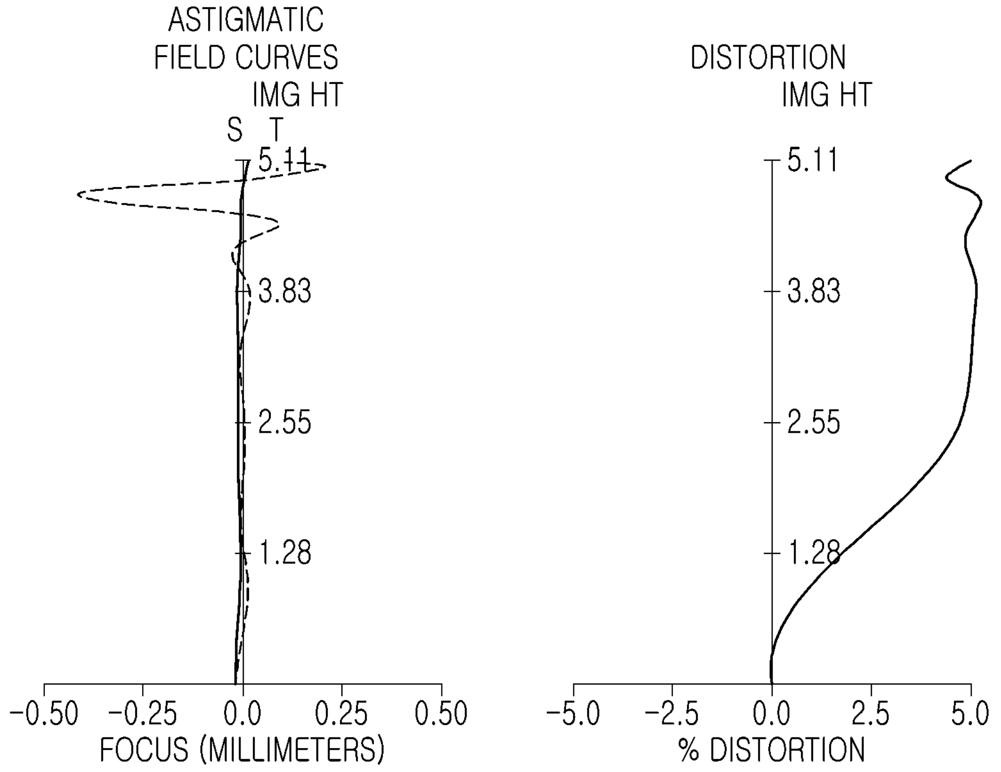
FIG. 6B is graphs representing aberration characteristics of the optical imaging system according to the sixth example.

FIG. 6A is a cross-sectional view illustrating the optical imaging system 600 according to the sixth example. FIG. 6B is graphs representing aberration characteristics of the optical imaging system 600.

The optical imaging system 600 may include a first lens 610, a second lens 620, a third lens 630, a fourth lens 640, a fifth lens 650, a sixth lens 660, a seventh lens 670, and an image sensor 690 sequentially arranged from an object side toward a image side. The optical imaging system 600 may include an IR filter 680 disposed between the seventh lens 670 and the image sensor 690.

The first lens 610 may have positive refractive power. An object-side surface of the first lens 610 may be convex in the paraxial region. An image-side surface of the first lens 610 may be concave in the paraxial region. The object-side surface of the first lens 610 may be aspherical. The image-side surface of the first lens 610 may be aspherical.

The second lens 620 may have negative refractive power. An object-side surface of the second lens 620 may be convex in the paraxial region. An image-side surface of the second lens 620 may be concave in the paraxial region. The object-side surface of the second lens 620 may be aspherical. The image-side surface of the second lens 620 may be aspherical.

The third lens 630 may have positive refractive power. An object-side surface of the third lens 630 may be convex in the paraxial region. An image-side surface of the third lens 630 may be concave in the paraxial region. The object-side surface of the third lens 630 may be aspherical. The image-side surface of the third lens 630 may be aspherical.

The fourth lens 640 may have negative refractive power. An object-side surface of the fourth lens 640 may be concave in the paraxial region. An image-side surface of the fourth lens 640 may be concave in the paraxial region. The object-side surface of the fourth lens 640 may be aspherical. The image-side surface of the fourth lens 640 may be aspherical.

The fifth lens 650 may have negative refractive power. An object-side surface of the fifth lens 650 may be convex in the paraxial region. An image-side surface of the fifth lens 650 may be concave in the paraxial region. The object-side surface of the fifth lens 650 may be aspherical. The image-side surface of the fifth lens 650 may be aspherical.

The sixth lens 660 may have positive refractive power. An object-side surface of the sixth lens 660 may be convex in the paraxial region. An image-side surface of the sixth lens 660 may be convex in the paraxial region. The object-side surface of the sixth lens 660 may be aspherical. The image-side surface of the sixth lens 660 may be aspherical.

The seventh lens 670 may have negative refractive power. An object-side surface of the seventh lens 670 may be convex in the paraxial region. An image-side surface of the seventh lens 670 may be concave in the paraxial region. The object-side surface of the seventh lens 670 may be aspherical. The image-side surface of the seventh lens 670 may be aspherical.

The object-side surface of the first lens 610 may include an inflection point. The image-side surface of the first lens 610 may include an inflection point. The image-side surface of the first lens 610 may be concave in the paraxial region and may be convex in the off-axis region.

The image-side surface of the fourth lens 640 may include an inflection point. The image-side surface of the fourth lens 640 may be concave in the paraxial region and may be convex in the off-axis region.

The object-side surface of the fifth lens 650 may include an inflection point. The object-side surface of the fifth lens 650 may be convex in the paraxial region and may be concave in the off-axis region. The image-side surface of the fifth lens 650 may include an inflection point. The image-side surface of the fifth lens 650 may be concave in the paraxial region and may be convex in the off-axis region.

The object-side surface of the sixth lens 660 may include an inflection point. The object-side surface of the sixth lens 660 may be convex in the paraxial region and may be concave in the off-axis region.

The object-side surface of the seventh lens 670 may include an inflection point. The object-side surface of the seventh lens 670 may be convex in the paraxial region and may be concave in the off-axis region. The image-side surface of the seventh lens 670 may include an inflection point. The image-side surface of the seventh lens 670 may be concave in the paraxial region and may be convex in the off-axis region.

At least one of the first lens 610 to the seventh lens 670 may be formed of glass. For example, the first lens 610 may be a glass lens.

In the optical imaging system 600, f1/f may be 1.149, v1−v2 may be 63.41, v1−v3 may be 25.82, v1−v4 may be 63.41, f2/f may be −4.019, f3/f may be 3.116, |f4/f| may be −5.644, |f5/f| may be −9.305, f6/f may be 1.171, f7/f may be −0.762, OAL/f may be 1.158, f1/f2 may be −0.286, f1/f3 may be 0.369, BFL/f may be 0.171, D1/f may be 0.034, OAL/imgH/2 may be 0.538, FOV*imgH/f may be 97.409, SAG42/OAL may be −0.048, SAG52/OAL may be −0.089, SAG62/OAL may be −0.146, and SAG72/OAL may be −0.201.

Table 11 represents optical and physical parameters of the optical imaging system 600. Table 12 illustrates aspherical data of the optical imaging system 600.

TABLE 11

| Surface | Radius | Thickness | Index | Abbe number |
|---|---|---|---|---|
| Object | Infinity | 1000 | | |
| 1 | Infinity | 0.000 | | |
| 2 | 1.88 | 0.735 | 1.497 | 81.6 |
| 3 | 5.26 | 0.164 | | |
| 4 | 7.05 | 0.200 | 1.680 | 18.2 |
| 5 | 4.54 | 0.104 | | |
| 6 | 5.06 | 0.282 | 1.535 | 55.7 |
| 7 | 13.61 | 0.397 | | |
| 8 | −76.43 | 0.200 | 1.680 | 18.2 |
| 9 | 24.39 | 0.276 | | |
| 10 | 4.04 | 0.240 | 1.614 | 25.9 |
| 11 | 3.44 | 0.323 | | |
| 12 | 6.25 | 0.409 | 1.567 | 37.4 |
| 13 | −6.30 | 0.897 | | |
| 14 | 20.55 | 0.460 | 1.535 | 55.7 |
| 15 | 1.76 | 0.200 | | |
| 16 | | 0.110 | 1.517 | 64.2 |
| 17 | | 0.484 | | |
| Image | | 0.020 | | |

TABLE 12

| Surface # | 2 | 3 | 4 | 5 | 6 | 7 | 8 |
|---|---|---|---|---|---|---|---|
| Radius(Y) | 1.8783E+00 | 5.2610E+00 | 7.0546E+00 | 4.5394E+00 | 5.0557E+00 | 1.3612E+01 | −7.6430E+01 |
| conic constant(K) | −1.6062E+00 | −1.7248E+01 | 1.5022E+01 | 1.1478E+01 | −7.2812E−01 | 9.4772E+01 | 9.9000E+01 |
| 4th order coefficient (A) | 1.582E−02 | −6.387E−03 | −3.593E−02 | −4.438E−02 | −1.730E−02 | −2.266E−02 | −1.051E−01 |
| 6th order coefficient (B) | 9.380E−02 | 3.771E−02 | 1.386E−01 | 2.747E−01 | −5.004E−01 | 8.400E−02 | 3.868E−01 |
| 8th order coefficient (C) | −5.197E−01 | −1.223E−01 | −1.076E+00 | −4.557E+00 | 9.786E+00 | −8.401E−01 | −3.133E+00 |
| 10th order coefficient (D) | 1.738E+00 | 6.179E−03 | 6.683E+00 | 4.151E+01 | −9.580E+01 | 6.239E+00 | 1.794E+01 |
| 12th order coefficient (E) | −3.808E+00 | 9.735E−01 | −2.753E+01 | −2.288E+02 | 5.767E+02 | −3.209E+01 | −7.376E+01 |
| 14th order coefficient (F) | 5.707E+00 | −3.223E+00 | 7.696E+01 | 8.371E+02 | −2.307E+03 | 1.148E+02 | 2.182E+02 |
| 16th order coefficient (G) | −6.015E+00 | 5.671E+00 | −1.502E+02 | −2.130E+03 | 6.400E+03 | −2.897E+02 | −4.671E+02 |
| 18th order coefficient (H) | 4.520E+00 | −6.399E+00 | 2.082E+02 | 3.855E+03 | −1.258E+04 | 5.216E+02 | 7.259E+02 |
| 20th order coefficient (J) | −2.428E+00 | 4.905E+00 | −2.062E+02 | −4.998E+03 | 1.765E+04 | −6.712E+02 | −8.159E+02 |
| 22th order coefficient (L) | 9.235E−01 | −2.594E+00 | 1.448E+02 | 4.607E+03 | −1.756E+04 | 6.107E+02 | 6.551E+02 |
| 24th order coefficient (M) | −2.424E−01 | 9.352E−01 | −7.042E+01 | −2.946E+03 | 1.210E+04 | −3.829E+02 | −3.657E+02 |
| 26th order coefficient (N) | 4.168E−02 | −2.200E−01 | 2.253E+01 | 1.242E+03 | −5.494E+03 | 1.569E+02 | 1.347E+02 |
| 28th order coefficient (O) | −4.218E−03 | 3.048E−02 | −4.266E+00 | −3.101E+02 | 1.477E+03 | −3.772E+01 | −2.943E+01 |
| 30th order coefficient (p) | 1.902E−04 | −1.889E−03 | 3.621E−01 | 3.474E+01 | −1.783E+02 | 4.023E+00 | 2.886E+00 |

| Surface # | 9 | 10 | 11 | 12 | 13 | 14 | 15 |
|---|---|---|---|---|---|---|---|
| Radius(Y) | 2.4391E+01 | 4.0439E+00 | 3.4439E+00 | 6.2521E+00 | −6.2984E+00 | 2.0551E+01 | 1.7612E+00 |
| conic constant(K) | 9.8540E+01 | −2.6070E+01 | −1.2719E+00 | 5.3484E+00 | −6.0469E+00 | −5.4303E+00 | −9.8993E+00 |
| 4th order coefficient (A) | −1.161E−01 | −2.086E−01 | −2.494E−01 | 2.325E−03 | 3.762E−02 | −2.463E−01 | −9.171E−02 |
| 6th order coefficient (B) | 2.180E−01 | 4.771E−01 | 3.455E−01 | −7.343E−02 | −6.767E−03 | 1.837E−01 | 5.969E−02 |
| 8th order coefficient (C) | −9.024E−01 | −1.896E+00 | −9.644E−01 | 2.439E−01 | 5.387E−02 | −1.117E−01 | −3.249E−02 |
| 10th order coefficient (D) | 3.171E+00 | 6.047E+00 | 2.296E+00 | −5.778E−01 | −1.532E−01 | 4.638E−02 | 1.382E−02 |
| 12th order coefficient (E) | −8.744E+00 | −1.369E+01 | −3.973E+00 | 8.344E−01 | 1.932E−01 | −1.151E−02 | −4.619E−03 |
| 14th order coefficient (F) | 1.842E+01 | 2.220E+01 | 5.044E+00 | −7.848E−01 | −1.445E−01 | 1.418E−03 | 1.202E−03 |
| 16th order coefficient (G) | −2.962E+01 | −2.617E+01 | −4.755E+00 | 5.050E−01 | 7.113E−02 | 3.274E−05 | −2.384E−04 |
| 18th order coefficient (H) | 3.600E+01 | 2.252E+01 | 3.329E+00 | −2.282E−01 | −2.418E−02 | −4.414E−05 | 3.529E−05 |
| 20th order coefficient (J) | −3.252E+01 | −1.408E+01 | −1.714E+00 | 7.301E−02 | 5.796E−03 | 8.176E−06 | −3.820E−06 |
| 22th order coefficient (L) | 2.130E+01 | 6.300E+00 | 6.364E−01 | −1.641E−02 | −9.793E−04 | −8.459E−07 | 2.956E−07 |
| 24th order coefficient (M) | −9.773E+00 | −1.957E+00 | −1.650E−01 | 2.531E−03 | 1.144E−04 | 5.513E−08 | −1.584E−08 |
| 26th order coefficient (N) | 2.964E+00 | 3.995E−01 | 2.824E−02 | −2.546E−04 | −8.792E−06 | −2.255E−09 | 5.564E−10 |
| 28th order coefficient (O) | −5.325E−01 | −4.799E−02 | −2.856E−03 | 1.503E−05 | 4.005E−07 | 5.317E−11 | −1.150E−11 |
| 30th order coefficient (p) | 4.283E−02 | 2.560E−03 | 1.290E−04 | −3.947E−07 | −8.190E−09 | −5.532E−13 | 1.060E−13 |

An optical imaging system 700 according to a seventh example will hereinafter be described with reference to FIGS. 7A and 7B.

Figure 7A:
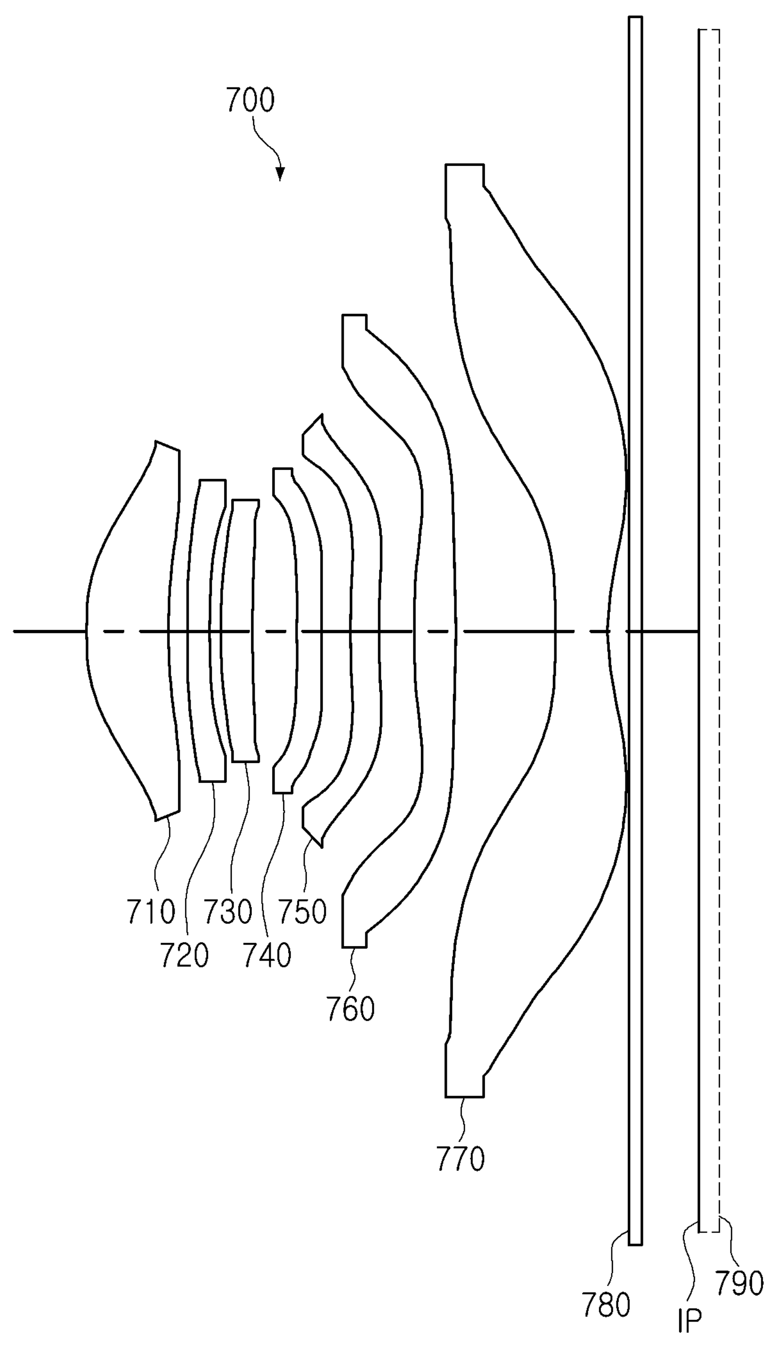
FIG. 7A is a cross-sectional view illustrating an optical imaging system according to a seventh example.
Figure 7B:
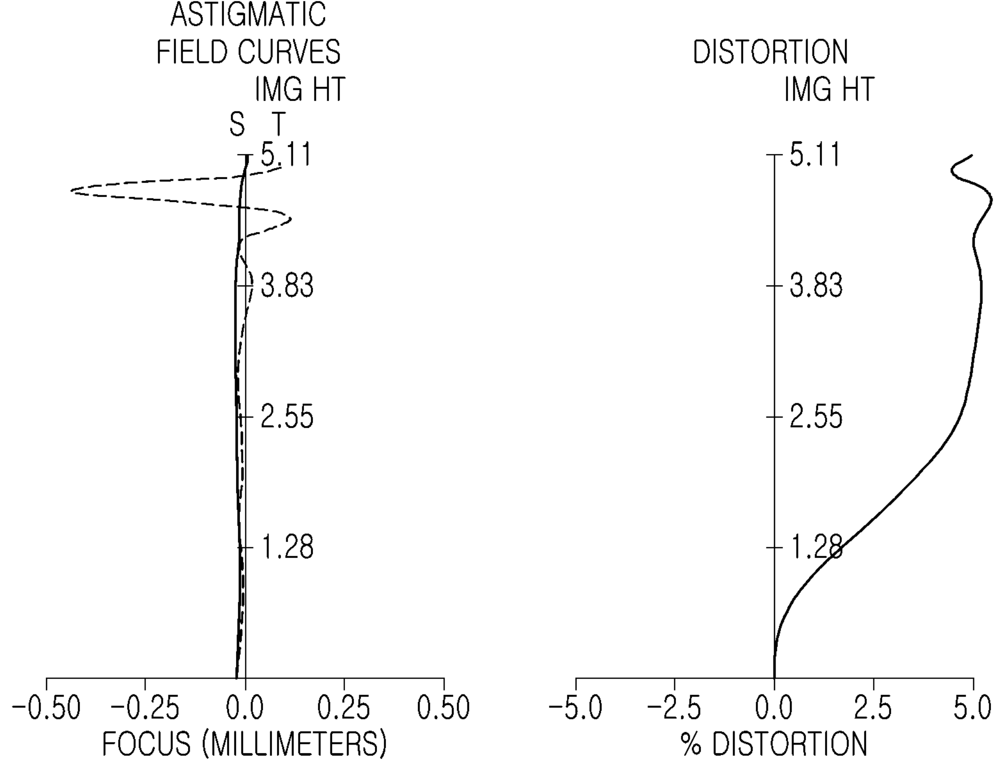
FIG. 7B is graphs representing aberration characteristics of the optical imaging system according to the seventh example.

FIG. 7A is a cross-sectional view illustrating the optical imaging system 700 according to the seventh example. FIG. 7B is graphs representing aberration characteristics of the optical imaging system 700.

The optical imaging system 700 may include a first lens 710, a second lens 720, a third lens 730, a fourth lens 740, a fifth lens 750, a sixth lens 760, a seventh lens 770, and an image sensor 790 sequentially arranged from an object side toward a image side. The optical imaging system 700 may include an IR filter 780 disposed between the seventh lens 770 and the image sensor 790.

The first lens 710 may have positive refractive power. An object-side surface of the first lens 710 may be convex in the paraxial region. An image-side surface of the first lens 710 may be concave in the paraxial region. The object-side surface of the first lens 710 may be aspherical. The image-side surface of the first lens 710 may be aspherical.

The second lens 720 may have negative refractive power. An object-side surface of the second lens 720 may be convex in the paraxial region. An image-side surface of the second lens 720 may be concave in the paraxial region. The object-side surface of the second lens 720 may be aspherical. The image-side surface of the second lens 720 may be aspherical.

The third lens 730 may have positive refractive power. An object-side surface of the third lens 730 may be convex in the paraxial region. An image-side surface of the third lens 730 may be concave in the paraxial region. The object-side surface of the third lens 730 may be aspherical. The image-side surface of the third lens 730 may be aspherical.

The fourth lens 740 may have negative refractive power. An object-side surface of the fourth lens 740 may be concave in the paraxial region. An image-side surface of the fourth lens 740 may be concave in the paraxial region. The object-side surface of the fourth lens 740 may be aspherical. The image-side surface of the fourth lens 740 may be aspherical.

The fifth lens 750 may have negative refractive power. An object-side surface of the fifth lens 750 may be convex in the paraxial region. An image-side surface of the fifth lens 750 may be concave in the paraxial region. The object-side surface of the fifth lens 750 may be aspherical. The image-side surface of the fifth lens 750 may be aspherical.

The sixth lens 760 may have positive refractive power. An object-side surface of the sixth lens 760 may be convex in the paraxial region. An image-side surface of the sixth lens 760 may be convex in the paraxial region. The object-side surface of the sixth lens 760 may be aspherical. The image-side surface of the sixth lens 760 may be aspherical.

The seventh lens 770 may have negative refractive power. An object-side surface of the seventh lens 770 may be convex in the paraxial region. An image-side surface of the seventh lens 770 may be concave in the paraxial region. The object-side surface of the seventh lens 770 may be aspherical. The image-side surface of the seventh lens 770 may be aspherical.

The object-side surface of the first lens 710 may include an inflection point. The image-side surface of the first lens 710 may include an inflection point. The image-side surface of the first lens 710 may be concave in the paraxial region and may be convex in the off-axis region.

The image-side surface of the fourth lens 740 may include an inflection point. The image-side surface of the fourth lens 740 may be concave in the paraxial region and may be convex in the off-axis region.

The object-side surface of the fifth lens 750 may include an inflection point. The object-side surface of the fifth lens 750 may be convex in the paraxial region and may be concave in the off-axis region. The image-side surface of the fifth lens 750 may include an inflection point. The image-side surface of the fifth lens 750 may be concave in the paraxial region and may be convex in the off-axis region.

The object-side surface of the sixth lens 760 may include an inflection point. The object-side surface of the sixth lens 760 may be convex in the paraxial region and may be concave in the off-axis region.

The object-side surface of the seventh lens 770 may include an inflection point. The object-side surface of the seventh lens 770 may be convex in the paraxial region and may be concave in the off-axis region. The image-side surface of the seventh lens 770 may include an inflection point. The image-side surface of the seventh lens 770 may be concave in the paraxial region and may be convex in the off-axis region.

At least one of the first lens 710 to the seventh lens 770 may be formed of glass. For example, the first lens 710 may be a glass lens.

In the optical imaging system 700, f1/f may be 1.122, v1−v2 may be 63.41, v1−v3 may be 44.16, v1−v4 may be 63.41, f2/f may be −3.476, f3/f may be 2.811, |f4/f| may be −5.518, |f5/f| may be −9.138, f6/f may be 1.21, f7/f may be −0.759, OAL/f may be 1.153, f1/f2 may be −0.323, f1/f3 may be 0.399, BFL/f may be 0.17, D1/f may be 0.033, OAL/imgH/2 may be 0.538, FOV*imgH/f may be 96.68, SAG42/OAL may be −0.046, SAG52/OAL may be −0.092, SAG62/OAL may be −0.149, and SAG72/OAL may be −0.203.

Table 13 represents optical and physical parameters of the optical imaging system 700. Table 14 illustrates aspherical data of the optical imaging system 700.

TABLE 13

| Surface | Radius | Thickness | Index | Abbe number |
|---|---|---|---|---|
| Object | Infinity | 1000 | | |
| 1 | Infinity | 0.000 | | |
| 2 | 1.87 | 0.748 | 1.497 | 81.6 |
| 3 | 5.39 | 0.159 | | |
| 4 | 7.43 | 0.200 | 1.680 | 18.2 |
| 5 | 4.45 | 0.101 | | |
| 6 | 5.07 | 0.290 | 1.567 | 37.4 |
| 7 | 14.67 | 0.411 | | |
| 8 | −255.60 | 0.200 | 1.680 | 18.2 |
| 9 | 19.53 | 0.278 | | |
| 10 | 4.13 | 0.245 | 1.614 | 25.9 |
| 11 | 3.50 | 0.318 | | |
| 12 | 6.24 | 0.392 | 1.567 | 37.4 |
| 13 | −6.81 | 0.865 | | |
| 14 | 19.84 | 0.483 | 1.535 | 55.7 |
| 15 | 1.76 | 0.200 | | |
| 16 | | 0.110 | 1.517 | 64.2 |
| 17 | | 0.479 | | |
| Image | | 0.020 | | |

TABLE 14

| Surface # | 2 | 3 | 4 | 5 | 6 | 7 | 8 |
|---|---|---|---|---|---|---|---|
| Radius(Y) | 1.8681E+00 | 5.3948E+00 | 7.4305E+00 | 4.4531E+00 | 5.0655E+00 | 1.4670E+01 | −2.5560E+02 |
| conic constant(K) | −1.5693E+00 | −1.8415E+01 | 1.4307E+01 | 1.1381E+01 | 9.5579E−01 | 9.9000E+01 | −9.9000E+01 |
| 4th order coefficient (A) | 1.854E−02 | −3.465E−03 | −4.056E−02 | −3.673E−02 | −2.427E−02 | −4.222E−02 | −8.169E−02 |
| 6th order coefficient (B) | 6.958E−02 | −1.523E−02 | 1.569E−01 | 1.114E−01 | −4.075E−01 | 5.922E−01 | 5.298E−03 |
| 8th order coefficient (C) | −3.880E−01 | 2.517E−01 | −1.115E+00 | −3.066E+00 | 9.207E+00 | −7.460E+00 | 4.278E−01 |
| 10th order coefficient (D) | 1.281E+00 | −1.630E+00 | 6.583E+00 | 3.302E+01 | −9.382E+01 | 5.858E+01 | −2.832E+00 |

TABLE 14-continued

| | | | | | | | |
|---|---|---|---|---|---|---|---|
| 12th order coefficient (E) | −2.755E+00 | 5.716E+00 | −2.643E+01 | −1.959E+02 | 5.726E+02 | −3.031E+02 | 7.935E+00 |
| 14th order coefficient (F) | 4.027E+00 | −1.270E+01 | 7.275E+01 | 7.468E+02 | −2.298E+03 | 1.078E+03 | −8.104E+00 |
| 16th order coefficient (G) | −4.119E+00 | 1.907E+01 | −1.404E+02 | −1.953E+03 | 6.356E+03 | −2.711E+03 | −1.482E+01 |
| 18th order coefficient (H) | 2.987E+00 | −1.996E+01 | 1.930E+02 | 3.607E+03 | −1.242E+04 | 4.887E+03 | 6.594E+01 |
| 20th order coefficient (J) | −1.539E+00 | 1.477E+01 | −1.897E+02 | −4.752E+03 | 1.730E+04 | −6.337E+03 | −1.130E+02 |
| 22th order coefficient (L) | 5.573E−01 | −7.700E+00 | 1.322E+02 | 4.438E+03 | −1.707E+04 | 5.856E+03 | 1.151E+02 |
| 24th order coefficient (M) | −1.382E−01 | 2.771E+00 | −6.383E+01 | −2.871E+03 | 1.166E+04 | −3.760E+03 | −7.467E+01 |
| 26th order coefficient (N) | 2.226E−02 | −6.551E−01 | 2.028E+01 | 1.223E+03 | −5.242E+03 | 1.593E+03 | 3.042E+01 |
| 28th order coefficient (O) | −2.090E−03 | 9.161E−02 | −3.814E+00 | −3.082E+02 | 1.396E+03 | −4.002E+02 | −7.127E+00 |
| 30th order coefficient (p) | 8.658E−05 | −5.744E−03 | 3.215E−01 | 3.484E+01 | −1.668E+02 | 4.514E+01 | 7.353E−01 |

| Surface # | 9 | 10 | 11 | 12 | 13 | 14 | 15 |
|---|---|---|---|---|---|---|---|
| Radius(Y) | 1.9534E+01 | 4.1344E+00 | 3.5045E+00 | 6.2433E+00 | −6.8137E+00 | 1.9837E+01 | 1.7570E+00 |
| conic constant(K) | 9.8946E+01 | −2.5774E+01 | −1.3202E+00 | 5.3171E+00 | −4.8558E+00 | −3.8790E+00 | −9.4677E+00 |
| 4th order coefficient (A) | −1.048E−01 | −2.011E−01 | −2.354E−01 | 4.020E−03 | 3.770E−02 | −2.448E−01 | −9.866E−02 |
| 6th order coefficient (B) | 7.549E−02 | 4.815E−01 | 3.515E−01 | −3.674E−02 | 5.936E−03 | 1.874E−01 | 6.945E−02 |
| 8th order coefficient (C) | 1.925E−01 | −2.019E+00 | −1.086E+00 | 1.223E−01 | 4.144E−02 | −1.165E−01 | −3.905E−02 |
| 10th order coefficient (D) | −2.124E+00 | 6.588E+00 | 2.663E+00 | −3.682E−01 | −1.735E−01 | 4.677E−02 | 1.609E−02 |
| 12th order coefficient (E) | 8.512E+00 | −1.514E+01 | −4.617E+00 | 5.832E−01 | 2.398E−01 | −9.793E−03 | −4.975E−03 |
| 14th order coefficient (F) | −2.104E+01 | 2.497E+01 | 5.809E+00 | −5.627E−01 | −1.860E−01 | 2.950E−04 | 1.182E−03 |
| 16th order coefficient (G) | 3.531E+01 | −2.997E+01 | −5.398E+00 | 3.608E−01 | 9.310E−02 | 3.972E−04 | −2.172E−04 |
| 18th order coefficient (H) | −4.173E+01 | 2.630E+01 | 3.710E+00 | −1.604E−01 | −3.187E−02 | −1.179E−04 | 3.052E−05 |
| 20th order coefficient (J) | 3.524E+01 | −1.678E+01 | −1.869E+00 | 5.017E−02 | 7.647E−03 | 1.816E−05 | −3.207E−06 |
| 22th order coefficient (L) | −2.120E+01 | 7.665E+00 | 6.780E−01 | −1.100E−02 | −1.288E−03 | −1.770E−06 | 2.452E−07 |
| 24th order coefficient (M) | 8.888E+00 | −2.436E+00 | −1.715E−01 | 1.653E−03 | 1.495E−04 | 1.131E−07 | −1.313E−08 |
| 26th order coefficient (N) | −2.472E+00 | 5.099E−01 | 2.860E−02 | −1.618E−04 | −1.139E−05 | −4.615E−09 | 4.642E−10 |
| 28th order coefficient (O) | 4.104E−01 | −6.305E−02 | −2.819E−03 | 9.289E−06 | 5.134E−07 | 1.096E−10 | −9.699E−12 |
| 30th order coefficient (p) | −3.080E−02 | 3.481E−03 | 1.242E−04 | −2.372E−07 | −1.037E−08 | −1.155E−12 | 9.051E−14 |

An optical imaging system 800 according to an eighth example will hereinafter be described with reference to FIGS. 8A and 8B.

Figure 8A:
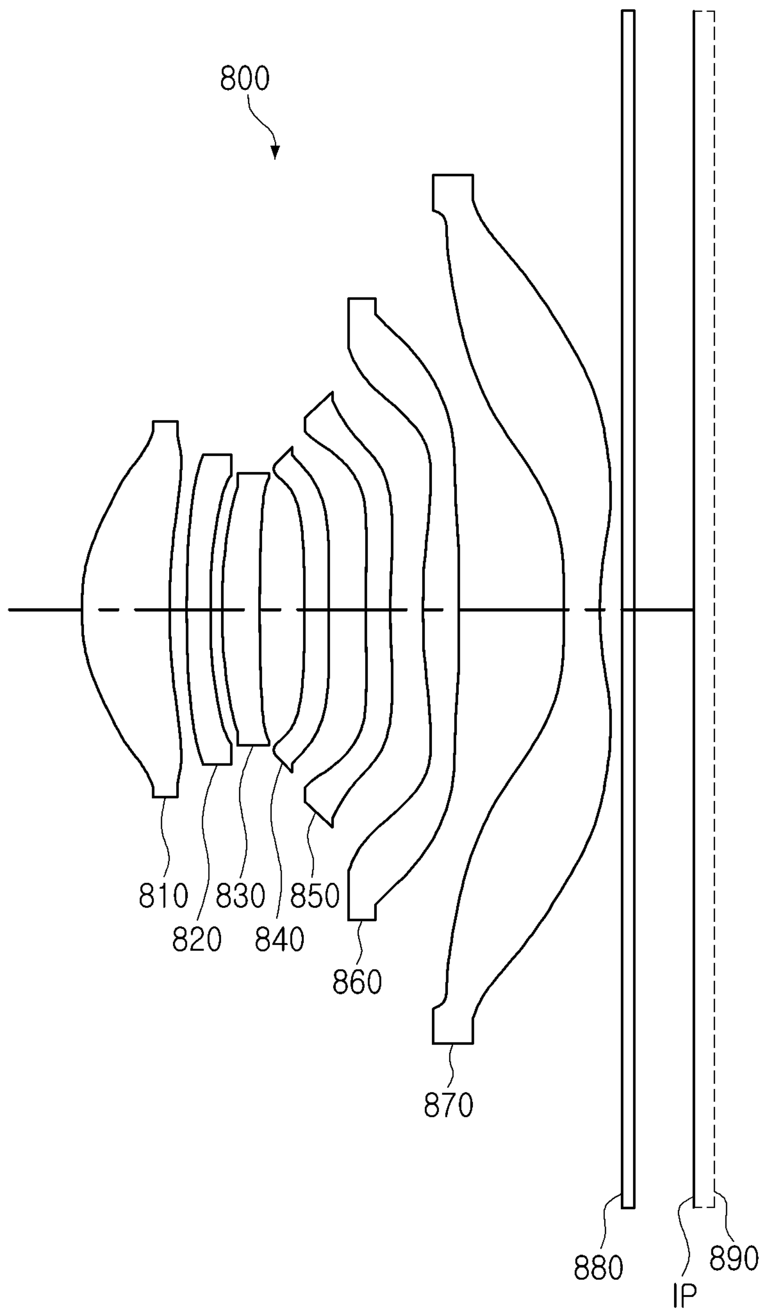
FIG. 8A is a cross-sectional view illustrating an optical imaging system according to an eighth example.
Figure 8B:
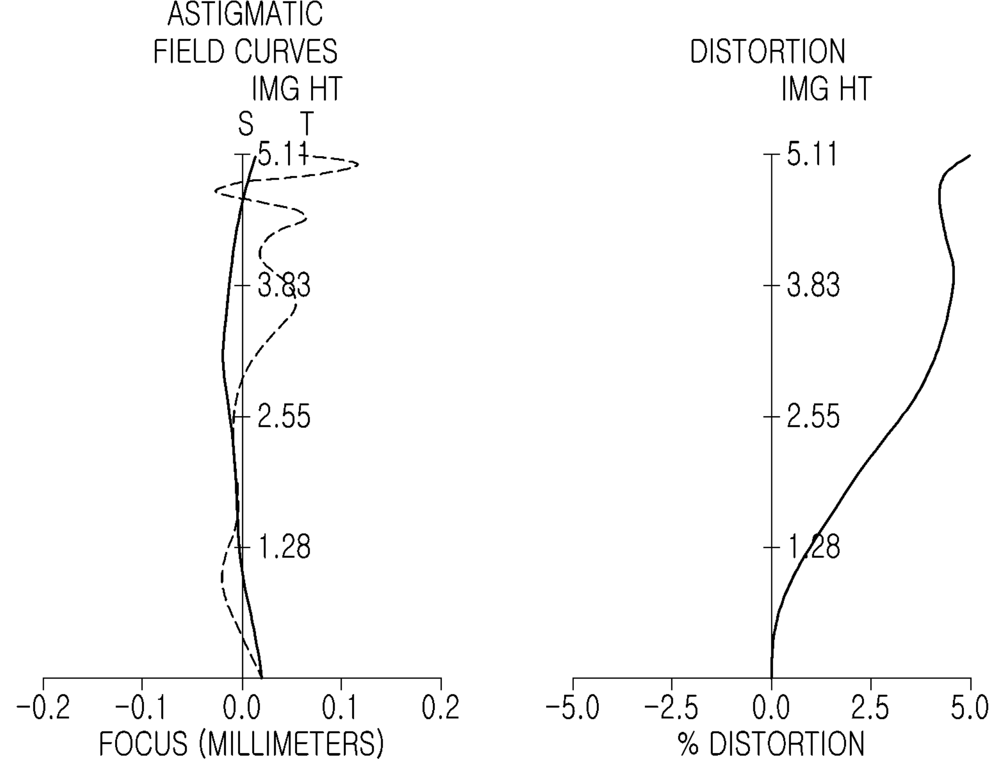
FIG. 8B is graphs representing aberration characteristics of the optical imaging system according to the eighth example.

FIG. 8A is a cross-sectional view illustrating the optical imaging system 800 according to the eighth example. FIG. 8B is graphs representing aberration characteristics of the optical imaging system 800.

The optical imaging system 800 may include a first lens 810, a second lens 820, a third lens 830, a fourth lens 840, a fifth lens 850, a sixth lens 860, a seventh lens 870, and an image sensor 890 sequentially arranged from an object side toward a image side. The optical imaging system 800 may include an IR filter 880 disposed between the seventh lens 870 and the image sensor 890.

The first lens 810 may have positive refractive power. An object-side surface of the first lens 810 may be convex in the paraxial region. An image-side surface of the first lens 810 may be concave in the paraxial region. The object-side surface of the first lens 810 may be aspherical. The image-side surface of the first lens 810 may be aspherical.

The second lens 820 may have negative refractive power. An object-side surface of the second lens 820 may be convex in the paraxial region. An image-side surface of the second lens 820 may be concave in the paraxial region. The object-side surface of the second lens 820 may be aspherical. The image-side surface of the second lens 820 may be aspherical.

The third lens 830 may have positive refractive power. An object-side surface of the third lens 830 may be convex in the paraxial region. An image-side surface of the third lens 830 may be concave in the paraxial region. The object-side surface of the third lens 830 may be aspherical. The image-side surface of the third lens 830 may be aspherical.

The fourth lens 840 may have negative refractive power. An object-side surface of the fourth lens 840 may be concave in the paraxial region. An image-side surface of the fourth lens 840 may be convex in the paraxial region. The object-side surface of the fourth lens 840 may be aspherical. The image-side surface of the fourth lens 840 may be aspherical.

The fifth lens 850 may have negative refractive power. An object-side surface of the fifth lens 850 may be convex in the paraxial region. An image-side surface of the fifth lens 850 may be concave in the paraxial region. The object-side surface of the fifth lens 850 may be aspherical. The image-side surface of the fifth lens 850 may be aspherical.

The sixth lens 860 may have positive refractive power. An object-side surface of the sixth lens 860 may be convex in the paraxial region. An image-side surface of the sixth lens 860 may be convex in the paraxial region. The object-side surface of the sixth lens 860 may be aspherical. The image-side surface of the sixth lens 860 may be aspherical.

The seventh lens 870 may have negative refractive power. An object-side surface of the seventh lens 870 may be convex in the paraxial region. An image-side surface of the seventh lens 870 may be concave in the paraxial region. The object-side surface of the seventh lens 870 may be aspherical. The image-side surface of the seventh lens 870 may be aspherical.

The object-side surface of the first lens 810 may include an inflection point. The image-side surface of the first lens 810 may include an inflection point. The image-side surface of the first lens 810 may be concave in the paraxial region and may be convex in the off-axis region.

The object-side surface of the fifth lens 850 may include an inflection point. The object-side surface of the fifth lens 850 may be convex in the paraxial region and may be concave in the off-axis region. The image-side surface of the fifth lens 850 may include an inflection point. The image-side surface of the fifth lens 850 may be concave in the paraxial region and may be convex in the off-axis region.

The object-side surface of the sixth lens 860 may include an inflection point. The object-side surface of the sixth lens 860 may be convex in the paraxial region and may be concave in the off-axis region.

The object-side surface of the seventh lens 870 may include an inflection point. The object-side surface of the seventh lens 870 may be convex in the paraxial region and may be concave in the off-axis region. The image-side surface of the seventh lens 870 may include an inflection point. The image-side surface of the seventh lens 870 may be concave in the paraxial region and may be convex in the off-axis region.

At least one of the first lens 810 to the seventh lens 870 may be formed of glass. For example, the first lens 810 may be a glass lens.

In the optical imaging system 800, f1/f may be 1.047, v1−v2 may be 63.41, v1−v3 may be 25.82, v1−v4 may be 63.41, f2/f may be −3.393, f3/f may be 2.971, |f4/f| may be −8.908, |f5/f| may be −5.662, f6/f may be 1.177, f7/f may be −0.642, OAL/f may be 1.081, f1/f2 may be −0.309, f1/f3 may be 0.353, BFL/f may be 0.169, D1/f may be 0.029, OAL/imgH/2 may be 0.538, FOV*imgH/f may be 87.291, SAG42/OAL may be −0.06, SAG52/OAL may be −0.095, SAG62/OAL may be −0.137, and SAG72/OAL may be −0.205.

Table 15 represents optical and physical parameters of the optical imaging system 800. Table 16 illustrates aspherical data of the optical imaging system 800.

TABLE 15

| Surface | Radius | Thickness | Index | Abbe number |
|---|---|---|---|---|
| Object | Infinity | 1000 | | |
| 1 | Infinity | 0.000 | | |
| 2 | 1.86 | 0.782 | 1.497 | 81.6 |
| 3 | 5.35 | 0.149 | | |
| 4 | 7.14 | 0.220 | 1.680 | 18.2 |
| 5 | 4.41 | 0.110 | | |
| 6 | 4.80 | 0.329 | 1.535 | 55.7 |
| 7 | 11.45 | 0.404 | | |
| 8 | −30.85 | 0.220 | 1.680 | 18.2 |
| 9 | −2487.91 | 0.323 | | |
| 10 | 4.47 | 0.220 | 1.614 | 25.9 |
| 11 | 3.51 | 0.304 | | |
| 12 | 6.24 | 0.328 | 1.567 | 37.4 |
| 13 | −7.40 | 0.931 | | |
| 14 | 30.06 | 0.320 | 1.535 | 55.7 |
| 15 | 1.65 | 0.200 | | |
| 16 | | 0.110 | 1.517 | 64.2 |
| 17 | | 0.572 | | |
| Image | | −0.020 | | |

TABLE 16

| Surface # | 2 | 3 | 4 | 5 | 6 | 7 | 8 |
|---|---|---|---|---|---|---|---|
| Radius(Y) | 1.8609E+00 | 5.3467E+00 | 7.1415E+00 | 4.4075E+00 | 4.8001E+00 | 1.1452E+01 | −3.0855E+01 |
| conic constant(K) | −1.5265E+00 | −1.7812E+01 | 1.5596E+01 | 1.1384E+01 | 7.6033E−01 | 8.9138E+01 | −9.7688E+01 |
| 4th order coefficient (A) | 3.562E−02 | −1.391E−02 | −3.322E−02 | −3.455E−02 | −1.281E−02 | −4.630E−02 | −9.678E−02 |
| 6th order coefficient (B) | −1.360E−01 | 1.496E−01 | 5.098E−02 | −2.964E−02 | −4.686E−01 | 6.040E−01 | 4.011E−01 |
| 8th order coefficient (C) | 8.310E−01 | −9.268E−01 | 2.759E−01 | −1.957E−01 | 7.071E+00 | −6.727E+00 | −4.036E+00 |
| 10th order coefficient (D) | −3.068E+00 | 3.589E+00 | −3.348E+00 | 4.025E+00 | −5.789E+01 | 4.678E+01 | 2.761E+01 |
| 12th order coefficient (E) | 7.415E+00 | −9.560E+00 | 1.652E+01 | −2.175E+01 | 2.988E+02 | −2.150E+02 | −1.277E+02 |
| 14th order coefficient (F) | −1.235E+01 | 1.801E+01 | −4.907E+01 | 6.417E+01 | −1.034E+03 | 6.800E+02 | 4.046E+02 |
| 16th order coefficient (G) | 1.457E+01 | −2.445E+01 | 9.665E+01 | −1.189E+02 | 2.488E+03 | −1.518E+03 | −8.977E+02 |
| 18th order coefficient (H) | −1.237E+01 | 2.409E+01 | −1.316E+02 | 1.439E+02 | −4.246E+03 | 2.425E+03 | 1.416E+03 |
| 20th order coefficient (J) | 7.568E+00 | −1.719E+01 | 1.258E+02 | −1.122E+02 | 5.172E+03 | −2.784E+03 | −1.595E+03 |
| 22th order coefficient (L) | −3.307E+00 | 8.782E+00 | −8.439E+01 | 5.147E+01 | −4.467E+03 | 2.276E+03 | 1.275E+03 |

TABLE 16-continued

| | | | | | | | |
|---|---|---|---|---|---|---|---|
| 24th order coefficient (M) | 1.005E+00 | −3.123E+00 | 3.889E+01 | −8.802E+00 | 2.671E+03 | −1.292E+03 | −7.060E+02 |
| 26th order coefficient (N) | −2.020E−01 | 7.337E−01 | −1.173E+01 | −3.380E+00 | −1.051E+03 | 4.840E+02 | 2.577E+02 |
| 28th order coefficient (O) | 2.409E−02 | −1.022E−01 | 2.085E+00 | 2.025E+00 | 2.450E+02 | −1.075E+02 | −5.575E+01 |
| 30th order coefficient (p) | −1.291E−03 | 6.394E−03 | −1.655E−01 | −3.100E−01 | −2.560E+01 | 1.072E+01 | 5.418E+00 |

| Surface # | 9 | 10 | 11 | 12 | 13 | 14 | 15 |
|---|---|---|---|---|---|---|---|
| Radius(Y) | −2.4879E+03 | 4.4675E+00 | 3.5066E+00 | 6.2444E+00 | −7.3994E+00 | 3.0055E+01 | 1.6529E+00 |
| conic constant(K) | −9.9000E+01 | −3.1889E+01 | −1.3225E+00 | 5.3885E+00 | −4.4466E+00 | 9.4643E+00 | −1.1491E+01 |
| 4th order coefficient (A) | −1.154E−01 | −1.843E−01 | −2.387E−01 | 1.846E−02 | 7.758E−02 | −3.811E−01 | −1.842E−01 |
| 6th order coefficient (B) | 3.117E−01 | 2.762E−01 | 2.285E−01 | −9.072E−02 | −7.871E−02 | 3.880E−01 | 1.734E−01 |
| 8th order coefficient (C) | −1.601E+00 | −9.231E−01 | −3.229E−01 | 2.739E−01 | 2.096E−01 | −2.862E−01 | −1.188E−01 |
| 10th order coefficient (D) | 6.228E+00 | 2.951E+00 | 2.256E−01 | −6.585E−01 | −4.280E−01 | 1.428E−01 | 5.803E−02 |
| 12th order coefficient (E) | −1.788E+01 | −7.116E+00 | 3.242E−01 | 9.249E−01 | 4.870E−01 | −4.720E−02 | −2.073E−02 |
| 14th order coefficient (F) | 3.739E+01 | 1.264E+01 | −1.023E+00 | −8.298E−01 | −3.441E−01 | 1.052E−02 | 5.534E−03 |
| 16th order coefficient (G) | −5.693E+01 | −1.656E+01 | 1.273E+00 | 5.093E−01 | 1.626E−01 | −1.589E−03 | −1.114E−03 |
| 18th order coefficient (H) | 6.305E+01 | 1.590E+01 | −9.621E−01 | −2.215E−01 | −5.346E−02 | 1.581E−04 | 1.689E−04 |
| 20th order coefficient (J) | −5.054E+01 | −1.108E+01 | 4.820E−01 | 6.897E−02 | 1.245E−02 | −9.125E−06 | −1.904E−05 |
| 22th order coefficient (L) | 2.890E+01 | 5.515E+00 | −1.634E−01 | −1.524E−02 | −2.053E−03 | 1.136E−07 | 1.563E−06 |
| 24th order coefficient (M) | −1.147E+01 | −1.902E+00 | 3.700E−02 | 2.329E−03 | 2.346E−04 | 2.586E−08 | −9.046E−08 |
| 26th order coefficient (N) | 2.991E+00 | 4.303E−01 | −5.355E−03 | −2.335E−04 | −1.771E−05 | −2.112E−09 | 3.483E−09 |
| 28th order coefficient (O) | −4.603E−01 | −5.732E−02 | 4.467E−04 | 1.379E−05 | 7.942E−07 | 7.200E−11 | −7.993E−11 |
| 30th order coefficient (p) | 3.158E−02 | 3.399E−03 | −1.630E−05 | −3.636E−07 | −1.604E−08 | −9.753E−13 | 8.257E−13 |

An optical imaging system 900 according to a ninth example will hereinafter be described with reference to FIGS. 9A and 9B.

Figure 9A:
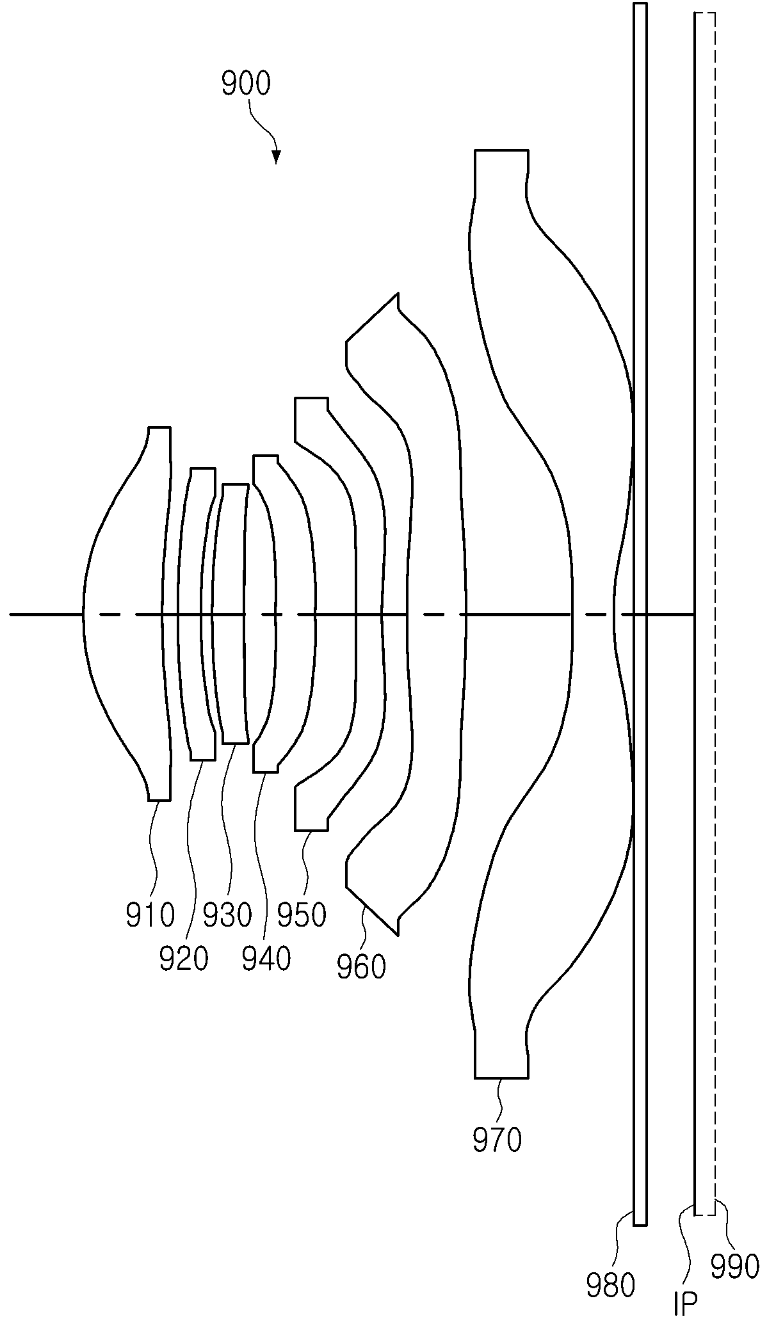
FIG. 9A is a cross-sectional view illustrating an optical imaging system according to a ninth example.
Figure 9B:
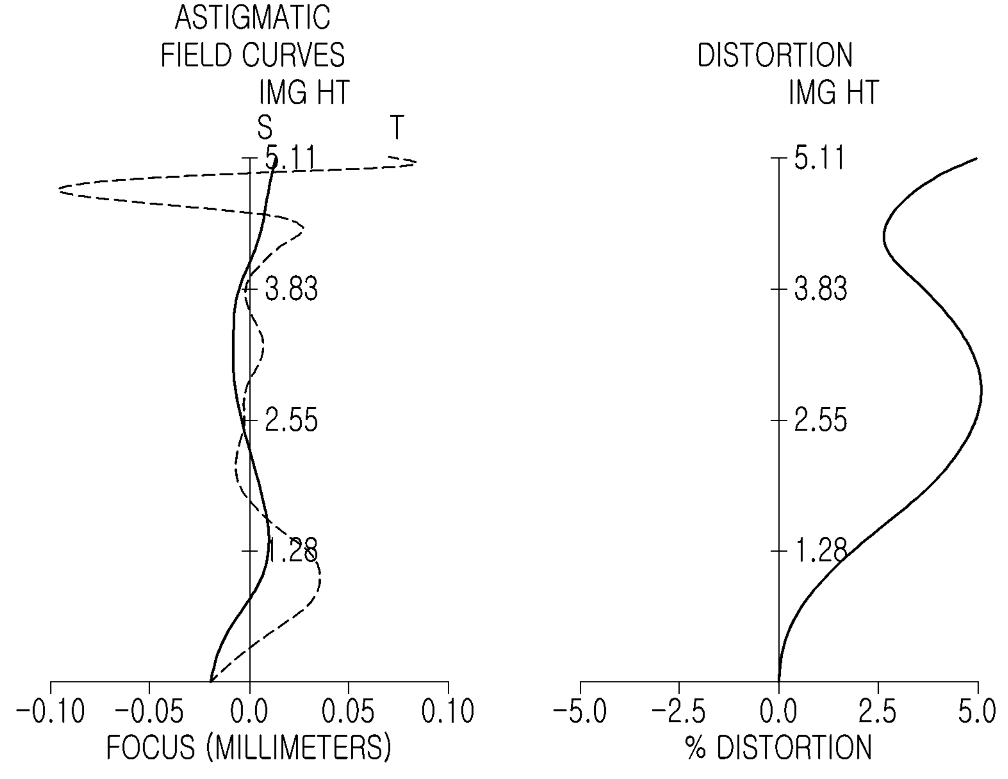
FIG. 9B is graphs representing aberration characteristics of the optical imaging system according to the ninth example.

FIG. 9A is a cross-sectional view illustrating the optical imaging system 900 according to the ninth example. FIG. 9B is graphs representing aberration characteristics of the optical imaging system 900.

The optical imaging system 900 may include a first lens 910, a second lens 920, a third lens 930, a fourth lens 940, a fifth lens 950, a sixth lens 960, a seventh lens 970, and an image sensor 990 sequentially arranged from an object side toward a image side. The optical imaging system 900 may include an IR filter 980 disposed between the seventh lens 970 and the image sensor 990.

The first lens 910 may have positive refractive power. An object-side surface of the first lens 910 may be convex in the paraxial region. An image-side surface of the first lens 910 may be concave in the paraxial region. The object-side surface of the first lens 910 may be aspherical. The image-side surface of the first lens 910 may be aspherical.

The second lens 920 may have negative refractive power. An object-side surface of the second lens 920 may be convex in the paraxial region. An image-side surface of the second lens 920 may be concave in the paraxial region. The object-side surface of the second lens 920 may be aspherical. The image-side surface of the second lens 920 may be aspherical.

The third lens 930 may have positive refractive power. An object-side surface of the third lens 930 may be convex in the paraxial region. An image-side surface of the third lens 930 may be concave in the paraxial region. The object-side surface of the third lens 930 may be aspherical. The image-side surface of the third lens 930 may be aspherical.

The fourth lens 940 may have positive refractive power. An object-side surface of the fourth lens 940 may be concave in the paraxial region. An image-side surface of the fourth lens 940 may be convex in the paraxial region. The object-side surface of the fourth lens 940 may be aspherical. The image-side surface of the fourth lens 940 may be aspherical.

The fifth lens 950 may have negative refractive power. An object-side surface of the fifth lens 950 may be convex in the paraxial region. An image-side surface of the fifth lens 950 may be concave in the paraxial region. The object-side surface of the fifth lens 950 may be aspherical. The image-side surface of the fifth lens 950 may be aspherical.

The sixth lens 960 may have positive refractive power. An object-side surface of the sixth lens 960 may be convex in the paraxial region. An image-side surface of the sixth lens 960 may be convex in the paraxial region. The object-side surface of the sixth lens 960 may be aspherical. The image-side surface of the sixth lens 960 may be aspherical.

The seventh lens 970 may have negative refractive power. An object-side surface of the seventh lens 970 may be convex in the paraxial region. An image-side surface of the seventh lens 970 may be concave in the paraxial region. The object-side surface of the seventh lens 970 may be aspherical. The image-side surface of the seventh lens 970 may be aspherical.

The object-side surface of the first lens 910 may include an inflection point. The image-side surface of the first lens 910 may include an inflection point. The image-side surface of the first lens 910 may be concave in the paraxial region and may be convex in the off-axis region.

The object-side surface of the fifth lens 950 may include an inflection point. The object-side surface of the fifth lens 950 may be convex in the paraxial region and may be concave in the off-axis region. The image-side surface of the fifth lens 950 may include an inflection point. The image-side surface of the fifth lens 950 may be concave in the paraxial region and may be convex in the off-axis region.

The object-side surface of the sixth lens 960 may include an inflection point. The object-side surface of the sixth lens 960 may be convex in the paraxial region and may be concave in the off-axis region.

The object-side surface of the seventh lens 970 may include an inflection point. The object-side surface of the seventh lens 970 may be convex in the paraxial region and may be concave in the off-axis region. The image-side surface of the seventh lens 970 may include an inflection point. The image-side surface of the seventh lens 970 may be concave in the paraxial region and may be convex in the off-axis region.

At least one of the first lens 910 to the seventh lens 970 may be formed of glass. For example, the first lens 910 may be a glass lens.

In the optical imaging system 900, f1/f may be 1.186, v1−v2 may be 63.41, v1−v3 may be 25.82, v1−v4 may be 44.16, f2/f may be −3.981, f3/f may be 3.307, |f4/f| may be 10.799, |f5/f| may be −2.855, f6/f may be 1.199, f7/f may be −0.782, OAL/f may be 1.188, f1/f2 may be −0.298, f1/f3 may be 0.359, BFL/f may be 0.159, D1/f may be 0.033, OAL/imgH/2 may be 0.538, FOV*imgH/f may be 101.478, SAG42/OAL may be −0.061, SAG52/OAL may be −0.086, SAG62/OAL may be −0.112, and SAG72/OAL may be −0.14.

Table 17 represents optical and physical parameters of the optical imaging system 900. Table 18 illustrates aspherical data of the optical imaging system 900.

TABLE 17

| Surface | Radius | Thickness | Index | Abbe number |
|---|---|---|---|---|
| Object | Infinity | 1000 | | |
| 1 | Infinity | 0.000 | | |
| 2 | 1.88 | 0.703 | 1.497 | 81.6 |
| 3 | 5.29 | 0.151 | | |
| 4 | 6.99 | 0.200 | 1.680 | 18.2 |
| 5 | 4.46 | 0.103 | | |
| 6 | 5.16 | 0.284 | 1.535 | 55.7 |
| 7 | 13.59 | 0.287 | | |
| 8 | −19.77 | 0.357 | 1.567 | 37.4 |
| 9 | −11.75 | 0.359 | | |
| 10 | 6.97 | 0.234 | 1.614 | 25.9 |
| 11 | 3.72 | 0.216 | | |
| 12 | 6.16 | 0.543 | 1.567 | 37.4 |
| 13 | −6.31 | 0.947 | | |
| 14 | 19.38 | 0.379 | 1.535 | 55.7 |
| 15 | 1.76 | 0.200 | | |
| 16 | | 0.110 | 1.517 | 64.2 |
| 17 | | 0.408 | | |
| Image | | 0.020 | | |

TABLE 18

| Surface # | 2 | 3 | 4 | 5 | 6 | 7 | 8 |
|---|---|---|---|---|---|---|---|
| Radius(Y) | 1.8825E+00 | 5.2886E+00 | 6.9927E+00 | 4.4572E+00 | 5.1603E+00 | 1.3592E+01 | −1.9767E+01 |
| conic constant(K) | −1.7000E+00 | −1.9559E+01 | 1.4825E+01 | 1.1679E+01 | −5.8868E−01 | 7.1626E+01 | −9.9000E+01 |
| 4th order coefficient (A) | 1.158E−02 | −7.345E−03 | −2.770E−02 | −4.500E−02 | −1.379E−02 | −3.988E−02 | −1.231E−01 |
| 6th order coefficient (B) | 1.356E−01 | 5.566E−02 | −7.777E−03 | 1.775E−01 | −4.166E−01 | 3.304E−01 | 1.043E+00 |
| 8th order coefficient (C) | −6.981E−01 | −3.575E−01 | 2.294E−01 | −2.439E+00 | 7.014E+00 | −3.406E+00 | −9.255E+00 |
| 10th order coefficient (D) | 2.237E+00 | 1.297E+00 | −5.412E−01 | 2.294E+01 | −6.560E+01 | 2.174E+01 | 5.140E+01 |
| 12th order coefficient (E) | −4.837E+00 | −3.180E+00 | −1.291E+00 | −1.366E+02 | 3.909E+02 | −9.158E+01 | −1.923E+02 |
| 14th order coefficient (F) | 7.320E+00 | 5.458E+00 | 1.178E+01 | 5.480E+02 | −1.574E+03 | 2.638E+02 | 5.013E+02 |
| 16th order coefficient (G) | −7.934E+00 | −6.727E+00 | −3.651E+01 | −1.538E+03 | 4.437E+03 | −5.281E+02 | −9.285E+02 |
| 18th order coefficient (H) | 6.228E+00 | 6.027E+00 | 6.705E+01 | 3.078E+03 | −8.912E+03 | 7.347E+02 | 1.230E+03 |
| 20th order coefficient (J) | −3.544E+00 | −3.924E+00 | −8.109E+01 | −4.416E+03 | 1.282E+04 | −6.952E+02 | −1.159E+03 |
| 22th order coefficient (L) | 1.446E+00 | 1.833E+00 | 6.645E+01 | 4.505E+03 | −1.312E+04 | 4.204E+02 | 7.608E+02 |
| 24th order coefficient (M) | −4.124E−01 | −5.966E−01 | −3.660E+01 | −3.187E+03 | 9.300E+03 | −1.344E+02 | −3.326E+02 |
| 26th order coefficient (N) | 7.810E−02 | 1.280E−01 | 1.299E+01 | 1.486E+03 | −4.346E+03 | 1.493E+00 | 8.862E+01 |
| 28th order coefficient (O) | −8.829E−03 | −1.620E−02 | −2.686E+00 | −4.104E+02 | 1.203E+03 | 1.329E+01 | −1.175E+01 |
| 30th order coefficient (p) | 4.515E−04 | 9.132E−04 | 2.455E−01 | 5.082E+01 | −1.493E+02 | −3.027E+00 | 3.684E−01 |

| Surface # | 9 | 10 | 11 | 12 | 13 | 14 | 15 |
|---|---|---|---|---|---|---|---|
| Radius(Y) | −1.1755E+01 | 6.9707E+00 | 3.7193E+00 | 6.1583E+00 | −6.3134E+00 | 1.9384E+01 | 1.7567E+00 |
| conic constant(K) | 7.1299E+01 | −2.8916E+01 | −1.0538E+00 | 5.4347E+00 | −1.7631E+01 | −2.3342E+00 | −7.5110E+00 |

TABLE 18-continued

| | | | | | | | |
|---|---|---|---|---|---|---|---|
| 4th order coefficient (A) | −5.065E−02 | −1.467E−01 | −1.721E−01 | 5.607E−03 | 4.629E−02 | −2.158E−01 | −1.109E−01 |
| 6th order coefficient (B) | −6.519E−02 | −4.847E−02 | 2.035E−02 | −1.712E−02 | 1.267E−02 | 1.699E−01 | 9.625E−02 |
| 8th order coefficient (C) | 6.718E−01 | 8.675E−01 | 2.563E−01 | −9.877E−02 | −6.262E−02 | −1.132E−01 | −6.585E−02 |
| 10th order coefficient (D) | −3.458E+00 | −3.797E+00 | −9.812E−01 | 2.285E−01 | 5.979E−02 | 5.241E−02 | 3.258E−02 |
| 12th order coefficient (E) | 1.076E+01 | 1.060E+01 | 2.254E+00 | −2.788E−01 | −3.051E−02 | −1.598E−02 | −1.165E−02 |
| 14th order coefficient (F) | −2.238E+01 | −2.037E+01 | −3.435E+00 | 2.308E−01 | 8.991E−03 | 3.304E−03 | 3.024E−03 |
| 16th order coefficient (G) | 3.242E+01 | 2.761E+01 | 3.585E+00 | −1.388E−01 | −1.276E−03 | −4.778E−04 | −5.727E−04 |
| 18th order coefficient (H) | −3.337E+01 | −2.678E+01 | −2.618E+00 | 6.157E−02 | −8.141E−05 | 4.907E−05 | 7.911E−05 |
| 20th order coefficient (J) | 2.460E+01 | 1.870E+01 | 1.351E+00 | −2.004E−02 | 7.752E−05 | −3.574E−06 | −7.927E−06 |
| 22th order coefficient (L) | −1.293E+01 | −9.338E+00 | −4.896E−01 | 4.702E−03 | −1.721E−05 | 1.808E−07 | 5.682E−07 |
| 24th order coefficient (M) | 4.752E+00 | 3.256E+00 | 1.220E−01 | −7.705E−04 | 2.143E−06 | −6.053E−09 | −2.832E−08 |
| 26th order coefficient (N) | −1.170E+00 | −7.541E−01 | −1.987E−02 | 8.326E−05 | −1.617E−07 | 1.208E−10 | 9.309E−10 |
| 28th order coefficient (O) | 1.755E−01 | 1.043E−01 | 1.906E−03 | −5.314E−06 | 6.945E−09 | −1.092E−12 | −1.812E−11 |
| 30th order coefficient (p) | −1.227E−02 | −6.528E−03 | −8.157E−05 | 1.513E−07 | −1.314E−10 | 1.463E−16 | 1.581E−13 |

An optical imaging system 1000 according to a tenth example will hereinafter be described with reference to FIGS. 10A and 10B.

Figure 10A:
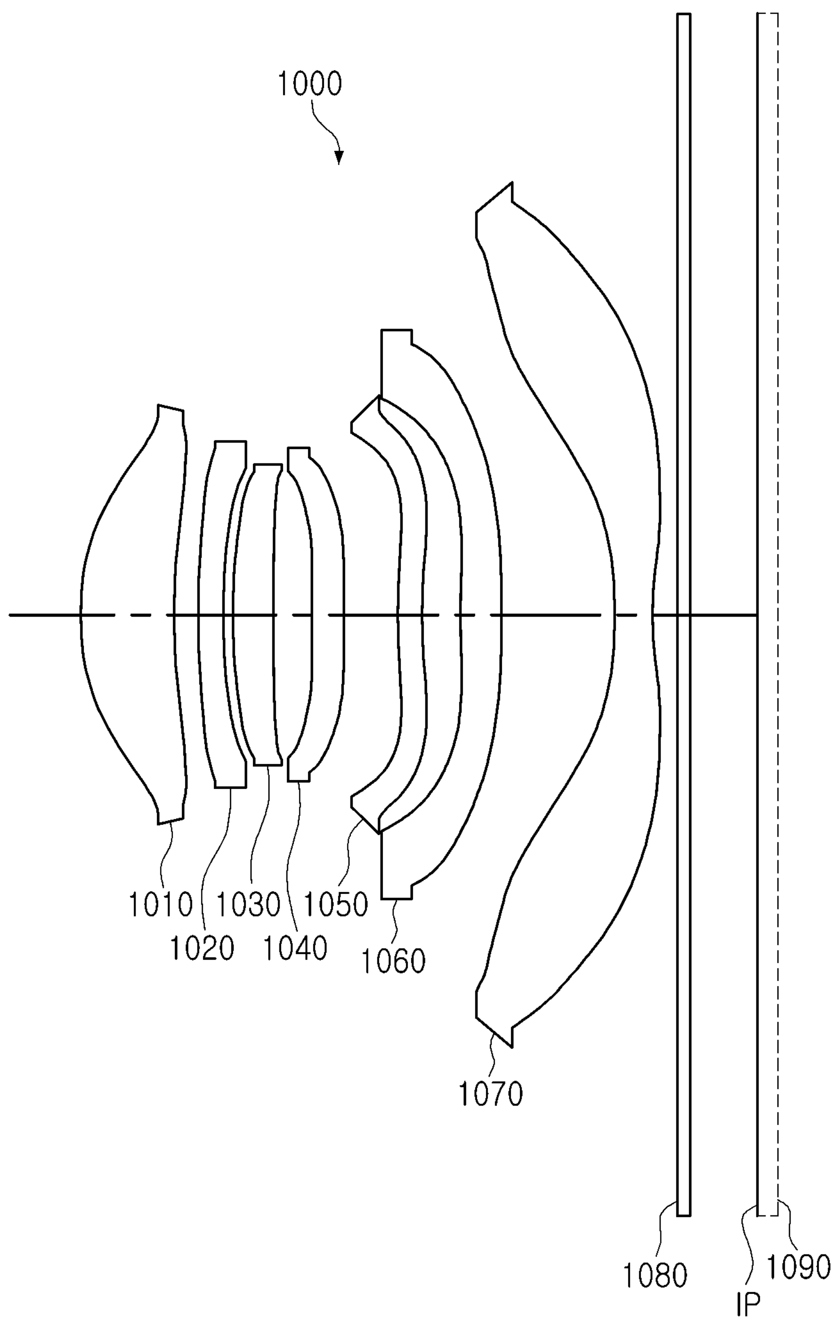
FIG. 10A is a cross-sectional view illustrating an optical imaging system according to a tenth example.
Figure 10B:
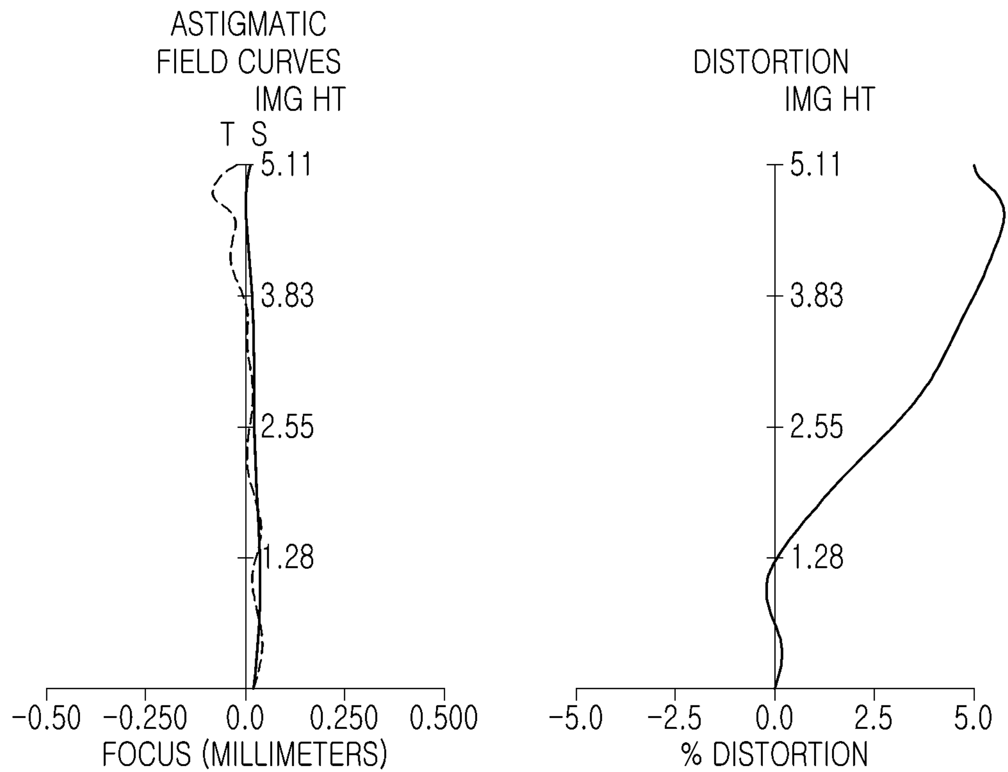
FIG. 10B is graphs representing aberration characteristics of the optical imaging system according to the tenth example.

FIG. 10A is a cross-sectional view illustrating the optical imaging system 1000 according to the tenth example. FIG. 10B is graphs representing aberration characteristics of the optical imaging system 1000.

The optical imaging system 1000 may include a first lens 1010, a second lens 1020, a third lens 1030, a fourth lens 1040, a fifth lens 1050, a sixth lens 1060, a seventh lens 1070, and an image sensor 1090 sequentially arranged from an object side toward a image side. The optical imaging system 1000 may include an IR filter 1080 disposed between the seventh lens 1070 and the image sensor 1090.

The first lens 1010 may have positive refractive power. An object-side surface of the first lens 1010 may be convex in the paraxial region. An image-side surface of the first lens 1010 may be concave in the paraxial region. The object-side surface of the first lens 1010 may be aspherical. The image-side surface of the first lens 1010 may be aspherical.

The second lens 1020 may have negative refractive power. An object-side surface of the second lens 1020 may be convex in the paraxial region. An image-side surface of the second lens 1020 may be concave in the paraxial region. The object-side surface of the second lens 1020 may be aspherical. The image-side surface of the second lens 1020 may be aspherical.

The third lens 1030 may have positive refractive power. An object-side surface of the third lens 1030 may be convex in the paraxial region. An image-side surface of the third lens 1030 may be concave in the paraxial region. The object-side surface of the third lens 1030 may be aspherical. The image-side surface of the third lens 1030 may be aspherical.

The fourth lens 1040 may have negative refractive power. An object-side surface of the fourth lens 1040 may be concave in the paraxial region. An image-side surface of the fourth lens 1040 may be convex in the paraxial region. The object-side surface of the fourth lens 1040 may be aspherical. The image-side surface of the fourth lens 1040 may be aspherical.

The fifth lens 1050 may have negative refractive power. An object-side surface of the fifth lens 1050 may be convex in the paraxial region. An image-side surface of the fifth lens 1050 may be concave in the paraxial region. The object-side surface of the fifth lens 1050 may be aspherical. The image-side surface of the fifth lens 1050 may be aspherical.

The sixth lens 1060 may have positive refractive power. An object-side surface of the sixth lens 1060 may be convex in the paraxial region. An image-side surface of the sixth lens 1060 may be convex in the paraxial region. The object-side surface of the sixth lens 1060 may be aspherical. The image-side surface of the sixth lens 1060 may be aspherical.

The seventh lens 1070 may have negative refractive power. An object-side surface of the seventh lens 1070 may be concave in the paraxial region. An image-side surface of the seventh lens 1070 may be concave in the paraxial region. The object-side surface of the seventh lens 1070 may be aspherical. The image-side surface of the seventh lens 1070 may be aspherical.

The object-side surface of the first lens 1010 may include an inflection point. The image-side surface of the first lens 1010 may include an inflection point. The image-side surface of the first lens 1010 may be concave in the paraxial region and may be convex in the off-axis region.

The object-side surface of the fifth lens 1050 may include an inflection point. The object-side surface of the fifth lens 1050 may be convex in the paraxial region and may be concave in the off-axis region. The image-side surface of the fifth lens 1050 may include an inflection point. The image-side surface of the fifth lens 1050 may be concave in the paraxial region and may be convex in the off-axis region.

The object-side surface of the sixth lens 1060 may include an inflection point. The object-side surface of the sixth lens 1060 may be convex in the paraxial region and may be concave in the off-axis region.

The object-side surface of the seventh lens 1070 may include an inflection point. The image-side surface of the seventh lens 1070 may include an inflection point. The image-side surface of the seventh lens 1070 may be concave in the paraxial region and may be convex in the off-axis region.

At least one of the first lens 1010 to the seventh lens 1070 may be formed of glass. For example, the first lens 1010 may be a glass lens.

In the optical imaging system 1000, f1/f may be 1.003, v1−v2 may be 63.41, v1−v3 may be 25.82, v1−v4 may be 63.41, f2/f may be −2.941, f3/f may be 2.882, |f4/f| may be −52.203, |f5/f| may be −5.576, f6/f may be 1.384, f7/f may be −0.631, OAL/f may be 1.061, f1/f2 may be −0.341, f1/f3 may be 0.348, BFL/f may be 0.165, D1/f may be 0.036, OAL/imgH/2 may be 0.597, FOV*imgH/f may be 71.054, SAG42/OAL may be −0.055, SAG52/OAL may be −0.069, SAG62/OAL may be −0.146, and SAG72/OAL may be −0.23.

Table 19 represents optical and physical parameters of the optical imaging system 1000 according to the tenth example. Table 20 illustrates aspherical data of the optical imaging system 1000.

TABLE 19

| Surface | Radius | Thickness | Index | Abbe number |
|---|---|---|---|---|
| Object | Infinity | 1000 | | |
| 1 | Infinity | 0.000 | | |
| 2 | 2.06 | 0.853 | 1.497 | 81.6 |
| 3 | 6.21 | 0.209 | | |
| 4 | 8.35 | 0.220 | 1.680 | 18.2 |
| 5 | 4.81 | 0.100 | | |
| 6 | 5.22 | 0.352 | 1.535 | 55.7 |
| 7 | 12.30 | 0.351 | | |
| 8 | −30.38 | 0.285 | 1.680 | 18.2 |
| 9 | −35.75 | 0.479 | | |
| 10 | 4.34 | 0.220 | 1.614 | 25.9 |
| 11 | 3.49 | 0.339 | | |
| 12 | 7.37 | 0.380 | 1.567 | 37.4 |
| 13 | −11.62 | 1.012 | | |
| 14 | −43.24 | 0.350 | 1.535 | 55.7 |
| 15 | 2.05 | 0.222 | | |
| 16 | | 0.110 | 1.517 | 64.2 |
| 17 | | 0.637 | | |
| Image | | −0.020 | | |

TABLE 20

| Surface # | 2 | 3 | 4 | 5 | 6 | 7 | 8 |
|---|---|---|---|---|---|---|---|
| Radius(Y) | 2.0557E+00 | 6.2106E+00 | 8.3513E+00 | 4.8131E+00 | 5.2161E+00 | 1.2302E+01 | −3.0380E+01 |
| conic constant(K) | −1.5167E+00 | −2.0343E+01 | 1.8304E+01 | 1.1442E+01 | 6.5511E−01 | 8.7143E+01 | −1.0500E+01 |
| 4th order coefficient (A) | 2.077E−02 | −4.822E−03 | −1.316E−02 | −4.445E−02 | 6.339E−03 | −1.074E−02 | −6.347E−02 |
| 6th order coefficient (B) | −4.401E−02 | 2.246E−02 | −5.926E−02 | 3.788E−01 | −3.193E−01 | −2.740E−02 | 2.011E−01 |
| 8th order coefficient (C) | 2.737E−01 | −9.467E−02 | 5.396E−01 | −3.186E+00 | 3.588E+00 | 7.908E−02 | −1.675E+00 |
| 10th order coefficient (D) | −9.637E−01 | 1.796E−01 | −2.686E+00 | 1.593E+01 | −2.369E+01 | 4.088E−01 | 8.750E+00 |
| 12th order coefficient (E) | 2.129E+00 | −1.726E−01 | 8.570E+00 | −5.191E+01 | 9.898E+01 | −4.602E+00 | −3.092E+01 |
| 14th order coefficient (F) | −3.142E+00 | 2.100E−02 | −1.836E+01 | 1.165E+02 | −2.772E+02 | 1.876E+01 | 7.619E+01 |
| 16th order coefficient (G) | 3.214E+00 | 1.615E−01 | 2.734E+01 | −1.861E+02 | 5.398E+02 | −4.462E+01 | −1.343E+02 |
| 18th order coefficient (H) | −2.326E+00 | −2.288E−01 | −2.892E+01 | 2.145E+02 | −7.452E+02 | 6.930E+01 | 1.718E+02 |
| 20th order coefficient (J) | 1.200E+00 | 1.720E−01 | 2.187E+01 | −1.790E+02 | 7.342E+02 | −7.325E+01 | −1.602E+02 |
| 22th order coefficient (L) | −4.380E−01 | −8.301E−02 | −1.175E+01 | 1.071E+02 | −5.127E+02 | 5.324E+01 | 1.077E+02 |
| 24th order coefficient (M) | 1.106E−01 | 2.656E−02 | 4.378E+00 | −4.476E+01 | 2.478E+02 | −2.623E+01 | −5.089E+01 |
| 26th order coefficient (N) | −1.837E−02 | −5.476E−03 | −1.075E+00 | 1.239E+01 | −7.884E+01 | 8.380E+00 | 1.602E+01 |
| 28th order coefficient (O) | 1.805E−03 | 6.612E−04 | 1.565E−01 | −2.040E+00 | 1.485E+01 | −1.567E+00 | −3.015E+00 |
| 30th order coefficient (p) | −7.953E−05 | −3.559E−05 | −1.023E−02 | 1.510E−01 | −1.254E+00 | 1.301E−01 | 2.565E−01 |

| Surface # | 9 | 10 | 11 | 12 | 13 | 14 | 15 |
|---|---|---|---|---|---|---|---|
| Radius(Y) | −3.5746E+01 | 4.3387E+00 | 3.4923E+00 | 7.3660E+00 | −1.1616E+01 | −4.3244E+01 | 2.0476E+00 |
| conic constant(K) | 2.6831E+01 | −1.8968E+01 | −7.7128E−01 | −9.9000E+01 | 2.1938E+01 | −9.9000E+01 | −1.1678E+01 |
| 4th order coefficient (A) | −6.286E−02 | −1.510E−01 | −2.106E−01 | −7.856E−02 | −3.225E−02 | −3.687E−01 | −2.536E−01 |
| 6th order coefficient (B) | 8.733E−02 | 4.107E−01 | 3.294E−01 | 1.870E−01 | 4.750E−02 | 4.451E−01 | 2.936E−01 |
| 8th order coefficient (C) | −4.550E−01 | −1.476E+00 | −5.603E−01 | −6.094E−01 | −2.433E−02 | −3.741E−01 | −2.228E−01 |
| 10th order coefficient (D) | 1.741E+00 | 4.367E+00 | 6.296E−01 | 1.380E+00 | −7.611E−02 | 2.193E−01 | 1.163E−01 |
| 12th order coefficient (E) | −5.179E+00 | −9.746E+00 | −3.849E−01 | −2.308E+00 | 1.511E−01 | −9.128E−02 | −4.317E−02 |
| 14th order coefficient (F) | 1.169E+01 | 1.587E+01 | −5.932E−04 | 2.767E+00 | −1.424E−01 | 2.755E−02 | 1.166E−02 |
| 16th order coefficient (G) | −1.970E+01 | −1.877E+01 | 2.240E−01 | −2.361E+00 | 8.631E−02 | −6.105E−03 | −2.317E−03 |

TABLE 20-continued

| | | | | | | | |
|---|---|---|---|---|---|---|---|
| 18th order coefficient (H) | 2.444E+01 | 1.611E+01 | −2.167E−01 | 1.440E+00 | −3.621E−02 | 9.976E−04 | 3.405E−04 |
| 20th order coefficient (J) | −2.200E+01 | −1.000E+01 | 1.169E−01 | −6.276E−01 | 1.072E−02 | −1.197E−04 | −3.684E−05 |
| 22th order coefficient (L) | 1.410E+01 | 4.441E+00 | −4.119E−02 | 1.938E−01 | −2.229E−03 | 1.040E−05 | 2.891E−06 |
| 24th order coefficient (M) | −6.242E+00 | −1.373E+00 | 9.728E−03 | −4.137E−02 | 3.186E−04 | −6.362E−07 | −1.599E−07 |
| 26th order coefficient (N) | 1.811E+00 | 2.807E−01 | −1.493E−03 | 5.805E−03 | −2.981E−05 | 2.595E−08 | 5.904E−09 |
| 28th order coefficient (O) | −3.094E−01 | −3.410E−02 | 1.351E−04 | −4.818E−04 | 1.644E−06 | −6.334E−10 | −1.304E−10 |
| 30th order coefficient (p) | 2.357E−02 | 1.865E−03 | −5.469E−06 | 1.792E−05 | −4.054E−08 | 6.995E−12 | 1.304E−12 |

An optical imaging system 1100 according to an eleventh example will hereinafter be described with reference to FIGS. 11A and 11B.

Figure 11A:
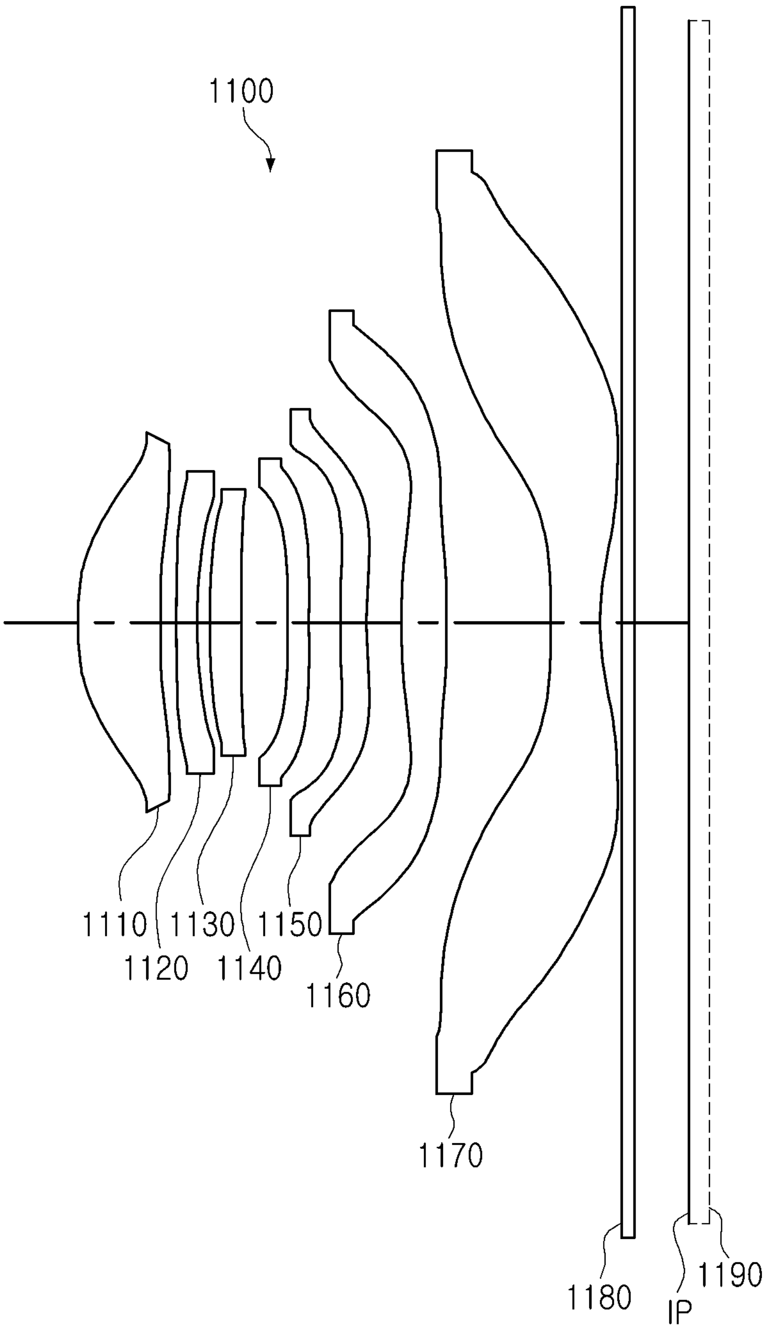
FIG. 11A is a cross-sectional view illustrating an optical imaging system according to an eleventh example.
Figure 11B:
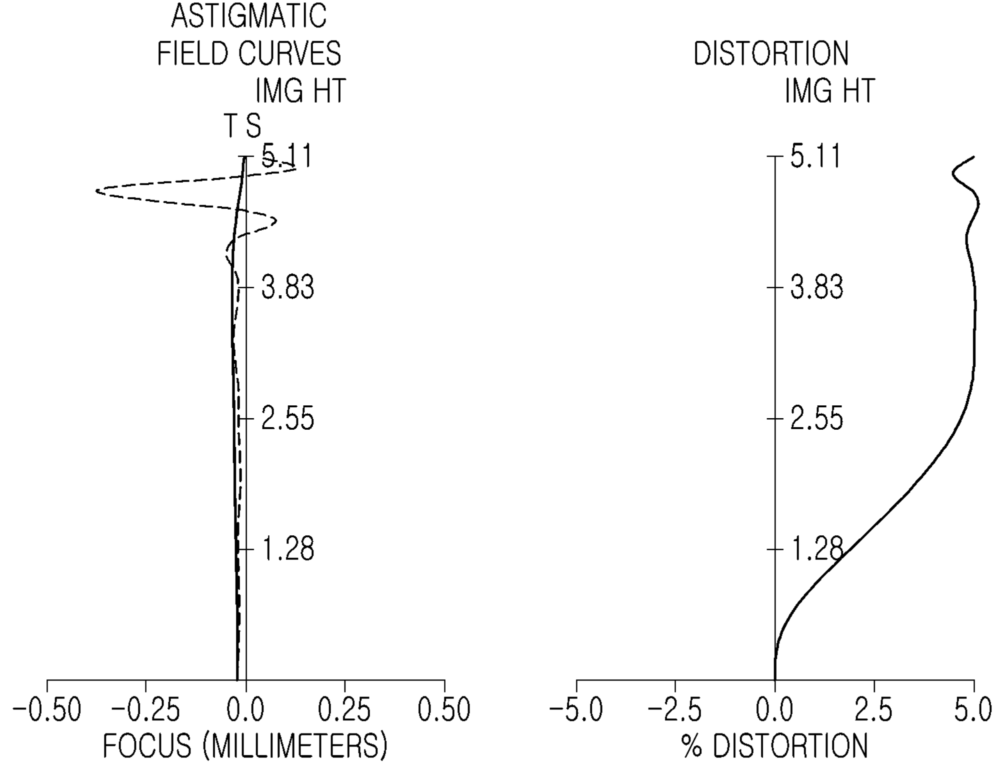
FIG. 11B is graphs representing aberration characteristics of the optical imaging system according to the eleventh example.

FIG. 11A is a cross-sectional view illustrating the optical imaging system 1100 according to the eleventh example. FIG. 11B is graphs representing aberration characteristics of the optical imaging system 1100.

The optical imaging system 1100 may include a first lens 1110, a second lens 1120, a third lens 1130, a fourth lens 1140, a fifth lens 1150, a sixth lens 1160, a seventh lens 1170, and an image sensor 1190 sequentially arranged from an object side toward a image side. The optical imaging system 1100 may include an IR filter 1180 disposed between the seventh lens 1170 and the image sensor 1190.

The first lens 1110 may have positive refractive power. An object-side surface of the first lens 1110 may be convex in the paraxial region. An image-side surface of the first lens 1110 may be concave in the paraxial region. The object-side surface of the first lens 1110 may be aspherical. The image-side surface of the first lens 1110 may be aspherical.

The second lens 1120 may have negative refractive power. An object-side surface of the second lens 1120 may be convex in the paraxial region. An image-side surface of the second lens 1120 may be concave in the paraxial region. The object-side surface of the second lens 1120 may be aspherical. The image-side surface of the second lens 1120 may be aspherical.

The third lens 1130 may have positive refractive power. An object-side surface of the third lens 1130 may be convex in the paraxial region. An image-side surface of the third lens 1130 may be concave in the paraxial region. The object-side surface of the third lens 1130 may be aspherical. The image-side surface of the third lens 1130 may be aspherical.

The fourth lens 1140 may have negative refractive power. An object-side surface of the fourth lens 1140 may be concave in the paraxial region. An image-side surface of the fourth lens 1140 may be concave in the paraxial region. The object-side surface of the fourth lens 1140 may be aspherical. The image-side surface of the fourth lens 1140 may be aspherical.

The fifth lens 1150 may have negative refractive power. An object-side surface of the fifth lens 1150 may be convex in the paraxial region. An image-side surface of the fifth lens 1150 may be concave in the paraxial region. The object-side surface of the fifth lens 1150 may be aspherical. The image-side surface of the fifth lens 1150 may be aspherical.

The sixth lens 1160 may have positive refractive power. An object-side surface of the sixth lens 1160 may be convex in the paraxial region. An image-side surface of the sixth lens 1160 may be convex in the paraxial region. The object-side surface of the sixth lens 1160 may be aspherical. The image-side surface of the sixth lens 1160 may be aspherical.

The seventh lens 1170 may have negative refractive power. An object-side surface of the seventh lens 1170 may be convex in the paraxial region. An image-side surface of the seventh lens 1170 may be concave in the paraxial region. The object-side surface of the seventh lens 1170 may be aspherical. The image-side surface of the seventh lens 1170 may be aspherical.

The object-side surface of the first lens 1110 may include an inflection point. The image-side surface of the first lens 1110 may include an inflection point.

The image-side surface of the fourth lens 1140 may include an inflection point. The image-side surface of the fourth lens 1140 may be concave in the paraxial region and may be convex in the off-axis region.

The object-side surface of the fifth lens 1150 may include an inflection point. The object-side surface of the fifth lens 1150 may be convex in the paraxial region and may be concave in the off-axis region. The image-side surface of the fifth lens 1150 may include an inflection point. The image-side surface of the fifth lens 1150 may be concave in the paraxial region and may be convex in the off-axis region.

The object-side surface of the sixth lens 1160 may include an inflection point. The object-side surface of the sixth lens 1160 may be convex in the paraxial region and may be concave in the off-axis region.

The object-side surface of the seventh lens 1170 may include an inflection point. The object-side surface of the seventh lens 1170 may be convex in the paraxial region and may be concave in the off-axis region. The image-side surface of the seventh lens 1170 may include an inflection point. The image-side surface of the seventh lens 1170 may be concave in the paraxial region and may be convex in the off-axis region.

At least one of the first lens 1110 to the seventh lens 1170 may be formed of glass. For example, the first lens 1110 and the second lens 1120 may be a glass lens.

In the optical imaging system 1100, f1/f may be 1.129, v1−v2 may be 50.4, v1−v3 may be 25.82, v1−v4 may be 63.41, f2/f may be −3.407, f3/f may be 2.892, |f4/f| may be −4.691, |f5/f| may be −10.362, f6/f may be 1.114, f7/f may be −0.748, OAL/f may be 1.165, f1/f2 may be −0.331, f1/f3 may be 0.39, BFL/f may be 0.172, D1/f may be 0.029, OAL/imgH/2 may be 0.538, FOV*imgH/f may be 98.353, SAG42/OAL may be −0.046, SAG52/OAL may be −0.092, SAG62/OAL may be −0.154, and SAG72/OAL may be −0.208.

Table 21 represents optical and physical parameters of the optical imaging system 1100 according to the eleventh example. Table 22 illustrates aspherical data of the optical imaging system 1100.

TABLE 21

| Surface | Radius | Thickness | Index | Abbe number |
|---|---|---|---|---|
| Object | Infinity | 1000 | | |
| 1 | Infinity | 0.000 | | |
| 2 | 1.87 | 0.740 | 1.497 | 81.6 |
| 3 | 5.52 | 0.137 | | |
| 4 | 7.57 | 0.200 | 1.689 | 31.2 |
| 5 | 4.46 | 0.106 | | |
| 6 | 5.40 | 0.292 | 1.535 | 55.7 |
| 7 | 20.09 | 0.403 | | |
| 8 | −59.46 | 0.209 | 1.680 | 18.2 |
| 9 | 20.55 | 0.269 | | |
| 10 | 4.04 | 0.234 | 1.614 | 25.9 |
| 11 | 3.49 | 0.324 | | |
| 12 | 6.26 | 0.412 | 1.567 | 37.4 |
| 13 | −5.63 | 0.923 | | |
| 14 | 22.30 | 0.440 | 1.535 | 55.7 |
| 15 | 1.74 | 0.200 | | |
| 16 | | 0.110 | 1.517 | 64.2 |
| 17 | | 0.482 | | |
| Image | | 0.020 | | |

TABLE 22

| Surface # | 2 | 3 | 4 | 5 | 6 | 7 | 8 |
|---|---|---|---|---|---|---|---|
| Radius(Y) | 1.8739E+00 | 5.5171E+00 | 7.5705E+00 | 4.4617E+00 | 5.3978E+00 | 2.0085E+01 | −5.9464E+01 |
| conic constant(K) | −1.5551E+00 | −1.9857E+01 | 1.4166E+01 | 1.1593E+01 | 1.0891E+00 | 9.0150E+01 | 9.9000E+01 |
| 4th order coefficient (A) | 2.274E−02 | −4.401E−03 | −5.139E−02 | −2.547E−02 | −3.430E−02 | −6.511E−02 | −7.714E−02 |
| 6th order coefficient (B) | 3.947E−02 | 2.520E−03 | 3.767E−01 | 1.042E−01 | −2.629E−01 | 9.755E−01 | −8.110E−02 |
| 8th order coefficient (C) | −2.438E−01 | 1.124E−01 | −3.366E+00 | −3.864E+00 | 9.113E+00 | −1.078E+01 | 9.058E−01 |
| 10th order coefficient (D) | 8.532E−01 | −1.125E+00 | 2.016E+01 | 4.246E+01 | −1.050E+02 | 7.462E+01 | −4.494E+00 |
| 12th order coefficient (E) | −1.930E+00 | 4.723E+00 | −8.005E+01 | −2.548E+02 | 6.857E+02 | −3.432E+02 | 1.188E+01 |
| 14th order coefficient (F) | 2.983E+00 | −1.175E+01 | 2.185E+02 | 9.825E+02 | −2.884E+03 | 1.095E+03 | −1.521E+01 |
| 16th order coefficient (G) | −3.262E+00 | 1.916E+01 | −4.206E+02 | −2.600E+03 | 8.287E+03 | −2.488E+03 | −4.167E+00 |
| 18th order coefficient (H) | 2.569E+00 | −2.146E+01 | 5.796E+02 | 4.863E+03 | −1.674E+04 | 4.083E+03 | 5.248E+01 |
| 20th order coefficient (J) | −1.465E+00 | 1.684E+01 | −5.734E+02 | −6.490E+03 | 2.401E+04 | −4.852E+03 | −9.936E+01 |
| 22th order coefficient (L) | 6.021E−01 | −9.260E+00 | 4.037E+02 | 6.144E+03 | −2.435E+04 | 4.132E+03 | 1.047E+02 |
| 24th order coefficient (M) | −1.743E−01 | 3.500E+00 | −1.973E+02 | −4.030E+03 | 1.706E+04 | −2.456E+03 | −6.896E+01 |
| 26th order coefficient (N) | 3.392E−02 | −8.671E−01 | 6.362E+01 | 1.741E+03 | −7.861E+03 | 9.670E+02 | 2.830E+01 |
| 28th order coefficient (O) | −3.998E−03 | 1.268E−01 | −1.216E+01 | −4.453E+02 | 2.142E+03 | −2.264E+02 | −6.644E+00 |
| 30th order coefficient (p) | 2.164E−04 | −8.300E−03 | 1.043E+00 | 5.110E+01 | −2.617E+02 | 2.384E+01 | 6.834E−01 |

| Surface # | 9 | 10 | 11 | 12 | 13 | 14 | 15 |
|---|---|---|---|---|---|---|---|
| Radius(Y) | 2.0554E+01 | 4.0416E+00 | 3.4873E+00 | 6.2636E+00 | −5.6321E+00 | 2.2298E+01 | 1.7370E+00 |
| conic constant(K) | 9.9000E+01 | −2.6013E+01 | −1.3798E+00 | 5.3187E+00 | −5.7939E+00 | −1.3450E+01 | −9.8646E+00 |
| 4th order coefficient (A) | −1.083E−01 | −1.990E−01 | −2.439E−01 | 1.005E−02 | 4.639E−02 | −2.455E−01 | −8.436E−02 |
| 6th order coefficient (B) | 1.543E−01 | 3.726E−01 | 2.956E−01 | −7.800E−02 | −1.936E−02 | 1.792E−01 | 4.582E−02 |
| 8th order coefficient (C) | −6.887E−01 | −1.300E+00 | −7.950E−01 | 2.132E−01 | 7.118E−02 | −1.090E−01 | −1.818E−02 |
| 10th order coefficient (D) | 3.130E+00 | 3.969E+00 | 1.940E+00 | −4.843E−01 | −1.826E−01 | 4.574E−02 | 4.325E−03 |
| 12th order coefficient (E) | −1.085E+01 | −8.841E+00 | −3.507E+00 | 6.904E−01 | 2.310E−01 | −1.118E−02 | −3.796E−04 |
| 14th order coefficient (F) | 2.645E+01 | 1.434E+01 | 4.695E+00 | −6.412E−01 | −1.763E−01 | 1.176E−03 | −1.029E−04 |
| 16th order coefficient (G) | −4.559E+01 | −1.711E+01 | −4.686E+00 | 4.062E−01 | 8.898E−02 | 1.331E−04 | 4.374E−05 |
| 18th order coefficient (H) | 5.612E+01 | 1.502E+01 | 3.464E+00 | −1.804E−01 | −3.107E−02 | −6.861E−05 | −8.114E−06 |
| 20th order coefficient (J) | −4.949E+01 | −9.615E+00 | −1.871E+00 | 5.666E−02 | 7.649E−03 | 1.198E−05 | 9.419E−07 |
| 22th order coefficient (L) | 3.096E+01 | 4.406E+00 | 7.240E−01 | −1.250E−02 | −1.328E−03 | −1.237E−06 | −7.354E−08 |
| 24th order coefficient (M) | −1.340E+01 | −1.401E+00 | −1.943E−01 | 1.891E−03 | 1.591E−04 | 8.173E−08 | 3.886E−09 |
| 26th order coefficient (N) | 3.814E+00 | 2.920E−01 | 3.419E−02 | −1.866E−04 | −1.254E−05 | −3.411E−09 | −1.340E−10 |

TABLE 22-continued

| | | | | | | | |
|---|---|---|---|---|---|---|---|
| 28th order coefficient (O) | −6.413E−01 | −3.575E−02 | −3.540E−03 | 1.080E−05 | 5.852E−07 | 8.227E−11 | 2.732E−12 |
| 30th order coefficient (p) | 4.824E−02 | 1.941E−03 | 1.631E−04 | −2.781E−07 | −1.224E−08 | −8.771E−13 | −2.501E−14 |

As set forth above, the optical imaging system according to the various examples may provide high optical property and have a very slim thickness.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens having positive refractive power, a second lens having negative refractive power, a third lens having positive refractive power, a fourth lens having negative refractive power, a fifth lens having positive refractive power, a sixth lens, and a seventh lens sequentially arranged from an object side, wherein the first lens has a convex object-side surface in a paraxial region thereof and a concave image-side surface in the paraxial region thereof, the second lens has a convex object-side surface in a paraxial region thereof and a concave image-side surface in the paraxial region thereof, the third lens has a convex object-side surface in a paraxial region thereof and a concave image-side surface in the paraxial region thereof, the sixth lens has a convex object-side surface in a paraxial region thereof and a convex image-side surface in the paraxial region thereof, and the seventh lens has a convex object-side surface in a paraxial region thereof and a concave image-side surface in the paraxial region thereof, wherein $OAL/imgH/2<0.6$, where OAL is a distance from the object-side surface of the first lens to an image plane, and imgH is half a diagonal length of the image plane, wherein $5<v1-v3<55$ is satisfied, where v1 is an Abbe number of the first lens, and v3is an Abbe number of the third lens, and wherein $2<f3/f<10$, where f3 is a focal length of the third lens, and f is an overall focal length of the optical imaging system.

2. The optical imaging system of claim 1, wherein at least one of $30<v1-v2<70$ and $30<v1-v4<70$ is satisfied, where v2 is an Abbe number of the second lens, and v4 is an Abbe number of the fourth lens.

3. The optical imaging system of claim 1, wherein $0<f1/f<1.4$, where f1 is a focal length of the first lens.

4. The optical imaging system of claim 1, wherein $-9<f2/f<-2$, where f2 is a focal length of the second lens.

5. The optical imaging system of claim 1, wherein $5<|f4/f|<70$, where f4 is a focal length of the fourth lens.

6. The optical imaging system of claim 1, wherein $5<|f5/f|<50$, where f5 is a focal length of the fifth lens.

7. The optical imaging system of claim 1, wherein $-3<f7/f<0$, where f7 is a focal length of the seventh lens.

8. The optical imaging system of claim 1, wherein $OAL/f<1.3$ and $BFL/f<0.3$, where BFL is a distance from an image-side surface of the seventh lens to the image plane on an optical axis.

9. The optical imaging system of claim 1, wherein $f1/f2<0$, where f1 is a focal length of the first lens, and f2 is a focal length of the second lens.

10. The optical imaging system of claim 1, wherein $0<f1/f3$, where f1 is a focal length of the first lens, and f3 is a focal length of the third lens.

11. The optical imaging system of claim 1, wherein $D1/f<0.1$, where D1 is a distance between the image-side surface of the first lens and the object-side surface of the second lens on an optical axis.

12. The optical imaging system of claim 1, wherein $70<FOV*imgH/f$, where FOV is a field of view of the optical imaging system.

13. The optical imaging system of claim 1, wherein at least one of $-0.1<SAG42/OAL<0$, $-0.2<SAG52/OAL<0$, $-0.2<SAG62/OAL<0$, and $-0.3<SAG72/OAL<0$ is satisfied, where SAG42 is an SAG value at a distal end of an effective diameter of an image- side surface of the fourth lens, SAG52 is an SAG value at a distal end of an effective diameter of an image-side surface of the fifth lens, SAG62 is an SAG value at a distal end of an effective diameter of an image-side surface of the sixth lens, and SAG72 is an SAG value at a distal end of an effective diameter of an image-side surface of the seventh lens.

14. The optical imaging system of claim 1, wherein the sixth lens has positive refractive power, and the seventh lens has negative refractive power.

15. The optical imaging system of claim 1, wherein at least one of the first lens, the second lens, the third lens, the fourth lens, the fifth lens, the sixth lens and the seventh lens is a glass lens.

* * * * *